United States Patent Office 3,281,414
Patented Oct. 25, 1966

1

3,281,414
[3,2-d]TRIAZOLES OF THE PREGNANE SERIES
John Fried, Plainfield, and Helmut Mrozik, Matawan, N.J., assignors to Merck & Co., Inc., Rahway, N.J., a corporation of New Jersey
No Drawing. Filed June 17, 1963, Ser. No. 288,431
18 Claims. (Cl. 260—239.5)

This invention relates to novel steroids and to processes of making the same. More particularly, this invention relates to novel [3,2-d]triazoles of the pregnane series. These novel steroids are represented by the following structural formula:

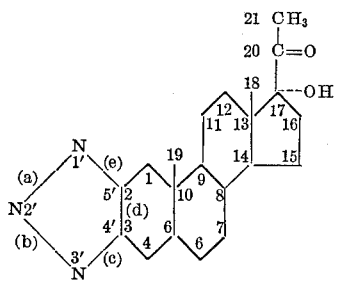

The steroid nucleus may have attached thereto substituents such as hydrogen, methyl or halogen at C-6; hydrogen or α-halogen at C-9; hydrogen, keto or β-hydroxy at C-11; β-halogen at C-11 when α-halogen is also present at C-9; hydrogen, α-hydroxy, α-fluoro, methyl or methylene at C-16; the 16α,17α-acetals or ketals of 16α,17α-dihydroxy-groups when hydrogen, hydroxy, chloro or fluoro is present at C-21; and hydrogen, hydroxy, chloro, fluoro, acyloxy or the phosphate esters at C-21. The substituent present at one of the three nitrogens of the triazole ring (positions 1', 2' or 3') may be hydrogen, acyl, alkyl, cycloalkyl, aryl, aralkyl, a heterocyclic nucleus, or substituted derivatives thereof. A double bond may be present at the 4–5 position, the 6–7 position, or both positions.

The above described [3,2-d]triazoles of the pregnane series produced in accordance with the present invention possess high anti-inflammatory activity, and are especially effective for the treatment of arthritis and related diseases since they can be administered for their cortisone-like action in low dosage thereby minimizing undesirable side effects.

The 2'-substituted-4-pregneno (or 4,6-pregnadieno)-[3,2-d]-2'H-1',2',3'-triazoles of the pregnane series which have the following formula, or which are the Δ⁴·⁶-analogues of compounds having the following structure, are prepared according to the procedures outlined in Flow Sheet A.

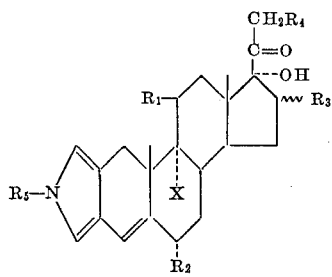

wherein $R_1$ is a member of the group consisting of hydrogen, 11β-hydroxy, 11β-chloro, and keto, but halogen is present at $R_1$ only when X is halogen, an hydrogen is present at $R_1$ only when X is hydrogen; $R_2$ is a member of the group consisting of hydrogen, α-chloro, α-fluoro and α-methyl; $R_3$ is a member of the group consisting of hy-

2 drogen, α-fluoro, α-methyl, β-methyl and methylene; $R_4$ is a member of the group consisting of hydrogen, acyloxy, chloro and fluoro; $R_5$ is a member of the group consisting of hydrogen, alkyl, aralkyl, cycloalkyl, aryl, a heterocyclic nucleus, and substituted derivatives thereof; and X is a member of the group consisting of hydrogen and halogen.

The 17α,21-dihydroxy-4-pregnene- (or 4,6-pregnadiene)-3,20-dione used as starting material (Flow Sheet A, Compound 1) is protected at the 17, 20 and 21 positions by suitable protecting groups. In a preferred embodiment of our invention these positions of the steroid molecule are protected by forming the 17α,20,20,21-bis(methylenedioxy)2-derivative (Compound 2). Thus, Compound 1 of Flow Sheet A, and the Δ⁴·⁶-analogues thereof, react with aqueous formaldehyde solutions in the presence of strong acid to form the corresponding 17α,20,20,21-bis(methylenedioxy)-steroids. For example, cold concentrated HCl and formalin are added to a stirred suspension of the steroid in chloroform, cooled to about 0° C. The mixture is then allowed to come to room temperature and stirred for several hours to afford the corresponding 17α,20,20,21 - bis(methylenedioxy) - derivative (Compound 2).

The above named starting materials for our invention can be prepared by the introduction of the various substituents, namely the 16α-methyl-, 16β-methyl-, 16-methylene-, 6α-methyl-, 6α-fluoro- or the 9α-fluoro-groups into a 17α,21-dihydroxy-4-pregnene-3,20-dione according to known procedures capable of general application. More than one substituent may be introduced into the unsubstituted steroid in any order, although it is generally preferred to introduce a 9α-halogen substituent last.

Procedures for the introduction of the following groups into certain [3,2-d]triazoles of the pregnane series are disclosed in these examples: 6α-methyl-Δ⁴- in Examples 8, 14; 6β-methyl-Δ⁴ in Examples 8, 14; 6-methyl-Δ⁴·⁶ in Examples 5, 11; 9α-fluoro in Examples 9 and 23; 6α-halogen in Examples 7, 10, 15; 6β-halogen in Examples 6, 16; 11-desoxy in Example 13.

These procedures may be adapted by those skilled in the art to the similar 4-pregnene and 4,6-pregnadiene compounds used as starting materials.

The starting materials for the various 16α-fluoro-compounds are prepared by the methods described in Example 21.

An 11β,17α,21-trihydroxy-4-pregnene-3,20-dione compound may be converted into the correspondingly substituted 9α,11β-dichloro-17α,21-dihydroxy-4-pregnene - 3,20-dione compound by first dehydrating the 11β,17α,21-trihydroxy 4-pregnene-3,20-dione at the 9(11)-position to form the corresponding 9(11)-pregnene, then acetylating at the 21-position, and finally halogenating at the 9α, 11β-positions, for example, following the detailed procedures given in Example 12. This procedure is likewise applicable to the Δ⁴·⁶-analogues.

In a preferred embodiment of our invention, the 11-keto-steroids are preferably prepared by oxidation of the corresponding 11β-hydroxy-steroid, for example, with chromium trioxide in a non-aqueous base such as pyridine. If desired, however, the 17α,20,20,21-bis(methylenedioxy)-4-pregnene- (or 4,6-pregnadiene)-3,11-dione may be prepared directly by the reaction of the 17α,21-dihydroxy-4-pregnene- (or 4,6-pregnadiene)-3,11,20-trione with formaldehyde solution in the presence of an acid as described in the first step of Example 1.

Upon treatment of the 17α,20,20,21-bis(methylenedioxy)-4-pregnene- (or 4,6-pregnadiene)-3-one compound with an alkyl formate and sodium hydride in an inert atmosphere there is formed the corresponding 17α,20,20, 21-bis(methylenedioxy)-2-hydroxymethylene-4-pregnene- (or 4,6-pregnadiene)-3-one (Compound 3). For example, the steroid is dissolved in a solvent such as benzene and the resulting solution is cooled to room temperature and treated with ethyl formate. The air in the system is replaced with nitrogen, sodium hydride is added and the mixture is stirred at room temperature for several hours.

The 2-hydroxymethylene-compound is reacted with nitrous acid to form the corresponding 17α,20,20,21-bis(methylenedioxy)-4-pregnene (or 4,6-pregnadiene)-3-one (Compound 4). In a preferred embodiment of our invention the steroid is dissolved in a solution of glacial acetic acid in a solvent such as methylene chloride. The solution is then cooled to about 0° C. An aqueous solution of sodium nitrite is then added to the cooled solution with stirring in an inert atmosphere. The reaction mixture is allowed to stir at 0° C. for about 30 minutes to form the 2-hydroxyimino-steriod (Compound 4).

The 2-hydroxyimino-steroid is reacted with hydrazine, for example, by refluxing in an inert atmosphere for several hours, to form the 17α,20,20,21-bis(methylenedioxy)-4-pregneno- (or 4,6-pregnadieno)-[3,2-d]triazole (Compound 6 where $R_5$ is hydrogen).

The 2-hydroxyimino-steroid is reacted with a monosubstituted hydrazine to form the corresponding 17α,20,20,21-bis(methylenedioxy)-2-hydroxyimino-3-(substituted)-hydrazono-4-pregnene- (or 4,6-pregnadiene)-3-one (Compound 5). This reaction takes place, for example, on allowing a solution of the steroid and the substituted hydrazine to stand for several hours at room temperature.

Upon treatment of the 2-hydroxyimino-3-(substituted)-hydrazono-steroid (Compound 5) with a dehydrating agent such as phosphorus pentachloride the corresponding 17α,20,20,21-bis(methylenedioxy)-2'-substituted-4-pregneno- (or 4,6-pregnadieno)-[3,2-d]-2'H-1',2',3'-triazole is formed (Compound 6 where $R_5$ is a radical other than hydrogen).

Alternately, the 2-hydroxyimino-steroid (Compound 4) is converted directly into the corresponding 2'-substituted-4-pregneno- (or 4,6-pregnadieno)-[3,2-d]-2'H-1',2',3'-triazole (Compound 6) by reaction with a monosubstituted hydrazine under suitable operating conditions.

Among the monosubstituted hydrazines which may be used for the process of our invention are: alkylhydrazines, such as methylhydrazine, ethylhydrazine, propylhydrazines, butylhydrazines, β-hydroxyethylhydrazine, cycloalkylhydrazines; arylhydrazines which may be derived from any aromatic nucleus including phenylhydrazine and the substituted phenylhydrazines, such as o-, m-, and p-halophenylhydrazines, o-, m-, and p-tolyhydrazine, o-, m-, and p-alkoxyphenylhydrazines, o-, m-, and p-nitrophenylhydrazines, 1-hydrazinonaphthalene, 2-hydrazinopyridine, 3-hydrazinopyridine, 4-hydrazinopyridine, 4-hydrazinopyridine, oxide, and 2-hydrazinopyrimidine, 2-hydrazinothiophene, 3-hydrazinothiophene; aralkylhydrazines, such as benzylhydrazine and phenylethylenehydrazine.

There are thus produced the corresponding 2'-substituted-4-pregneno- (or 4,6-pregnadieno)-[3,2-d]-2'H-1',2',3'-triazoles including: 2'-alkyl such as 2'-methyl-, 2'-ethyl-, 2'-butyl-, 2'-propyl-, 2'-(β-hydroxyethyl)-; 2'-cycloalkyl-; 2'-aryl- which may be derived from any aromatic nucleus, including 2'-phenyl- and the 2'-substituted-phenyl derivatives such as o-, m-, and p-halophenyl; o-, m-, and p-tolyl-; o-, m-, and p-alkoxyphenyl-, o-, m-, and p-nitrophenyl-; 2'-(1''-naphthyl)-, 2'-(2''-pyridyl)-, 2'-(3''-pyridyl)-, 2'-(4''-pyridyl)-, 2'-(4''-pyridyl oxide)-, 2'-(2''-pyrimidyl)-, 2'-(2''-thiophene)-, 2'-(3''-thiophene)-, 2'-aralkyl-, such as 2'-benzyl- and 2'-phenyethenyl-4-pregneno- (or 4,6-pregnadieno)-[3,2-d]-2'H-1',2',3'-triazoles.

The 17α,20,20,21-bis(methylenedioxy-4-pregneno- (or 4,6-pregnadieno)-[3,2-d] triazole (Compound 6 wherein $R_5$ is hydrogen) is alkylated to form a mixture of the 1'-alkyl-4-pregneno- (or 4,6-pregnadieno)-[3,2-d]-1'H-1',2',3'-triazole, 2'-alkyl-4-pregneno- (or 4,6-pregnadieno)-[3,2-d]-2'H-1',2',3'-triazole, and 3'-alkyl-4-pregneno- (or 4,6-pregnadieno)-[3,2-d]-3'H-1',2',3'-triazole (see Flow Sheet B). The mixture is separated by chromatography. In a preferred embodiment of our invention alkylation is carried out by treating a solution of the steroid with sodium hydride and an alkyl iodide.

The 1'- and 3'-substituted-4-pregneno- (or 4,6-pregnadieno)-[3,2-d]-1'H (and 3'H)-1',2',3'-triazoles are prepared starting with the procedures outlined in Flow Sheet C.

The 17α,21-dihydroxy-4-pregnene- (or 4,6-pregnadiene)-3,20-dione (Compound 8) used as starting material is protected at the 17,20 and 21 positions by suitable protecting groups. In a preferred embodiment of our invention these positions of the steroid molecule are protected by forming the 17α,20,20,21-bis(methylenedioxy)-derivative (Compound 9). Thus the 17α,21-dihydroxy-4-pregnene- (or 4,6-pregnadiene)-3,20-dione (Compound 8) is treated with an aqueous formaldehyde solution in the presence of a strong acid to form the corresponding 17α,20,20,21 - bis(methylenedioxy) - steroid (Compound 9). The latter compound is converted to the 3-dioxolane (Compound 10) by reacting with ethylene glycol in the presence of a strong acid. The 3-dioxolane is oxidized, for example with perbenzoic acid to form the corresponding 5α-6α-epoxy-3-ethylenedioxy-5α-pregnane (Compound 11), which is treated with formic acid at room temperature to afford the corresponding 5α-pregnano-3,6-dione (Compound 12). The latter compound is reacted with morpholine to form the 3-morpholino-5α,2-pregnene-6-one (Compound 13) which on reaction with a triazolhydrocarbon forms a mixture of the 1'- and 3'-substituted-6-keto-5α-pregnano-[3,2-d]-1'H (and 3'H)-1',2',3'-triazoles (Compounds 14A and 14B). The mixture is separated by chromatography.

The triazohydrocarbons for use in the above reaction are prepared from the known monosubstituted hydrazines, including those listed in column 3, following the procedure of Example 20. The 1'- and 3'-substituted-11β-hydroxy-4-pregneno-[3,2-d] - 1',2',3'-triazoles which are unsubstituted in the 6-position (Compound 18 of Flow Sheet D) are prepared according to the procedures of Example 4.

The 1'- and 3'-substituted-11β-hydroxy-6α-methyl-4-pregneno-[3,2,-d]-1',2',3'-triazoles (Compound 37 of Flow Sheet H) are prepared according to the procedures of Example 8.

The 1'- and 3'-substituted - 11β-hydroxy-6β-methyl-4-pregneno-[3,2,-d]-1',2',3'-triazoles (Compound 36 of Flow Sheet H) are prepared according to the procedures of Example 8.

The 1'- and 3'-substituted-11β-hydroxy-6-methyl-4,6-pregnadieno-[3,2,-d]-1',2',3'-triazoles (Compound 23 of Flow Sheet E) are prepared according to the procedures of Example 5.

The 1'- and 3'-substituted-6α-halo-11β-hydroxy-4-pregneno-[3,2-d]-1',2',3'-triazoles (Compound 32 of Flow Sheet G) are prepared according to the procedures of Example 7.

The 1'- and 3'-substituted-6β-halo-11β-hydroxy-4-pregneno-[3,2-d]-1',2',3'-triazoles (Compound 28 of Flow Sheet F) are prepared according to the procedures of Example 6.

The 1'- and 3'-substituted-6-halo-11β-hydroxy-4,6-pregnadieno-[3,2-d]-1',2',3'-triazoles (Compound 28 of Flow Sheet F) are prepared according to the procedures of Example 6.

The various 1'- and 3'-substituted-9α-fluoro-11β-hydroxy-4-pregneno-(and 4,6-pregnadieno)-[3,2-d]-1',2',3'-triazoles are prepared according to the procedures of Flow Sheets I, J, F, G and H, detailed procedures for which are given in Examples 9, 11, 6, 10 and 8 respectively.

The 1'- and 3'-substituted-9α,11β-dichloro-4-pregneno- (and 4,6-pregnadieno)-[3,2-d]-1',2',3'-triazoles are prepared according to the procedures of Flow Sheets K, M, N, O, P and S, detailed procedures for which are given in Examples 12, 14, 15, 16 and 23 respectively.

The 1'- and 3'-substituted-11-desoxy-4-pregneno- (and 4,6-pregnadieno)-[3,2-d]-1',2',3'-triazoles are prepared according to the procedures of Flow Sheets L, M, N, O, P and R, detailed procedures for which are given in Examples 13, 14, 15, 16 and 22 respectively.

Upon treatment of any of the 17α,20,20,21-bis(methylenedioxy)-[3,2-d] triazole products set forth in detail above with a dilute organic acid, for example a 60% aqueous solution of formic acid, the 17α,20,20,21-bis (methylenedioxy)-protecting group is removed and there are obtained the corresponding 17α,21-dihydroxy-20-oxo-[3,2-d]-triazoles which are represented by Compounds 79A, 79B and 79C of Flow Sheet Q.

The compounds of our invention include the following:

11β,17α,21-trihydroxy - 20-oxo-4-pregneno-[3,2-d]-1',2',3'-triazole;
6α-chloro - 11β,17α,21-trihydroxy-20-oxo-4-pregneno-[3,2-d]-1',2',3'-triazole;
6α-fluoro - 11β,17α,21-trihydroxy-20-oxo-4-pregneno-[3,2-d]-1',2',3'-triazole;
11β,17α,21 - trihydroxy-6α-methyl-20-oxo-4-pregneno-[3,2-d]-1',2',3'-triazole;
11β,17α,21-trihydroxy - 6β - methyl-20-oxo-4-pregneno-[3,2-d]-1',2',3'-triazole;
16α-fluoro-11β,17α,21-trihydroxy-20-oxo-4-pregneno-[3,2-d]-1',2',3'-triazole;
11β,17α,21-trihydroxy-16α-methyl-20-oxo-4-pregneno-[3,2-d]-1',2',3'-triazole;
11β,17α,21-trihydroxy-16β-methyl-20-oxo-4-pregneno-[3,2-d]-1',2',3'-triazole;
11β,17α,21-trihydroxy-16-methylene-20-oxo-4-pregneno-[3,2-d]-1',2',3'-triazole;
9α-fluoro-11β,17α,21-trihydroxy-20-oxo-4-pregneno-[3,2-d]-1',2',3'-triazole;
6α-chloro-16α-fluoro-11β,17α,21-trihydroxy-20-oxo-4-pregneno-[3,2-d]-1',2',3'-triazole;
6α-chloro-11β,17α,21-trihydroxy-16α-methyl-20-oxo-4-pregneno-[3,2-d]-1',2',3'-triazole;
6α-chloro-11β,17α,21-trihydroxy-16β-methyl-20-oxo-4-pregneno-[3,2-d]-1',2',3'-triazole;
6α-chloro-11β,17α,21-trihydroxy-16-methylene-20-oxo-4-pregneno-[3,2-d]-1',2',3'-triazole;
6α-chloro-9α-fluoro-11β-17α,21-trihydroxy-20-oxo-4-pregneno-[3,2-d]-1',2',3'-triazole;
6α,16α-difluoro-11β,17α,21-trihydroxy-20-oxo-4-pregneno-[3,2-d]-1',2',3'-triazole;
6α-fluoro-11β,17α,21-trihydroxy-16α-methyl-20-oxo-4-pregneno-[3,2-d]-1',2',3'-triazole;
6α-fluoro-11β,17α,21-trihydroxy-16β-methyl-20-oxo-4-pregneno-[3,2-d]-1',2',3'-triazole;
6α-fluoro-11β-17α,21-trihydroxy-16-methylene-20-oxo 4-pregneno-[3,2-d]-1',2',3'-triazole;
6α,9α-difluoro-11β,17α,21-trihydroxy-20-oxo-4-pregneno-[3,2-d]-1',2',3'-triazole;
16α-fluoro-11β,17α,21-trihydroxy-6α-methyl-20-oxo-4-pregneno-[3,2-d]-1',2',3'-triazole;
11β,17α,21-trihydroxy-6α,16α-dimethyl-20-oxo-4-pregneno-[3,2-d]-1',2',3'-triazole;
11β,17α,21-trihydroxy-6α,16β-dimethyl-20-oxo-4-pregneno-[3,2-d]-1',2',3'-triazole;
11β,17α,21-trihydroxy-6α-methyl-16-methylene-20-oxo-4-pregneno-[3,2-d]-1',2',3'-triazole;
9α-fluoro-11β,17α,21-trihydroxy-6α-methyl-20-oxo-4-pregneno-[3,2-d]1',2',3'-triazole;
16α-fluoro-11β,17α,21-trihydroxy-6β-methyl-20-oxo-4-pregneno-[3,2-d]-1',2',3'-triazole;
11β,17α,21-trihydroxy-6β,16α-dimethyl-20-oxo-4-pregneno-[3,2-d]-1',2',3'-triazole;
11β,17α,21-trihydroxy-6β,16β-dimethyl-20-oxo-4-pregneno-[3,2-d]-1',2',3'-triazole;
11β,17α,21-trihydroxy-6β-methyl-16-methylene-20-oxo-4-pregneno-[3,2-d]-1',2',3'-triazole;
9α-fluoro-11β,17α,21-trihydroxy-6β-methyl-20-oxo-4-pregneno-[3,2-d]-1',2',3-triazole;
9α,16α-difluoro-11β,17α,21-trihydroxy-20-oxo-4-pregneno-[3,2-d]-1',2',3'-triazole;
9α-fluoro-11β,17α,21-trihydroxy-16α-methyl-20-oxo-4-pregneno-[3,2-d]-1',2',3'-triazole;
9α-fluoro-11β,17α,21-trihydroxy-16β-methyl-20-oxo-4-pregneno-[3,2-d]-1',2',3'-triazole;
9a-fluoro-11β,17α,21-trihydroxy-16-methylene-20-oxo-4-pregneno-[3,2-d]-1',2',3'-triazole;
6α-chloro-9α,16α-difluoro-11β,17a,21-trihydroxy-20-oxo-4-pregneno-[3,2-d]-1',2',3'-triazole;
6α-chloro-9α-fluoro-11β,17α,21-trihydroxy-16α-methyl-20-oxo-4-pregneno-[3,2-d]-1',2',3'-triazole;
6α-chloro-9α-fluoro-11β,17α,21-trihydroxy-16β-methyl-20-oxo-4-pregneno-[3,2-d]-1',2',3'-triazole;
6α-chloro-9α-fluoro-11β,17α,21-trihydroxy-16-methylene-20-oxo-4-pregneno-[3,2-d]-1',2',3'-triazole;
6α,9α,16α-trifluoro-11β,17α,21-trihydroxy-20-oxo-4-pregneno-[3,2-d]-1',2',3'-triazole;
6α,9α-difluoro-11β,17α,21-trihydroxy-16α-methyl-20-oxo-4-pregneno-[3,2-d]-1',2',3'-triazole;
6α,9α-difluoro-11β,17α,21-trihydroxy-16β-methyl-20-oxo-4-pregneno-[3,2-d]-1',2',3'-triazole;
6α,9α-difluoro-11β,17α,21-trihydroxy-16-methylene-20-oxo-4-pregneno-[3,2-d]-1',2',3'-triazole;
9α,16α-difluoro-11β,17α,21-trihydroxy-6α-methyl-20-oxo-4-pregneno-[3,2-d]-1',2',3'-triazole;
9α-fluoro-11β,17α,21-trihydroxy-6α,16α-dimethyl-20-oxo-4-pregneno-[3,2-d]-1',2',3'-triazole;
9α-fluoro-11β,17α,21-trihydroxy-6α,16β-dimethyl-20-oxo-4-pregneno-[3,2-d]-1',2',3'-triazole;
9α-fluoro-11β,17α,21-trihydroxy-6α-methyl-16-methylene-20-oxo-4-pregneno-[3,2-d]-1',2',3'-triazole;
9α,16α-difluoro-11β,17α,21-trihydroxy-6β-methyl-20-oxo-4-pregneno-[3,2-d]-1',2',3'-triazole;
9α-fluoro-11β,17α,21-trihydroxy-6β,16α-dimethyl-20-oxo-4-pregneno-[3,2-d]-1',2',3'-triazole;
9α-fluoro-11β,17α,21-trihydroxy-6β,16β-dimethyl-20-oxo-4-pregneno-[3,2-d]-1',2',3'-triazole;
9α-fluoro-11β,17α,21-trihydroxy-6β-methyl-16-methylene-20-oxo-4-pregneno-[3,2-d]-1',2',3'-triazole;
and the 11-keto analogues of the aforesaid compounds;
17α,21-dihydroxy-20-oxo-4-pregneno-[3,2-d]-1',2',3'-triazole;
6α-chloro-17α,21-dihydroxy-20-oxo-4-pregneno-[3,2-d]-1',2',3'-triazole;
6α-fluoro-17α,21-dihydroxy-20-oxo-4-pregneno-[3,2-d]-1',2',3'-triazole;
17α,21-dihydroxy-6α-methyl-20-oxo-4-pregneno-[3,2-d]-1',2',3'-triazole;
17α,21-dihydroxy-6β-methyl-20-oxo-4-pregneno-[3,2-d]-1',2',3'-triazole;
16α-fluoro-17α,21-dihydroxy-20-oxo-4-pregneno-[3,2-d]-1',2',3'-triazole;
17α,21-dihydroxy-16α-methyl-20-oxo-4-pregneno-[3,2-d]-1',2',3'-triazole;
17α,21-dihydroxy-16β-methyl-20-oxo-4-pregneno-[3,2-d]-1',2',3'-triazole;
17α,21-dihydroxy-16-methylene-20-oxo-4-pregneno-[3,2-d]-1',2',3'-triazole;
6α-chloro-16α-fluoro-17α,21-dihydroxy-20-oxo-4-pregneno-[3,2-d]-1',2',3'-triazole;
6α-chloro-17α,21-dihydroxy-16α-methyl-20-oxo-4-pregneno-[3,2-d]-1',2',3'-triazole;
6α-chloro-17α,21-dihydroxy-16β-methyl-20-oxo-4-pregneno-[3,2-d]-1',2',3'-triazole;
6α-chloro-17α,21-dihydroxy-16-methylene-20-oxo-4-pregneno-[3,2-d]-1',2',3'-triazole;
6α,16α-difluoro-17α,21-dihydroxy-20-oxo-4-pregneno-[3,2-d]-1',2',3'-triazole;

6α-fluoro-17α,21-dihydroxy-16α-methyl-20-oxo-4-pregneno-[3,2-d]-1',2',3'-triazole;
6α-fluoro-17α,21-dihydroxy-16β-methyl-20-oxo-4-pregneno-[3,2-d]-1',2',3'-triazole;
6α-fluoro-17α,21-dihydroxy-16-methylene-20-oxo-4-pregneno-[3,2-d]-1',2',3'-triazole;
16α-fluoro-17α,21-dihydroxy-6α-methyl-20-oxo-4-pregneno-[3,2-d]-1',2',3'-triazole;
17α,21-dihydroxy-6α,16α-dimethyl-20-oxo-4-pregneno-[3,2-d]-1',2',3'-triazole;
17α,21-dihydroxy-6α,16β-dimethyl-20-oxo-4-pregneno-[3,2-d]-1',2',3'-triazole;
17α21-dihydroxy-6α-methyl-16-methylene-20-oxo-4-pregneno-[3,2-d]-1',2',3'-triazole;
16α-fluoro-17α,21-dihydroxy-6β-methyl-20-oxo-4-pregneno-[3,2-d]-1',2',3'-triazole;
17α,21-dihydroxy-6β,16α-dimethyl-20-oxo-4-pregneno-[3,2-d]-1',2',3'-triazole;
17α,21-dihydroxy-6β,16β-dimethyl-20-oxo-4-pregneno-[3,2-d]-1',2',3'-triazole;
17α,21-dihydroxy-6β-methyl-16-methylene-20-oxo-4-pregneno-[3,2-d]-1',2',3'-triazole;
6α,9α,11β-trichloro-17α,21-dihydroxy-20-oxo-4-pregneno-[3,2-d]-1',2',3'-triazole;
9α,11β-dichloro-6α-fluoro-17α,21-dihydroxy-20-oxo-4-pregneno-[3,2-d]-1',2',3'-triazole;
9α,11β-dichloro-17α,21-dihydroxy-6α-methyl-20-oxo-4-pregneno-[3,2-d]-1',2',3'-triazole;
9α,11β-dichloro-17α,21-dihydroxy-6β-methyl-20-oxo-4-pregneno-[3,2-d]-1',2',3'-triazole;
9α,11β-dichloro-16α-fluoro-17α,21-dihydroxy-20-oxo-4-pregneno-[3,2-d]-1',2',3'-triazole;
9α,11β-dichloro-17α,21-dihydroxy-16α-methyl-20-oxo-4-pregneno-[3,2-d]-1',2',3'-triazole;
9α,11β-dichloro-17α,21-dihydroxy-16β-methyl-20-oxo-4-pregneno-[3,2-d]-1',2',3'-triazole;
17α,21-dihydroxy-16-methylene-20-oxo-4-pregneno-[3,2-d]-1',2',3'-triazole;
6α,9α,11β-trichloro-16α-fluoro-17α,21-dihydroxy-20-oxo-4-pregneno-[3,2-d]-1',2',3'-triazole;
6α,9α,11β-trichloro-17α,21-dihydroxy-16α-methyl-20-oxo-4-pregneno-[3,2-d]-1',2',3'-triazole;
6α,9α,11β-trichloro-17α,21-dihydroxy-16β-methyl-20-oxo-4-pregneno-[3,2-d]-1',2',3'-triazole;
6α,9α,11β-trichloro-17α,21-dihydroxy-16-methylene-20-oxo-4-pregneno-[3,2-d]-1',2',3'-triazole;
9α,11β-dichloro-6α,16α-difluoro-17α,21-dihydroxy-20-oxo-4-pregneno-[3,2-d]-1',2',3'-triazole;
9α,11β-dichloro-6α-fluoro-17α,21-dihydroxy-16α-methyl-20-oxo-4-pregneno-[3,2-d]-1',2',3'-triazole;
9α,11β-dichloro-6α-fluoro-17α,21-dihydroxy-16β-methyl-20-oxo-4-pregneno-[3,2-d]-1',2',3'-triazole;
9α,11β-dichloro-6α-fluoro-17α,21-dihydroxy-16-methylene-20-oxo-4-pregneno-[3,2-d]-1',2',3'-triazole;
9α,11β-dichloro-16α-fluoro-17α,21-dihydroxy-6α-methyl-20-oxo-4-pregneno-[3,2-d]-1',2',3'-triazole-9α,11β-dichloro-17α,21-dihydroxy-6α,16α-dimethyl-20-oxo-4-pregneno-[3,2-d]-1',2',3'-triazole;
9α,11β-dichloro-17α,21-dihydroxy-6α,16β-dimethyl-20-oxo-4-pregneno-[3,2-d]-1',2',3'-triazole;
9α,11β-dichloro-17α,21-dihydroxy-6α-methyl-16-methylene-20-oxo-4-pregneno-[3,2-d]-1',2',3'-triazole;
9α,11β-dichloro-16α-fluoro-17α,21-dihydroxy-6β-methyl-20-oxo-4-pregneno-[3,2-d]-1',2',3'-triazole;
9α,11β-dichloro-17α,21-dihydroxy-6β,16α-dimethyl-20-oxo-4-pregneno-[3,2-d]-1',2',3'-triazole;
9α,11β-dichloro-17α,21-dihydroxy-6β,16β-dimethyl-20-oxo-4-pregneno-[3,2-d]-1',2',3'-triazole;
9α,11β-dichloro-17α,21-dihydroxy-6β-methyl-16-methylene-20-oxo-4-pregneno-[3,2-d]-1',2',3'-triazole, and the 1',2', and 3'-alkyl-; the 1',2' and 3'-cycloalkyl-; the 1',2' and 3'-aryl (including particularly the phenyl and the (p-fluorophenyl)-derivatives thereof); likewise the Δ$^{4,6}$-analogues of all of the aforesaid compounds.

Any acyl groups present at the 21-position and/or on a triazole nitrogen may be removed by treating the steroid with sodium methoxide in methanol at room temperature to form the corresponding 17α,21-dihydroxy-20-oxo-4-pregneno- (or 4,6-pregnadieno)-[3,2-d]triazole.

The N-acyl-21-acylate derivatives of the above described 17α,21-dihydroxy-20-oxo-4-pregneno-(or 4,6-pregnadieno)-[3,2-d]triazoles in which both acyl groups are the same (Compound 82 of Flow Sheet Q) may be prepared by reacting a 17α,21-dihydroxy-20-oxo-4-pregneno- (or 4,6-pregnadieno)-[3,2-d]triazole in which $R_5$ is hydrogen with two equivalents of an acylating agent.

The 21-acyl derivatives of the above described triazoles in which $R_5$ is H (Compound 82 of Flow Sheet Q) may be prepared by heating an N-acyl-17α,21-dihydroxy-20-oxo-4-pregneno- (or 4,6-pregnadieno)-[3,2-d]triazole 21-acylate with aqueous acetic acid, whereupon the N-acyl group is selectively removed.

Acylating agents which can be used for this purpose include a lower hydrocarbon carboxylic acid acylating agent such as benzoic anhydride, tertiary butyl acetyl chloride; a lower alkanoic anhydride or lower alkanoyl halide such as acetic anhydride, propionic anhydride or acetyl chloride; or a polybasic anhydride such as β,β-dimethylglutaric anhyride, succinic anhydride and the like, in the presence of an organic base such as pyridine.

The 17α,21 - dihydroxy-20-oxo-4-pregneno- (or 4,6-pregnadieno)-[3,2-d]triazole is reacted with methane sulfonyl chloride in a non-aqueous base to form the 21-mesylate (Compound 80). A steroid in which $R_5$ is hydrogen is first converted to the N-carbamyl derivative before undergoing this reaction.

The 21-mesylate is heated with an alkali iodide to form the 21-iodo-compound (Compound 81). In a preferred method for carrying out this reaction, sodium iodide is added to the steroid dissolved in acetone and the resulting mixture is heated at reflux temperature for approximately one hour.

The 21-iodo-20-oxo-4-pregneno- (or 4,6-pregnadieno)-[3,2-d]-triazole is heated with an alkali bisulfite in a solvent to form the corresponding 21-desoxy-compound (Compound 84). A preferred method is to add sodium bisulfite to a suspension of the steroid in aqueous ethanol and then heat the mixture under reflux for a period of about an hour. Any carbamyl group present at $R_5$ may be removed by treating the steroid in glacial acetic acid with sodium nitrite.

Thus the novel compounds of our invention which are formed from the above reaction include the 21-desoxy derivatives of all of the compounds listed in columns 5 to 8.

The 21-fluoro-17α-hydroxy-20-oxo-4-pregneno - (and 4,6-pregnadieno)-[3,2-d]triazoles (Compound 83 of Flow Sheet Q) are prepared from the corresponding 21-mesylate by heating with an alkali fluoride in a solvent to form a mixture of a 17α,21-epoxy-compound and the corresponding 21-fluoro compound. These compounds are separated by partition chromatography, or by chromatography on a weak adsorbent such as silica gel. There are thus obtained the 21-fluoro-analogues of all of the 21-hydroxy compounds named in columns 5 to 8.

The 21-chloro-17α-hydroxy-20-oxo-4-pregneno - (and 4,6-pregnadieno)-[3,2-d]triazoles (Compound 83 of Flow Sheet Q) are prepared from the corresponding 21-mesylate by heating with lithium chloride, conveniently in a solvent such as dimethylformamide for about one hour. There are thus obtained the 21-chloro-analogues of all of the 21-hydroxy-compounds named in columns 5 to 8.

The 21-hydroxy-, 21-desoxy-, 21-fluoro-, and 21-chloro-steroids, wherein H is present at the 16-position, are converted into the 16α,17α-dihydroxy-steroids (Compounds 93 of Flow Sheet Q) by following the procedures of Example 24.

The 16α,17α-dihydroxy-steroids are converted into the corresponding 16α,17α-acetals or ketals (Compound 94 of Flow Sheet Q) by treating with a carbonyl reactant of the general formula:

$$O=C\begin{matrix}P\\Q\end{matrix}$$

wherein P and Q are each selected from the group consisting of hydrogen, alkyl, and aryl, and together with the carbon to which they are joined, P and Q are cycloalkyl. For example, a suspension of the free 16α,17α-diol in a ketone or aldehyde is treated with a trace of perchloric acid and stirred at room temperature until solution is complete. The ketones and aldehydes which are suitable for this purpose include acetaldehyde, methyl ethyl ketone, cyclohexanone, and acetophenone. In a preferred embodiment of our invention acetone is used.

The 21-dihydrogen phosphate esters (Compound 85 of Flow Sheet Q) of all of the 21-hydroxy-compounds listed in columns 5 to 8, are prepared by the reaction of the corresponding 21-iodo compound (Compound 81 of Flow Sheet Q) with a mixture of silver phosphate and phosphoric acid. Both the mono- and dialkali metal salts may be obtained by neutralization of the dihydrogen phosphate ester with an alkali methoxide. Treatment with additional amounts of alkali methoxide will convert an N-acyl-steroid ($R_5$=acyl) into the free amine ($R_5$=H)dialkali metal salt from which the dihydrogen phosphate can be obtained by contacting with an ion exchange resin.

All of the 4-pregneno-(and 4,6-pregnadieno)-[3,2-d]-triazoles described in the foregoing structures form salts such as the hydrochloride, sulfate, chlorate, perchlorate, picrate and trichloracetate, on treatment with the corresponding acid. Formation of crystalline salts, especially the hydrochloric salts, provides a means of isolating the triazole.

A further embodiment of our invention comprises novel pharmaceutical compositions containing the novel 4-pregneno-(and 4,6-pregnadieno)-[3,2-d]triazoles exemplified in the foregoing structures.

The following examples illustrate methods of carrying out the present invention but it is to be understood that these examples are given for purposes of illustration and not of limitation. Details of the above described reactions are to be found in the examples.

FLOW SHEET A

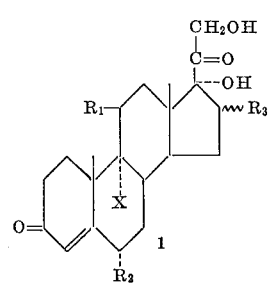

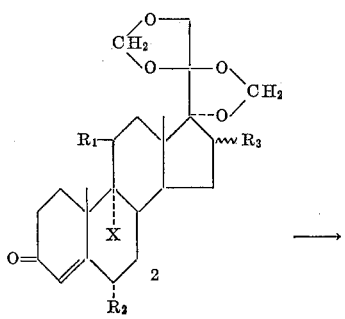

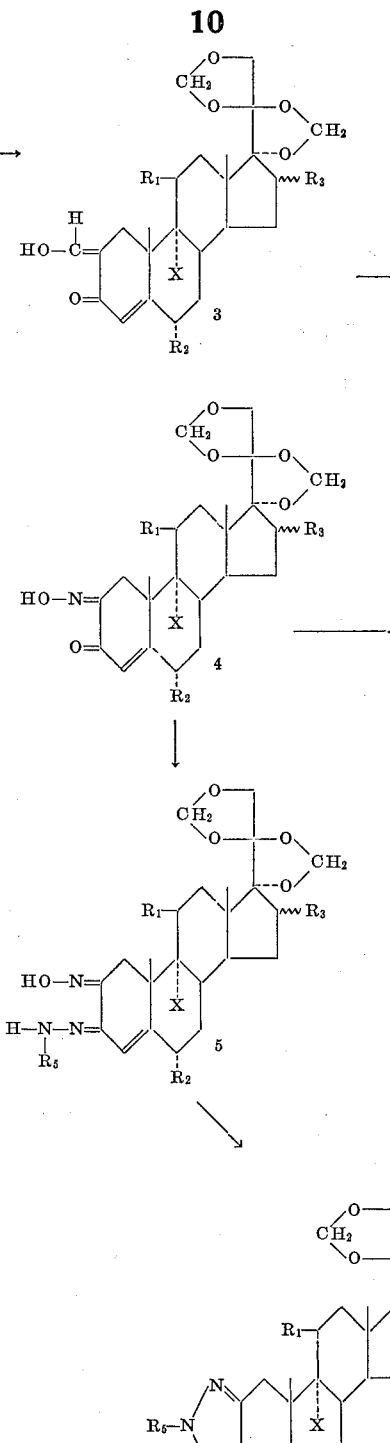

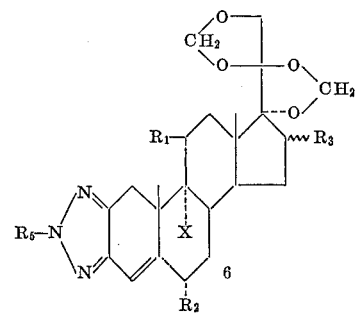

wherein $R_1$ is a member of the group consisting of hydrogen, 11β-hydroxy-, 11β-chloro- and keto-, but chloro is present at $R_1$ only when X is chloro, and hydrogen is present at $R_1$ only when X is hydrogen; $R_2$ is a member of the group consisting of hydrogen, α-chloro-, α-fluoro-, α-methyl- and $R_3$ is a member of the group consisting of hydrogen-, α-fluoro-, α-methyl-, β-methyl- and methylene-; $R_5$ is a member of the group consisting of hydrogen-, alkyl-, aralkyl-, cycloalkyl-, aryl, a heterocyclic nucleus, and substituted derivatives thereof; and X is a member of the group consisting of hydrogen and halogen. This Flow Sheet also includes the $\Delta^{4,6}$-analogues of the compounds shown.

FLOW SHEET B

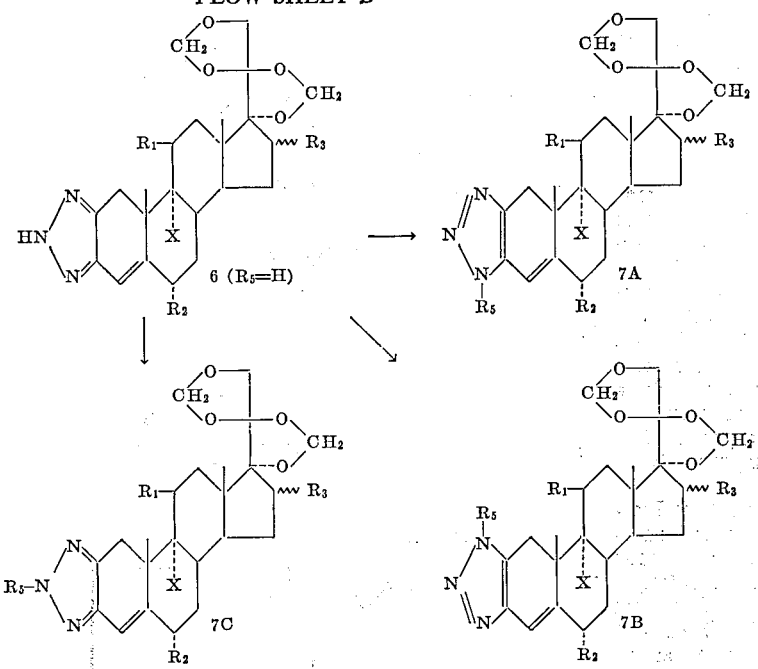

wherein $R_1$ is a member of the group consisting of hydrogen-, 11β-hydroxy-, 11β-chloro- and keto-, but chloro is present at $R_1$ only when X is chloro-, and hydrogen is present at $R_1$ only when X is hydrogen; $R_2$ is a member of the group consisting of hydrogen-, α-chloro-, α-fluoro- and α-methyl-, $R_3$ is a member of the group consisting of hydrogen-, α-fluoro-, α-methyl-, β-methyl- and methylene; $R_5$ is alkyl; and X is a member of the group consisting of hydrogen and halogen. The Flow Sheet also includes the $\Delta^{4,6}$-analogues of the compounds shown.

FLOW SHEET C

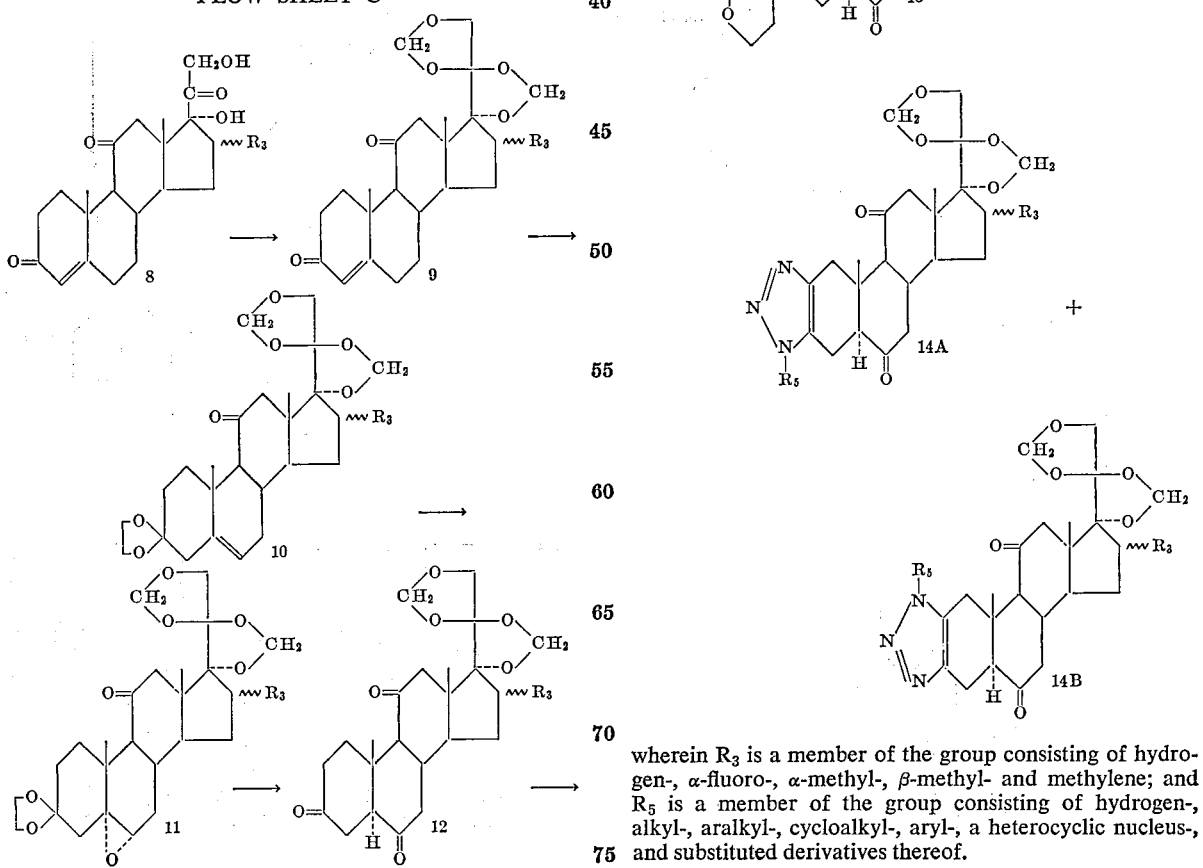

wherein $R_3$ is a member of the group consisting of hydrogen-, α-fluoro-, α-methyl-, β-methyl- and methylene; and $R_5$ is a member of the group consisting of hydrogen-, alkyl-, aralkyl-, cycloalkyl-, aryl-, a heterocyclic nucleus-, and substituted derivatives thereof.

FLOW SHEET D

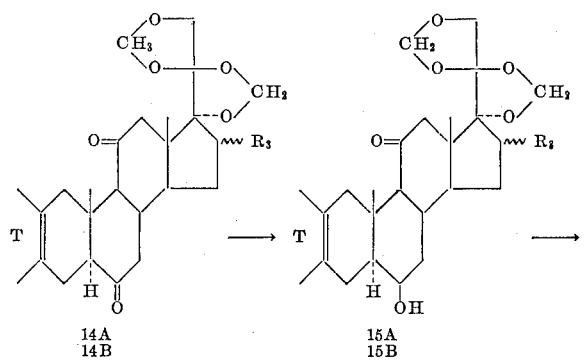

14A
14B 15A
15B

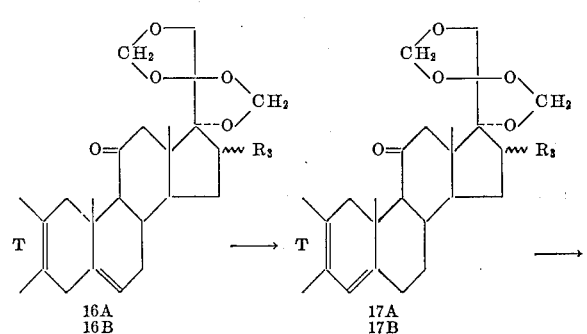

16A
16B 17A
17B

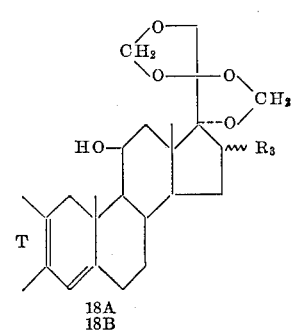

18A
18B wherein $R_3$ is a member of the group consisting of hydrogen-, α-fluoro-, α-methyl-, β-methyl- and methylene- and $R_5$ is a member of the group consisting of hydrogen-, alkyl-, aralkyl-, cycloalkyl-, aryl, a heterocyclic nucleus, and substituted derivatives thereof. The broken ring designated as "T" is the triazole ring, the structure of the triazole ring in the "A" compounds being the same as that of compound 14A, and the structure of the triazole ring in the "B" compounds being the same as that of compound 14B of Flow Sheet C.

FLOW SHEET E

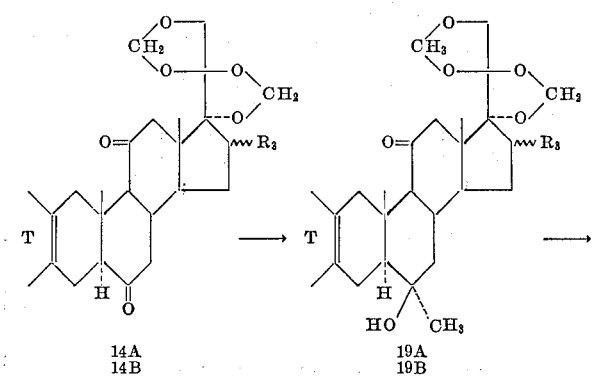

14A
14B 19A
19B

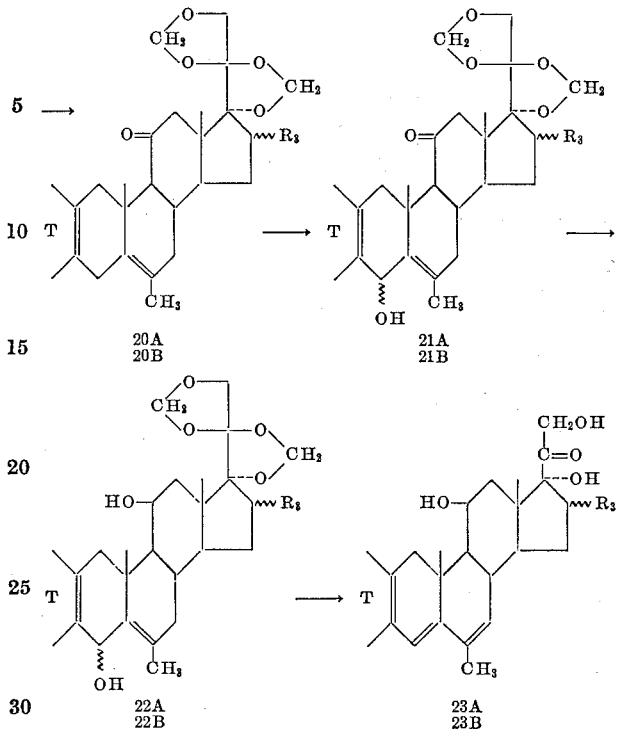

20A
20B 21A
21B 22A
22B 23A
23B wherein $R_3$ is a member of the group consisting of hydrogen-, α-fluoro-, α-methyl-, β-methyl- and methylene; $R_4$ is a member of the group consisting of hydrogen-, acyloxy-, chloro- and fluoro- and $R_5$ is a member of the group consisting of hydrogen-, alkyl-, aralkyl-, cycloalkyl-, aryl, a heterocyclic nucleus, and substituted derivatives thereof. The broken ring designated as "T" is the triazole ring, the structure of the triazole ring in the "A" compounds being the same as that of compound 14A, and the structure of the triazole ring in the "B" compounds being the same as that of compound 14B of Flow Sheet C.

FLOW SHEET F

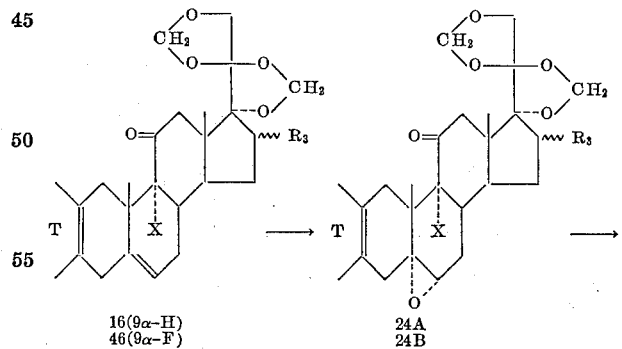

16(9α-H)
46(9α-F)

24A
24B

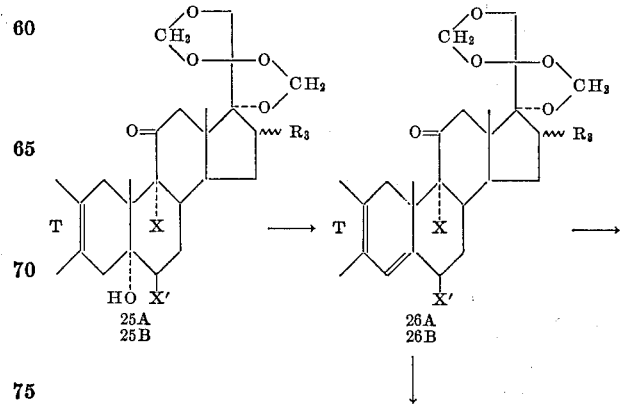

25A
25B 26A
26B

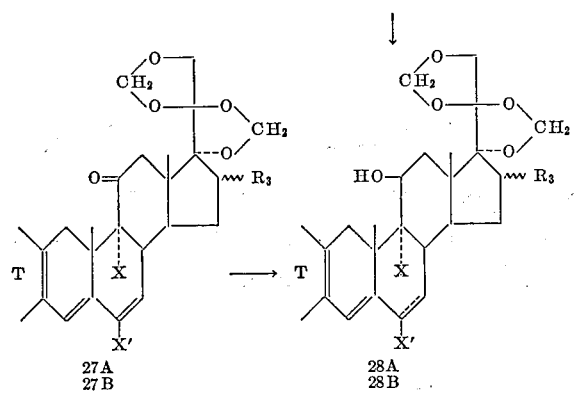

wherein $R_3$ is a member of the group consisting of hydrogen-, α-fluoro-, α-methyl-, β-methyl- and methylene-; $R_5$ is a member of the group consisting of hydrogen-, alkyl-, aralkyl-, cycloalkyl-, aryl-, a heterocyclic nucleus-, and substituted derivatives thereof; X is a member of the group consisting of hydrogen and halogen, and X' is a member of the group consisting of chloro and fluoro. The broken ring designated as "T" is the triazole ring, the structure of the triazole ring in the "A" compounds being the same as that of compound 14A, and the structure of the triazole ring in the "B" compounds being the same as that of compound 14B of Flow Sheet C.

FLOW SHEET G

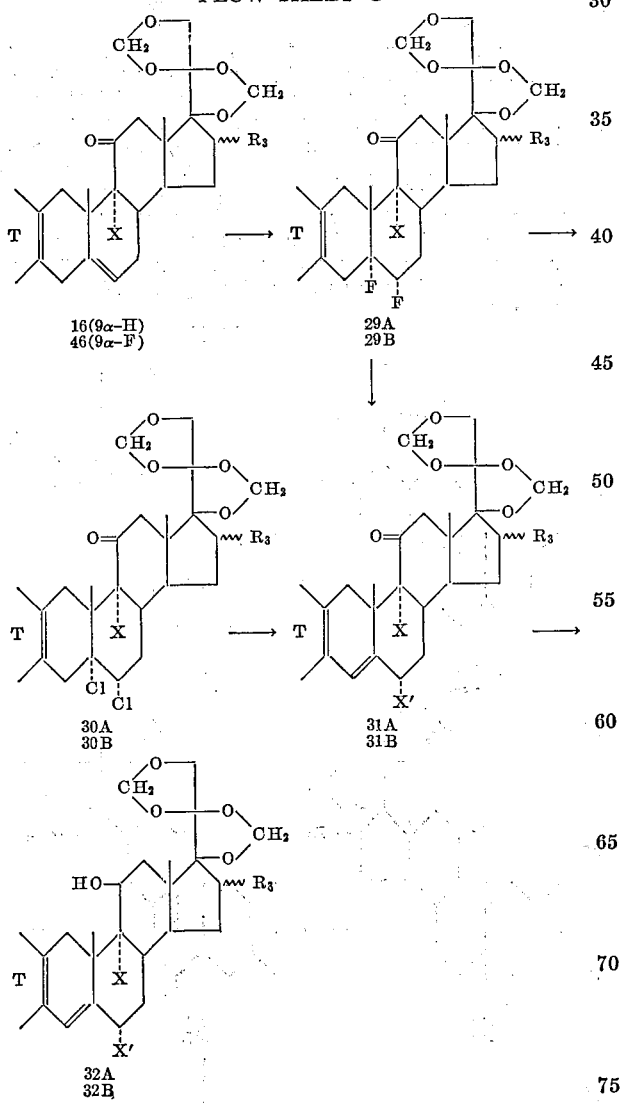

wherein $R_3$ is a member of the group consisting of hydrogen-, α-fluoro-, α-methyl-, β-methyl- and methylene-; $R_5$ is a member of the group consisting of hydrogen-, alkyl-, aralkyl-, cycloalkyl-, aryl-, a heterocyclic nucleus-, and substituted derivatives thereof; X is a member of the group consisting of hydrogen and halogen, and X' is a member of the group consisting of chloro and fluoro. The broken ring designated as "T" is the triazole ring, the structure of the triazole ring in the "A" compounds being the same as that of compound 14A, and the structure of the triazole ring in the "B" compounds being the same as that of compound 14B of Flow Sheet C.

FLOW SHEET H

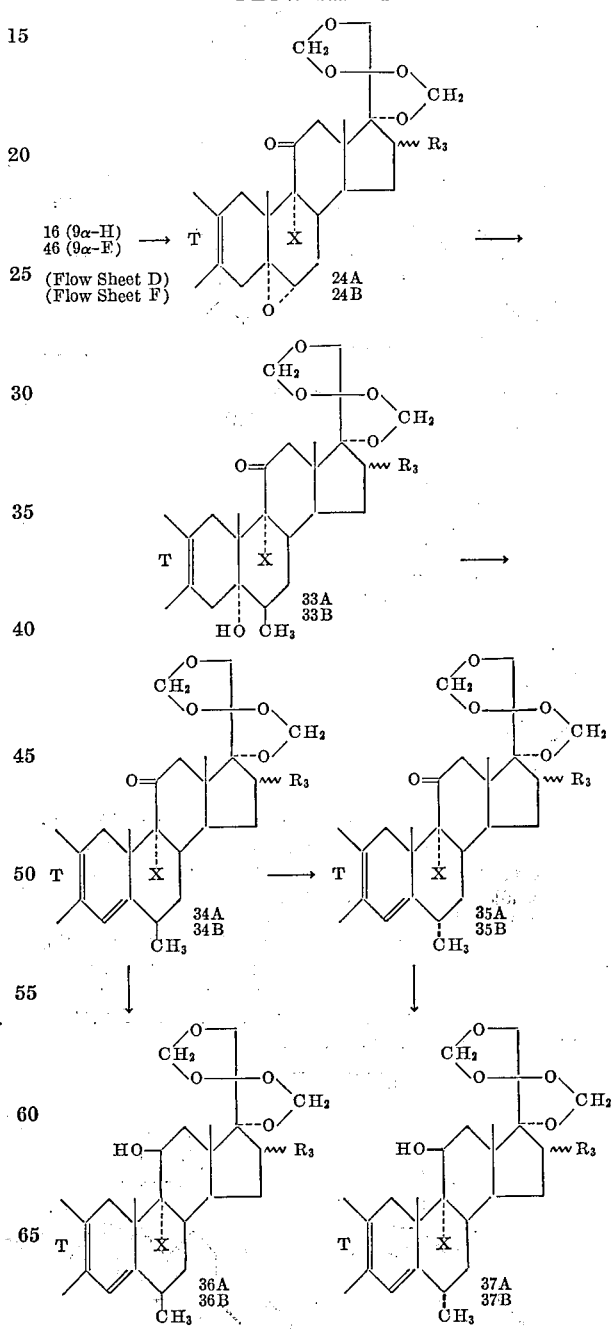

wherein $R_3$ is a member of the group consisting of hydrogen-, α-fluoro-, α-methyl-, β-methyl- and methylene; $R_5$ is a member of the group consisting of hydrogen-, alkyl-, aralkyl-, cycloalkyl-, aryl-, a heterocyclic nucleus, and substituted derivatives thereof; and X is a member of the group consisting of hydrogen- and halogen-. The broken ring designated as "T" is the triazole ring, the structure of the triazole ring in the "A" compounds being the same as that of compound 14A, and the structure of the triazole ring in the "B" compounds being the same as that of compound 14B of Flow Sheet C.

FLOW SHEET I

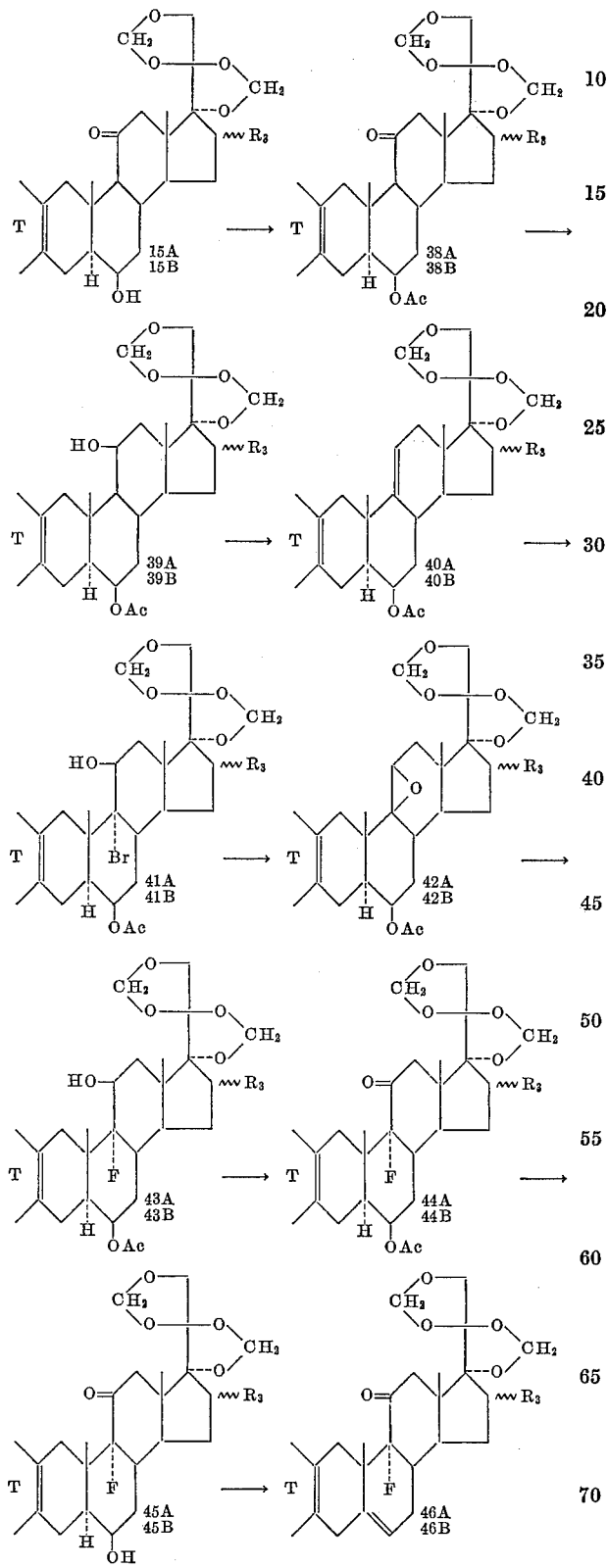

wherein $R_3$ is selected from the group consisting of hydrogen-, α-fluoro, α-methyl, β-methyl and methylene, and $R_5$ is a member of the group consisting of hydrogen-, alkyl-, aralkyl-, cycloalkyl-, aryl-, a heterocyclic nucleus-, and substituted derivatives thereof. The broken ring designated as "T" is the triazole ring, the structure of the triazole ring in the "A" compounds being the same as that of compound 14A, and the structure of the triazole ring in the "B" compounds being the same as that of compound 14B of Flow Sheet C.

FLOW SHEET J

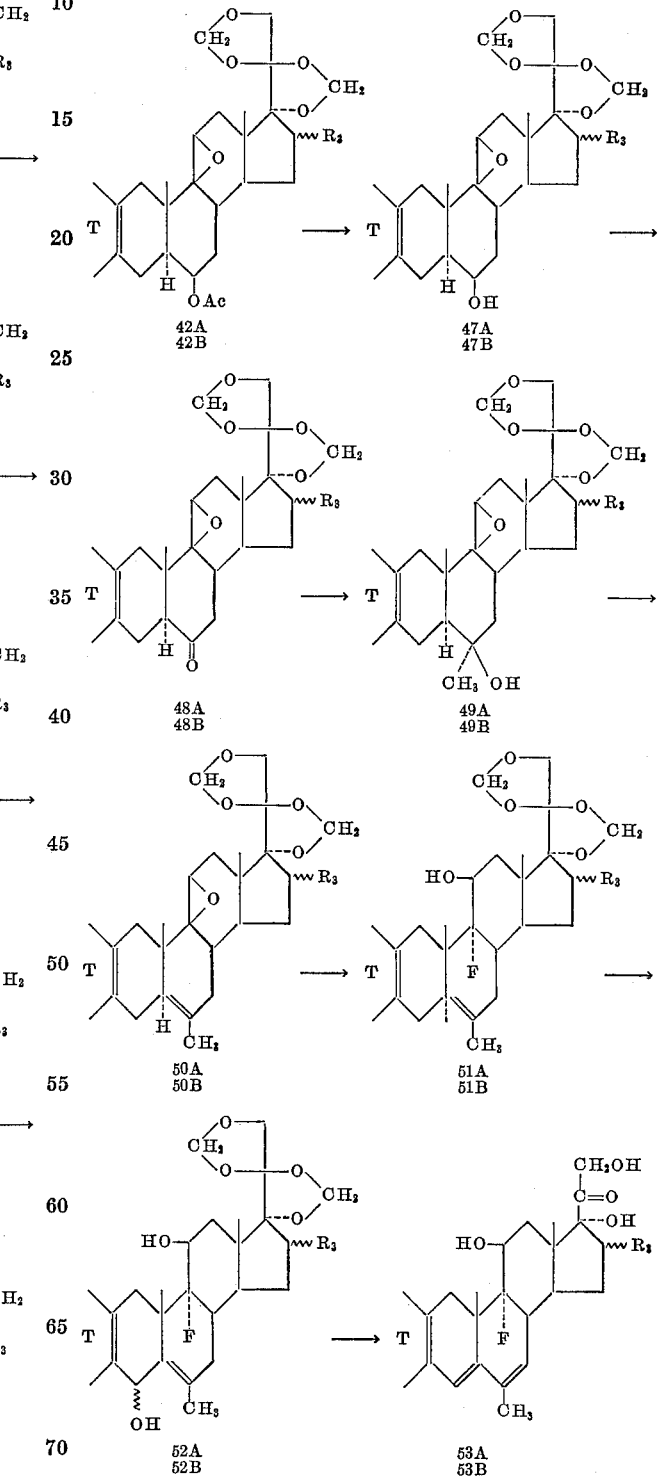

wherein $R_3$ is a member of the group consisting of hydrogen-, α-fluoro-, α-methyl-, β-methyl- and methylene- and $R_5$ is a member of the group consisting of hydrogen-, alkyl-, aralkyl-, cycloalkyl-, aryl-, a heterocyclic nucleus, and substituted derivatives thereof. The broken ring designated as "T" is the triazole ring, the structure of the triazole ring in the "A" compounds being the same as that of compound 14A, and the structure of the triazole ring in the "B" compounds being the same as that of compound 14B of Flow Sheet C.

FLOW SHEET K

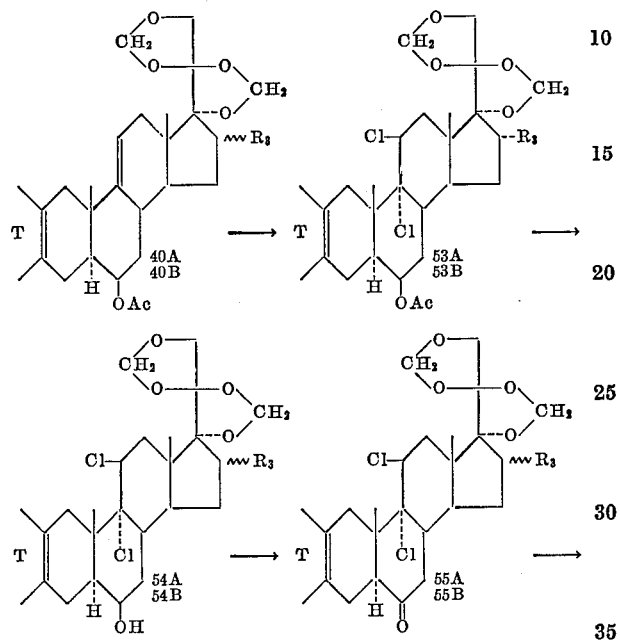

wherein $R_3$ is a member of the group consisting of hydrogen-, α-fluoro-, α-methyl-, β-methyl- and methylene-, and $R_5$ is a member of the group consisting of hydrogen-, alkyl-, aralkyl-, cycloalkyl-, aryl-, a heterocyclic nucleus, and substituted derivatives thereof. The broken ring designated as "T" is the triazole ring, the structure of the triazole ring in the "A" compounds being the same as that of compound 14A, and the structure of the triazole ring in the "B" compounds being the same as that of Compound 14B of Flow Sheet C.

FLOW SHEET L

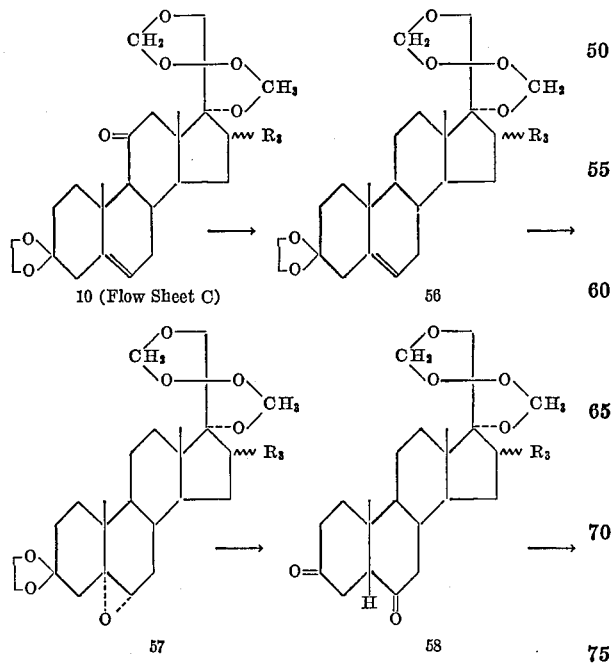

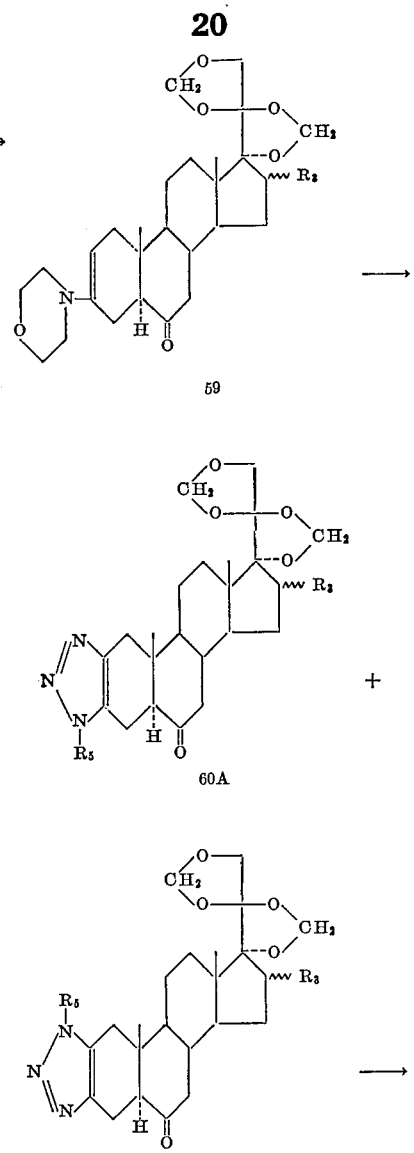

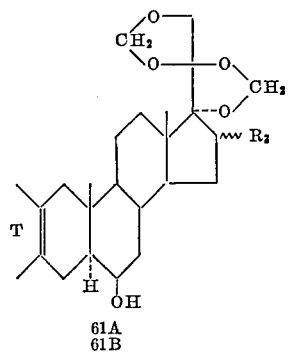

wherein $R_3$ is a member of the group consisting of hydrogen-, α-fluoro-, α-methyl-, β-methyl- and methylene-, and $R_5$ is a member of the group consisting of hydrogen-, alkyl-, aralkyl-, cycloalkyl-, aryl-, a heterocyclic nucleus, and substituted derivatives thereof. The broken ring designated as "T" is the triazole ring, the structure of the triazole ring in the "A" compounds being the same as that of Compound 60A, and the structure of the triazole ring in the "B" compounds being the same as that of Compound 60B.

FLOW SHEET M

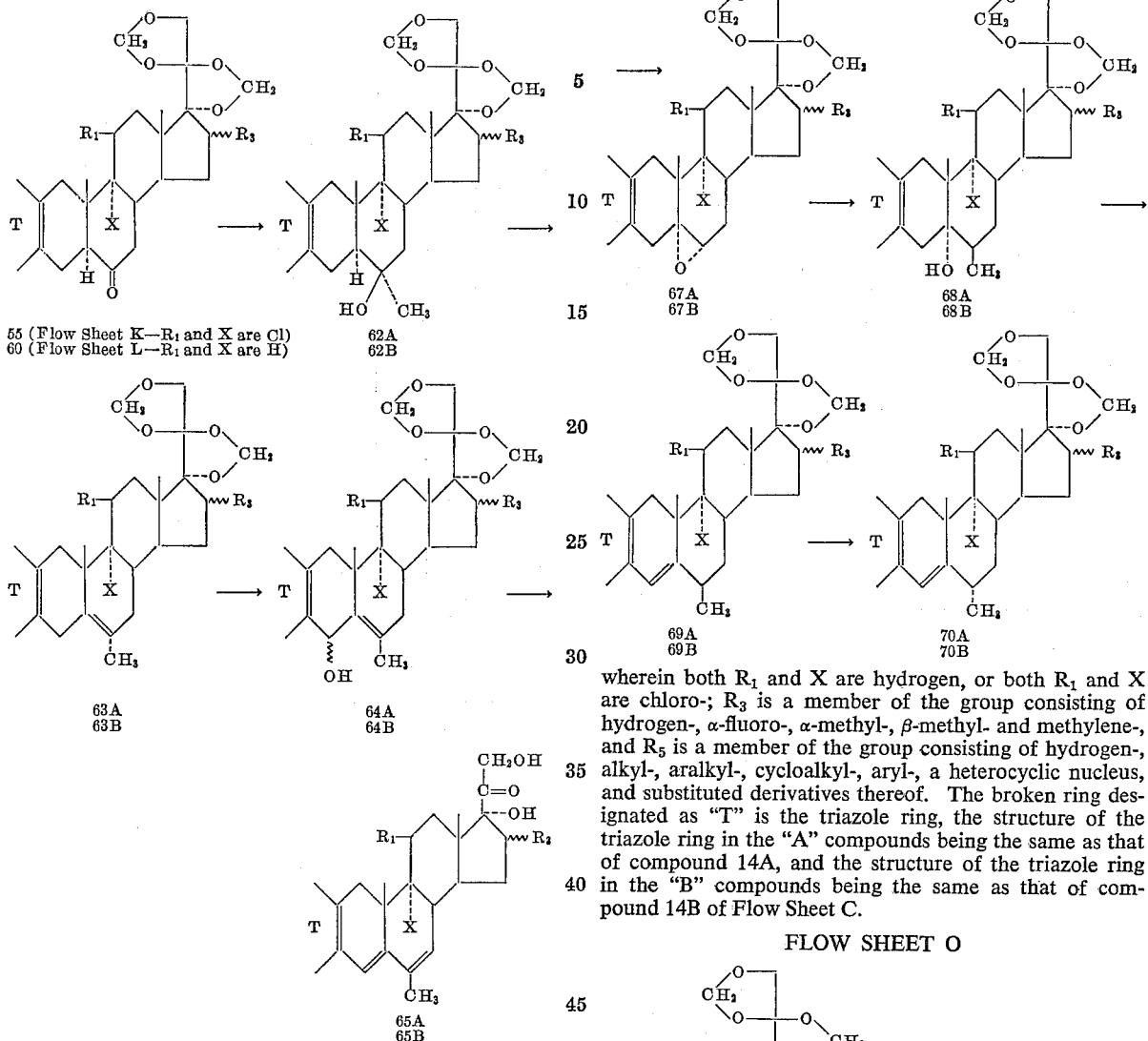

55 (Flow Sheet K—$R_1$ and X are Cl)
60 (Flow Sheet L—$R_1$ and X are H)
62A
62B
63A
63B
64A
64B
65A
65B
67A
67B
68A
68B
69A
69B
70A
70B wherein both $R_1$ and X are hydrogen-, or both $R_1$ and X are chloro-; $R_3$ is a member of the group consisting of hydrogen-, α-fluoro-, α-methyl-, β-methyl- and methylene- and $R_5$ is a member of the group consisting of hydrogen-, alkyl-, aralkyl-, cycloalkyl-, aryl-, a heterocyclic nucleus, and substituted derivatives thereof. The broken ring designated as "T" is the triazole ring, the structure of the triazole ring in the "A" compounds being the same as that of Compound 14A, and the structure of the triazole ring in the "B" compounds being the same as that of Compound 14B of Flow Sheet C.

FLOW SHEET N

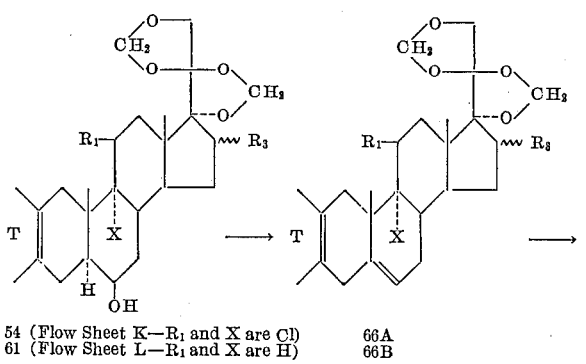

54 (Flow Sheet K—$R_1$ and X are Cl)
61 (Flow Sheet L—$R_1$ and X are H)
66A
66B wherein both $R_1$ and X are hydrogen, or both $R_1$ and X are chloro-; $R_3$ is a member of the group consisting of hydrogen-, α-fluoro-, α-methyl-, β-methyl- and methylene-, and $R_5$ is a member of the group consisting of hydrogen-, alkyl-, aralkyl-, cycloalkyl-, aryl-, a heterocyclic nucleus, and substituted derivatives thereof. The broken ring designated as "T" is the triazole ring, the structure of the triazole ring in the "A" compounds being the same as that of compound 14A, and the structure of the triazole ring in the "B" compounds being the same as that of compound 14B of Flow Sheet C.

FLOW SHEET O

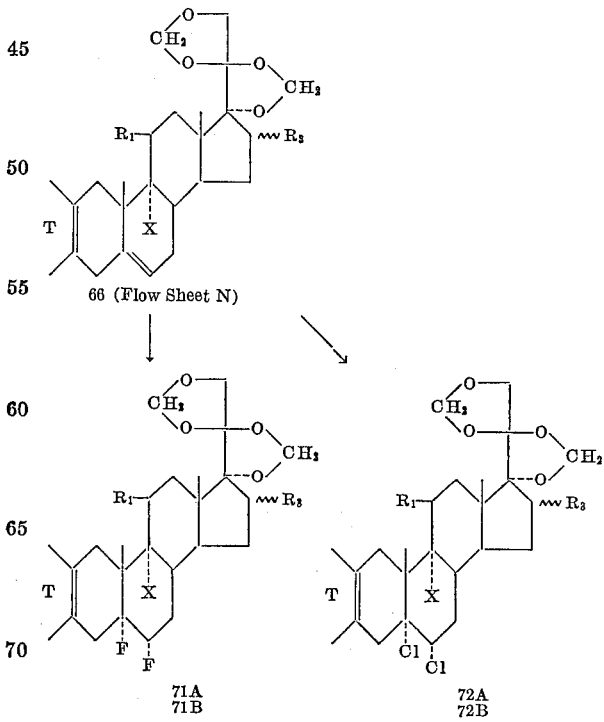

66 (Flow Sheet N)
71A
71B
72A
72B

23

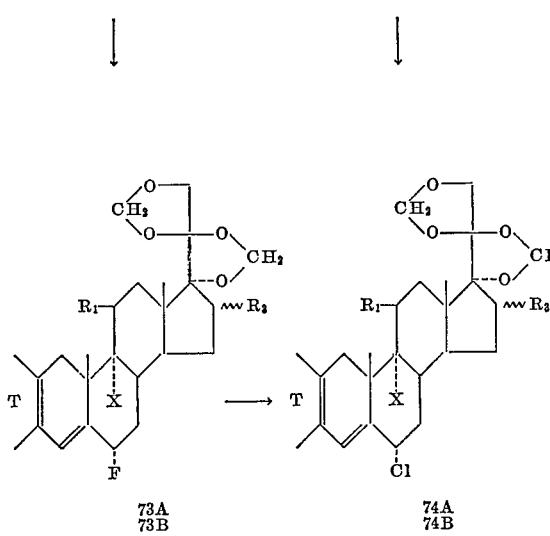

73A
73B 74A
74B wherein both $R_1$ and X are hydrogen, or both $R_1$ and X are chloro-; $R_3$ is a member of the group consisting of hydrogen-, α-fluoro-, α-methyl-, β-methyl- and methylene-, and $R_5$ is a member of the group consisting of hydrogen-, alkyl-, aralkyl-, cycloalkyl-, aryl-, a heterocyclic nucleus-, and substituted derivatives thereof. The broken ring designated as "T" is the triazole ring, the structure of the triazole ring in the "A" compounds being the same as that of compound 14A, and the structure of the triazole ring in the "B" compounds being the same as that of compound 14B of Flow Sheet C.

| | | |
|---|---|---|
| 6A, | 6B, | 6C |
| 7A, | 7B, | 7C |
| 18A, | 18B | |
| 22A, | 22B | |
| 28A, | 28B | |
| 32A, | 32B | |
| 36A, | 36B | |
| 37A, | 37B | |

| | |
|---|---|
| 53A, | 53B |
| 64A, | 64B |
| 69A, | 69B |
| 70A, | 70B |
| 73A, | 73B |
| 74A, | 74B |
| 76A, | 76B |
| 77A, | 77B |
| 88A, | 88B |
| 91A, | 91B |

24

FLOW SHEET P

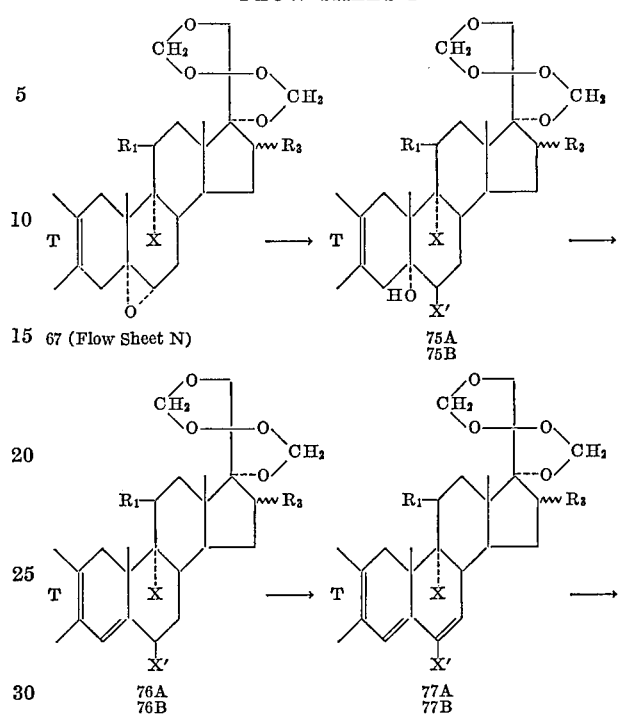

5

67 (Flow Sheet N)

75A
75B 76A
76B 77A
77B wherein both $R_1$ and X are hydrogen, or both $R_1$ and X are chloro-; $R_3$ is a member of the group consisting of hydrogen-, α-fluoro-, α-methyl-, β-methyl- and methylene-; $R_5$ is a member of the group consisting of hydrogen-, alkyl-, aralkyl-, cycloalkyl-, aryl-, a heterocyclic nucleus-, and substituted derivatives thereof, X is a member of the group consisting of hydrogen and halogen and X' is a member of the group consisting of chloro and fluoro. "T" is the triazole ring.

FLOW SHEET Q

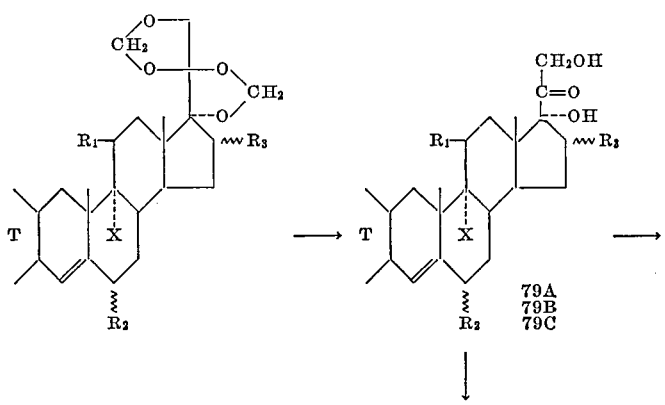

79A
79B
79C 80A
80B
80C 81A
81B
81C 82A
82B
82C

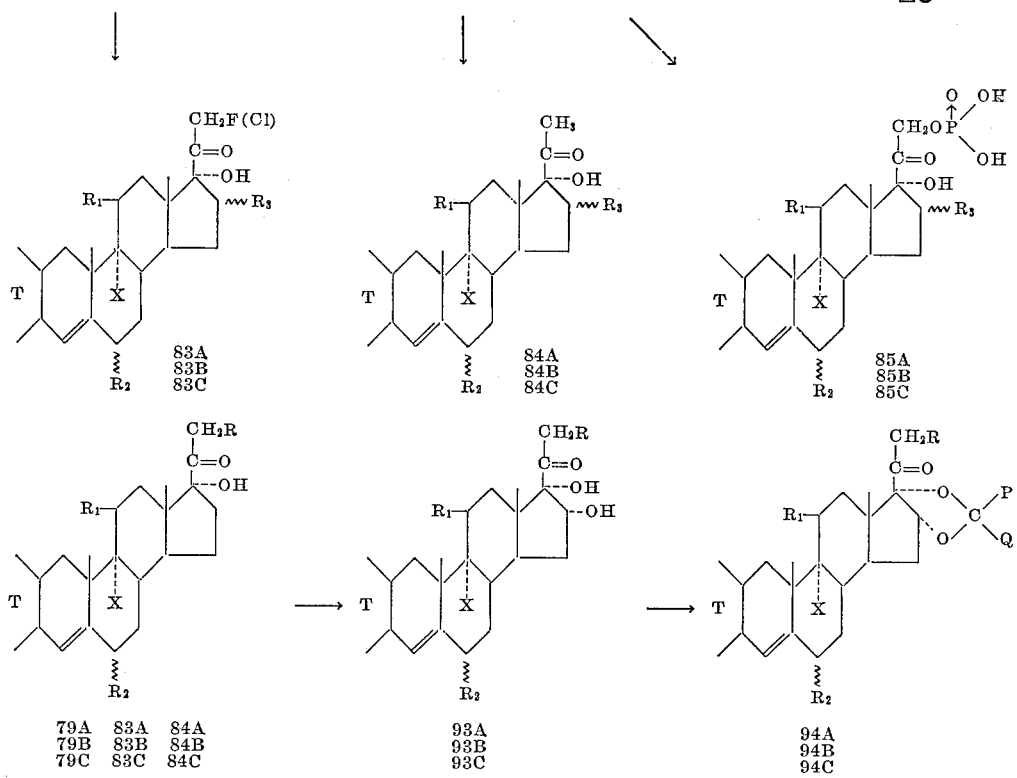

wherein $R_1$ is a member of the group consisting of hydrogen, 11β-hydroxy-, 11β-chloro- and keto-, but chloro is present at $R_1$ only when X is chloro, and hydrogen is present at $R_1$ only when X is hydrogen; $R_2$ is a member of the group consisting of hydrogen-, α-chloro-, α-fluoro-, α-methyl- and β-methyl-; $R_3$ is a member of the group consisting of hydrogen-, α-fluoro-, α-methyl-, β-methyl- and methylene-; $R_4$ is a member of the group consisting of hydrogen-, hydroxy-, chloro- and fluoro-; $R_5$ is a member of the group consisting of hydrogen-, alkyl-, aralkyl-, cycloalkyl-, aryl-, a heterocyclic nucleus, and substituted derivatives thereof; and X is a member of the group consisting of hydrogen and halogen. This Flow Sheet also includes the $\Delta^{4,6}$-analogues of the compounds shown. In Compounds 94A, 94B and 94C P and Q are each selected from the group consisting of hydrogen, alkyl and aryl, and together with the carbon to which they are joined, P and Q are cycloalkyl. The broken ring designated as "T" is the triazole ring, the structure of the triazole ring in the "A" compounds being the same as that of compound 7A, the structure of the triazole ring in the "B" compounds being the same as that of compound 7B, and the structure of the triazole ring in the "C" compounds being the same as that of compound 7C of Flow Sheet B.

FLOW SHEET R

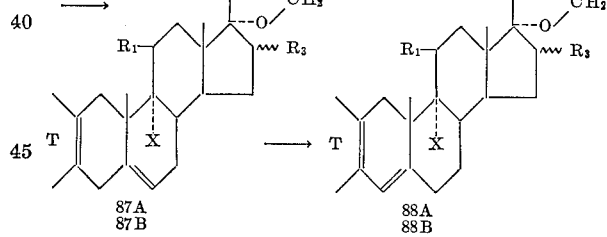

wherein both $R_1$ and X are hydrogen, or both $R_1$ and X are chloro-; $R_3$ is a member of the group consisting of hydrogen-, α-fluoro-, α-methyl-, β-methyl- and methylene-, and $R_5$ is a member of the group consisting of hydrogen-, alkyl-, aralkyl-, cycloalkyl-, aryl-, a heterocyclic nucleus, and substituted derivatives thereof. "T"=triazole ring.

FLOW SHEET S

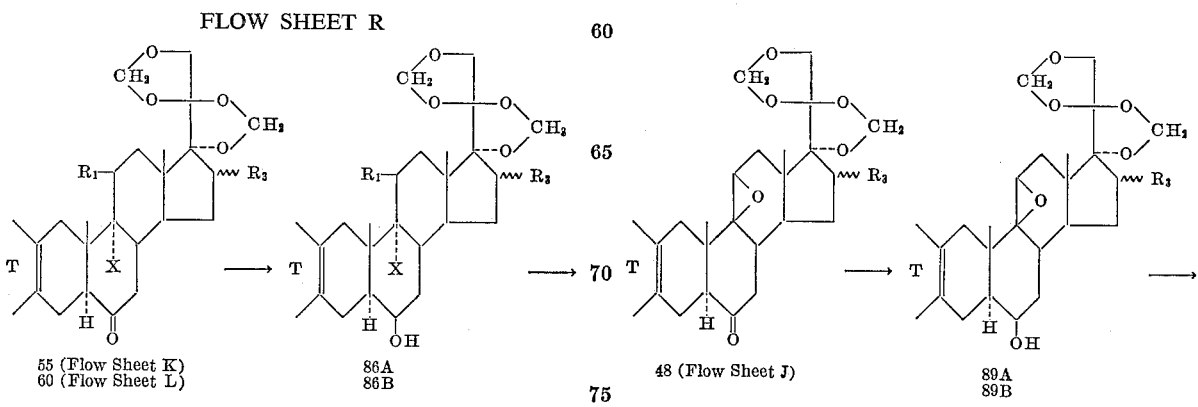

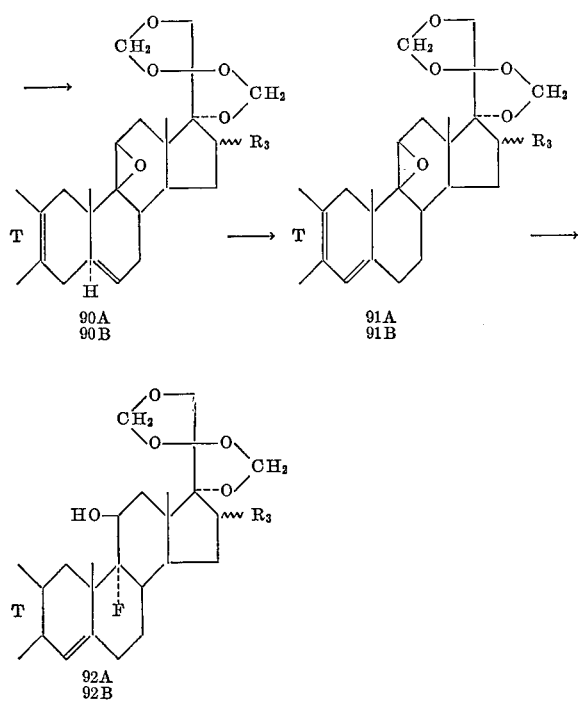

wherein $R_3$ is a member of the group consisting of hydrogen, α-fluoro, α-methyl, β-methyl, and methylene; $R_5$ is a member of the group consisting of hydrogen, alkyl, aralkyl, cycloalkyl, aryl, a heterocyclic nucleus, and substituted derivatives thereof. The broken ring designated as "T" is the triazole ring, the structure of the triazole ring in the "A" compounds being the same as that of compound 14A, and the structure of the triazole ring in the "B" compounds being the same as that of compound 14B of Flow Sheet C.

*Example 1*

The following procedures which relate to Flow Sheet A are particularly described starting with the 11β,17α,21-trihydroxy-16α-methyl-4-pregnene-3,20-dione, but are generally applicable to all of the starting materials defined by Flow Sheet A.

To a suspension of 25.0 g. of 11β,17α,21-trihydroxy-16α-methyl-4-pregnene-3,20-dione in 1.5 liter of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated under reduced pressure, to give 17α,20,20,21-bis(methylenedioxy)-11β-hydroxy-16α-methyl-4-pregnene-3-one which is used in the subsequent step of the synthesis without further purification.

A solution of 400 mg. of 17α,20,20,21-bis-(methylenedioxy)-11β-hydroxy-16α-methyl-4-pregnene-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then water until neutral. The organic solvent layer is then dried, the solvents are evaporated therefrom under vacuum, and the residual crystalline material is purified by crystallization from a mixture of ethyl acetate and ether to give 17α,20,20,21-bis(methylenedioxy)-16α-methyl-4-pregnene-3,11-dione.

Three grams of 17α,20,20,21-bis(methylenedioxy)-16α-methyl-4-pregnene-3,11-dione (6.96 mmoles) is dissolved in 150 cc. of benzene with warming. About 30 cc. of the benzene is distilled off under normal pressure and the solution is then cooled to room temperature. About 4.5 cc. of ethyl formate (56.1 mmoles), and then 900 mg. (64.5 mmoles) of a 57% dispersion of sodium hydride in mineral oil is added. If the reaction does not start immediately it can be initiated by the addition of 0.5 ml. of 0.5 N-methanolic sodium methoxide. After a total of about 2½ hours, 50 cc. of water is added carefully with cooling. The reaction mixture is diluted with 100 ml. of ether and the organic layer is extracted sequentially with four 25 ml. portions of 1 N sodium hydroxide solution and 2.5 ml. of 2 N sodium hydroxide solution. The combined aqueous extracts, including the water layer initially separated, are allowed to stand for 15–30 minutes. The extracts are then cooled and carefully acidified with about 45 ml. of saturated sodium dihydrogen phosphate solution. The temperature is maintained below 20° C. The aqueous suspension is extracted with two 1000 ml. portions of ether. The ether layer is washed with 200 ml. of water and 100 ml. of saturated sodium chloride solution, dried over sodium sulfate, and concentrated under vacuum to yield 17α,20,20,21-bis(methylenedioxy)-2-hydroxymethylene-16α-methyl-4-pregnene-3,11-dione.

A solution consisting of 1.0 g. of 17α,20,20,21-bis(methylenedioxy)-2-hydroxymethylene-16α-methyl-4-pregnene-3,11-dione in 6 ml. of methylene chloride, 30 ml. of glacial acetic acid and 2 ml. of water is cooled in ice. Sodium nitrite (150 mg.) in 7 ml. of water is added with stirring, and stirring is continued for 30 minutes at 0° C. in an atmosphere of nitrogen. At the end of this time 60 ml. of ice water is added to the reaction mixture and the produce is extracted with methylene chloride, washed with water, saturated sodium bicarbonate solution and sodium chloride solution. The methylene chloride solution is dried over magnesium sulfate and evaporated to dryness under vacuum. The 17α,20,20,21-bis(methylenedioxy)-2-hydroxyimino-16α-methyl-4-pregnene-3,11-dione is recovered by recrystallization.

A mixture of 2.7 g. of 17α,20,20,21-bis(methylenedioxy)-2-hydroxyimino-16α-methyl-4-pregnene-3,11-dione, 240 ml. of ethylene glycol and 33 ml. of hydrazine monohydrate is refluxed in a nitrogen atmosphere for 4 hours. The reaction mixture is cooled to room temperature and 600 ml. of water is added. The precipitate formed is collected by filtration. The filtrate is extracted continuously for 3 days with chloroform, giving a 1.8 g. of a brown foam. The latter is combined with the precipitate and chromatographed on silica gel. The eluates with benzene in ether mixtures affords 17α,20,20,21-bis(methylenedioxy)-16α-methyl-11-oxo-4-pregneno-[3,2-d]-1′,2′,3′-triazole, M.P. 281–286° C. (decomposes) $\alpha_D^{25}=+49°$;

UV $\lambda_{Max.}^{CH_3OH}$ 258 mμ, ε 12,300; infrared $\lambda_{Max}^{KBr}$ 5.85μ, 6.01 6.21, 6.54, 9.05μ

A solution of 300 mg. of 17α,20,20,21-bis(methylenedioxy)-2-hydroxyimino-16α-methyl-4-pregnene-3,11-dione in 9 ml. of ethanol and 120 mg. of phenylhydrazine is allowed to stand at room temperature over night. Water and a benzene ether solution (1:1) are added. The organic layer is extracted twice with 2 N hydrochloric acid, then with saturated sodium bicarbonate solution and finally with water. A brown amorphous material (353 mg.) is obtained from the organic layer. An aliquot (340 mg.) is dissolved in 4 ml. of benzene and filtered through acid washed alumina. Elution with 30 ml. of benzene yields 17α,20,20,21-bis(methylenedioxy)-2-hydroxyimino-3-phenylhydrazono-16α-methyl-4-pregnene-11-one.

To an ice cooled solution of 100 mg. of the crude 17α,20,20,21-bis(methylenedioxy) - 2 - hydroxyimino - 16α-methyl-3-phenylhydrazono-4-pregnene-11-one in 20 ml. of chloroform and 7 ml. of pyridine is added 300 mg. of phosphorous pentachloride in two portions. After stirring for 15 minutes the brown solution is heated to 65° C. for 10 minutes. The cooled reaction mixture is diluted with about 50 ml. of chloroform and washed sequentially with water two times, 2.5 N hydrochloric acid and finally with water to neutrality. The crude material is dissolved in 7 ml. of benzene and chromatographed on acid washed alumina. The 17α,20,20,21 - bis(methylenedioxy) - 16α-methyl-11-oxo-2' - phenyl - 4 - pregneno - [3,2-d] - 2'H-1',2',3'-triazole is purified by crystallization.

In accordance with the above procedures, but using an equivalent quantity of any of the other substituted hydrazines listed in column 3, there is obtained the corresponding 2'-substituted-17α,20,20,21-bis(methylenedioxy)-16α-methyl-11-oxo-4-pregneno-[3,2-d]-2'H-1',2',3'triazole.

A solution of 300 mg. of 17α,20,20,21-bis(methylenedioxy)-2-hydroxyimino-16α-methyl - 4 - pregnene - 3,11-dione in 9 ml. of ethanol and 120 mg. of p-fluorophenylhydrazine is allowed to stand at room temperature over night. Water and a benzene ether solution (1:1) are added. The organic layer is extracted twice with 2 N hydrochloric acid, then with saturated sodium bicarbonate solution and finally with water. A brown amorphous material (353 mg.) is obtained from the organic layer. An aliquot (340 mg.) is dissolved in 4 ml. of benzene and filtered through acid washed alumina. Elution with benzene yields 17α,20,20,21-bis(methylenedioxy)-2-hydroxyimino-3-p-fluorophenylhydrazono-16α - methyl - 4 - pregnene-11-one.

To an ice cooled solution of 100 mg. of the crude 17α,20,20,21-bis(methylenedioxy) - 2 - hydroxyimino - 3 - p-fluorophenylhydrazono-16α - methyl-4-pregnene-11-one in 20 ml. of chloroform and 7 ml. of pyridine is added 300 mg. of phosphorous pentachloride in two portions. After stirring for 15 minutes the brown solution is heated to 65° C. for 10 minutes. The cooled reaction mixture is diluted with about 50 ml. of chloroform and washed sequentially with water two times, 2.5 N hydrochloric acid and finally with water to neutrality. The crude material is dissolved in 7 ml. of benzene and chromatographed on acid washed alumina. The 17α, 20,20,21-bis(methylenedioxy)-16α-methyl-11-oxo - 2' - p - fluorophenyl - 4 - pregneno-[3,2-d]-2'H-1',2',3'-triazole is purified by crystallization.

The above 17α,20,20,21-bis(methylenedioxy)- derivatives are converted into the corresponding 21-hydroxy-, 21-acyloxy-, 21-phosphates, 21-desoxy-, 21-chloro- and 21-fluoro-17α-hydroxy-20-oxo - 4 - pregneno- (or 4,6-pregnadieno)-[3,2-d]-2'H-1',2',3'-triazole, as well as the salts thereof, by following the procedures of Examples 18 and 19.

In accordance with the above procedures, but omitting the second step (oxidation of the 11β-hydroxy group to the 11-keto group), the corresponding 11β-hydroxy-compounds are obtained.

The 21-hydroxy-, 21-chloro-, 21-fluoro-, and 21-desoxy-steroids, wherein H is present at the 16-position, are converted into the 16α,17α-dihydroxy-steroids and the 16α,17α-acetals and ketals thereof following the procedures of Example 24.

Example 2

The following procedure which relates to Flow Sheet B is particularly described starting with the 17α,20,20,21-bis(methylenedioxy)-16α-methyl-11 - oxo - 4 - pregneno-[3,2-d]-1',2',3'-triazole, but is generally applicable to all the starting materials defined by Compound 6 of Flow Sheet B.

A solution of about 0.47 millimole of 17α,20,20,21-bis(methylenedioxy) - 16α - methyl-11-oxo-4-pregneno-[3,2-d]-1',2',3'-triazole in 10 ml. of benzene is treated with about 30–38 mg. of about 51% sodium hydride (in oil suspension). After the addition of 2–3 ml. of dimethylformamide (dried over calcium hydride) and 5 ml. of methyl iodide, the mixture is stirred at room temperature over night. The product is filtered, washed with methylene chloride, and the filtrate and washings are taken to dryness. The residue is treated with water and the product is filtered to afford a mixture of the 1'-methyl-17α,20,20,21-bis(methylenedioxy)-16α-methyl - 11 - oxo-4-pregneno-[3,2-d] - 1'H-1',2',3'-triazole, 2'-methyl-17α, 20,20,21 - bis(methylenedioxy) - 16α - methyl-11-oxo-4-pregneno - [3,2-d] - 2'H-1',2',3'-triazole, 3'-methyl-17α, 20,20,21 - bis(methylenedioxy)-16α-methyl - 11 - oxo-4-pregneno-[3,2-d]-3'H-1',2',3' - triazole. The mixture is separated by chromatography.

In accordance with the above procedure, but using another alkylating agent, for example, ethyl iodide, propyl iodide and the like, in place of the methyl iodide, there is obtained the corresponding 1'-alkyl-17α,20,20,21-bis-(methylenedioxy)-16α-methyl - 11 - oxo-4-pregneno-[3,2-d]-1'H-1',2',3'-triazole, 2'-alkyl - 17α,20,20,21-bis-(methylenedioxy)-16α-methyl-11-oxo-4-pregneno - [3,2-d]-2'H-1',2',3'-triazole, or 3'-alkyl-17α,20,20,21-bis(methylenedioxy)-16α-methyl - 11 - oxo-4-pregneno-[3,2-d]-3'H-1',2',3'-triazole.

In accordance with the above procedure, but starting with the 11β-hydroxy-analogue, the corresponding 1'-alkyl-17α,20,20,21-bis(methylenedioxy) - 11β - hydroxy-16α-methyl - 4 - pregneno - [3,2-d]-1'H-1',2',3'-triazole, 2'-alkyl-17α,20,20,21 - bis(methylenedioxy)-11β-hydroxy-16α-methyl-4-pregneno-[3,2-d]-2'H-1',2',3' - triazole, and 3'-alkyl-17α,20,20,21 - bis(methylenedioxy)-11β-hydroxy-16α - methyl-4-pregneno-[3,2-d]-3'H-1',2',3'-triazole are obtained.

The above 17α,20,20,21 - bis(methylenedioxy)-derivatives are converted into the corresponding 21-hydroxy-, 21-acyloxy-, 21-phosphates-, 21-desoxy-, 21-chloro- and 21-fluoro-17α-hydroxy-20-oxo-4-pregneno- (or 4,6-pregnadieno)-[3,2-d]-1',2',3'-triazole, as well as the salts thereof, by following the procedures of Examples 18 and 19.

Example 3

The following procedures which relate to Flow Sheet C are particularly described starting with the 17α,21-dihydroxy-16α-methyl-4-pregnene-3,11,20-trione, but are generally applicable to all the starting materials defined in Flow Sheet C Compound 8.

Twenty-four grams of 17α,21-dihydroxy-16α-methyl-4-pregnene-3,11,20-trione, 910 ml. of chloroform, 237 ml. of concentrated hydrochloric acid and 237 ml. of 37% formaldehyde are combined and stirred at room temperature for 70 hours. The chloroform layer is separated, and the aqueous layer is extracted 2 times with 50 ml. portions of chloroform. The combined chloroform solutions are then washed sequentially with two 200 ml. portions of water, 200 ml. of saturated sodium bicarbonate solution and 200 ml. of water. The chloroform solution is dried over magnesium sulfate and then concentrated under vacuum. The product, which is the 17α, 20,20,21-bis(methylenedioxy)-16α-methyl - 4 - pregnene-3,11-dione, is obtained by crystallization from methanol.

The 17α,20,20,21 - bis(methylenedioxy)-16α-methyl-4-pregnene-3,11-dione (17.5 g.) is dissolved in 890 ml. of benzene. Then 45 ml. of ethylene glycol and 1.78 g. of p-toluenesulfonic acid monohydrate is added. The mixture is heated at reflux with stirring fo about 17.5 hours, while continuously collecting the water which forms. The solution is cooled to 20° C. and washed sequentially with two 200 ml. portions of water, 200 ml. of saturated sodium bicarbonate solution and 200 ml. of water. The washes are back extracted with benzene, and the benzene extract is added to the batch. The dried benzene solution is concentrated to dryness under vacuum to give a mixture of crystals and oil. The mixture is refluxed with 100 ml. of ether for ½ hour. It is then cooled, filtered and washed with cold ether to afford the 17α,20,20,21 - bis(methylenedioxy)-3-ethylenedioxy-16α-methyl-5-pregnene-11-one.

A solution of 22.9 grams of 17α,20,20,21-bis(methylenedioxy)-3-ethylenedioxy - 16α - methyl-5-pregnene-11-one in 200 ml. of benzene is added to 460 ml. of perbenzoic acid (0.325 M) over a time period of approximately 30 minutes while keeping the temperature at 20–25° C., the perbenzoic acid solution having been dried over magnesium sulfate prior to use. After 48 hours at room temperature the titre indicates that about 120% of the theoretical amount of perbenzoic acid has been consumed. The solution is cooled to 10° C. and a 15% solution of sodium bisulfite cooled to a temperature of less than 20° C. is added with good agitation until a negative potassium iodide test is obtained. The aqueous phase is removed and the benzene is washed with 5% sodium bicarbonate solution until it is acid free, and is then washed with water. After drying, the benzene is concentrated under vacuum to yield a mixture of the α and β isomers of 17α,20,20,21 - bis(methylenedioxy) - 5,6-epoxy-3-ethylenedioxy-16α-methyl-5α-pregnane-11-one in a ratio of about 6:4. The isomers are separated by chromatography on Florisil (an activated magnesium silicate made according to U.S. Patent 2,393,625). The α-isomer is obtained by elution with acetone in hexane and then recrystallizing from a mixture of benzene and hexane.

The 17α,20,20,21-bis(methylenedioxy) - 5α,6α - epoxy-3-ethylenedioxy-16α-methyl - 5α - pregnane-11-one is dissolved in 300 cc. of 98–100% formic acid at room temperature and allowed to stand for 2.5 hours. The solution is poured into water and extracted with chloroform. The chloroform solution is washed with saturated aqueous sodium bicarbonate solution, dried over sodium sulfate and concentrated under vacuum. The crude mixed formates are dissolved in 1400 cc. of methanol, refluxed for one-half hour under nitrogen with a solution consisting of 27 g. of potassium hydroxide and 135 cc. of water. The cooled solution is neutralized with 37 cc. of acetic acid and concentrated under vacuum at 30° C. The resulting solution is poured into water and extracted with chloroform. The chloroform layer is washed with aqueous sodium bicarbonate solution, dried over sodium sulfate and concentrated under vacuum. Crystallization from methanol gives the 17α,20,20,21-bis(methylenedioxy)-16α-methyl-5α-pregnane-3,6,11-trione.

A solution consisting of 8.0 grams of 17α,20,20,21-bis-(methylenedioxy) - 16α - methyl-5α-pregnane-3,6,11-trione, and 8 ml. of morpholine in 80 ml. of benzene is refluxed vigorously for 1 hour in the presence of Linde molecular sieves contained in a Soxhlet extractor. The solution is cooled and concentrated. Crystallization from a mixture of ethyl acetate and ether affords the 17α,20,20,21-bis(methylenedioxy) - 16α-methyl-3-morpholine-5α,2-pregnene-6,11-dione.

A solution consisting of 2.1 g. of 17α,20,20,21-bis-(methylenedioxy) - 16α - methyl-3-morpholino-5α,2-pregnene-6,11-dione and 1.5 ml. of phenyl azide in 30 ml. of benzene is refluxed over night to form a mixture of 1′ and 3′-phenyl - 17α,20,20,21 - bis(methylenedioxy)-16α-methyl-6,11-dioxo - 5α - pregnano-[3,2-d]-3′H-1′,2′-3′-triazole. The solution is concentrated under vacuum and chromatographed on 100 g. of acid washed alumina. Elution with chloroform and ethyl acetate and crystallization from chloroform and ethyl acetate affords the 3′-phenyl-derivative, M.P. >350° C; $\alpha_D^{25}$ +5 (C. 1.0 CHCl$_3$);

U.V. $\lambda_{Max.}^{meOH}$ 228 mµ

ε 10,800.

In accordance with the above procedure, but reacting with the p-fluorophenyl-azide the corresponding p-fluorophenyl-derivatives are obtained.

The above 17α,20,20,21-bis(methylenedioxy) - derivatives are converted into the corresponding 21-hydroxy-, 21-acyloxy-, 21-phosphates-, 21-desoxy-, 21-chloro- and 21 - fluoro-17α-hydroxy-20-oxo-3′-phenyl-4-pregneno- (or 4,6-pregnadieno)-[3,2-d]-3′H-1′,2′,3′-triazoles, as well as the salts thereof, by following the procedures of Examples 18 and 19.

The 21-hydroxy-, 21-chloro-, 21-fluoro-, and 21-desoxy-steroids, wherein H is present at the 16-position, are converted into the 16α,17α-dihydroxy-steroids and the 16α,17α-acetals and ketals thereof following the procedures of Example 24.

*Example 4*

The following procedures which relate to Flow Sheet D are particularly described starting with the 17α,20,20,21-bis(methylenedioxy) - 3′ - phenyl-16α-methyl-6,11-dioxo-5α-pregnano-[3,2-d]-3′H-1′,2′,3′-triazole, but are generally applicable to all compounds defined by Flow Sheet D (Compounds 14A and 14B).

A solution of 500 mg. of 17α,20,20,21-bis(methylenedioxy)-16α-methyl-3′-phenyl - 6,11 - dioxo-5α-pregnano-[3,2-d]-3′H-1′,2′,3′-triazole in 35 ml. of tetrahydrofuran which has been freshly distilled from lithium aluminum hydride, and a solution of 750 mg. of sodium borohydride in 4 ml. of water are purged 6 times with nitrogen and then the solutions are combined. After stirring at room temperature under nitrogen for one hour, the combined solution is cooled to 0–5° C. and a saturated solution of 4.7 grams of monobasic sodium phosphate is added over a time period of approximately 15 minutes. The reaction mixture is stirred for an additional 15 minutes. The slurry is then concentrated under vacuum keeping the temperature below 25° C. until the tetrahydrofuran is essentially removed. The slurry is cooled, filtered and washed with water until neutral. The product is the 17α,20,20,21-bis(methylenedioxy) - 6β - hydroxy-16α-methyl-11-oxo-3′-phenyl-5α-pregnano - [3,2-d] - 3′H-1′,2′,3′-triazole.

A solution of thionyl chloride in pyridine is prepared by adding 7.5 cc. of freshly distilled thionyl chloride to 38 cc. of ice-cold anhydrous pyridine. This is added dropwise to a stirred solution of 7.0 g. of 17α,20,20,21-bis-(methylenedioxy) - 6β - hydroxy - 16α-methyl-11-oxo-3′-phenyl-5α-pregnano-[3,2-d]-3′H-1′,2′,3′-triazole in 45 cc. of anhydrous pyridine. The rate of addition is controlled such that the reaction mixture is maintained at approximately 40° C. The solution is stirred an additional 30 minutes after the addition of the reagent is completed, subsequently cooled in ice and poured into 250 cc. of ice-water. The mixture is extracted with chloroform and the chloroform layer is washed with aqueous sodium bicarbonate solution, dried over sodium sulfate and concentrated under vacuum. The crude product, dissolved in benzene, is chromatographed on silica gel. Elution with ether-petroleum ether, and ether-chloroform mixtures affords 17α,20,20,21 - bis(methylenedioxy) - 16α-methyl - 11 - oxo-3′-phenyl-5-pregneno-[3,2-d]-3′H-1′,2′,3′-triazole.

A solution consisting of 0.45 g. of the above steroid product in 28 ml. of chloroform, saturated with dry hydrogen chloride is allowed to stand at room temperature for 6 hours. The reaction mixture is diluted with chloroform and poured into ice water. The chloroform layer is separated, washed with water and sodium bicarbonate solution, dried and concentrated under vacuum. Chromatography on acid washed alumina affords the 17α,20,20,21-bis(methylenedioxy) - 16α - methyl-11-oxo-3′-phenyl-4-pregneno-[3,2-d]-3′H-1′,2′,3′-triazole.

A solution of 500 mg. of the above product in 35 ml. of tetrahydrofuran which has been freshly distilled from lithium aluminum hydride, and a solution of 750 mg. of sodium borohydride in 4 ml. of water are purged 6 times with nitrogen and then the solutions are combined. After stirring at room temperature under nitrogen for 18 hours, the combined solution is cooled to 0–5° C. and a saturated solution of 4.7 grams of monobasic sodium phosphate is added over a time period of approximately 15 minutes. The reaction mixture is stirred for an additional 15 minutes. The slurry is then concentrated under vacuum keeping the temperature below 25° C. until the tetrahydrofuran is essentially removed. The slurry is cooled, filtered and washed with water until neutral. The product is 17α,20,20,21 - bis(methylenedioxy)-11β-hydroxy-16α-methyl-3'-phenyl-4-pregneno-[3,2-d]-3'H-1',2',3'-triazole.

Example 5

The following procedures which relate to Flow Sheet E are particularly described starting with the 17α,20,20,21-bis(methylenedioxy) - 3' - phenyl-16α-methyl-6,11-dioxo-5α-pregnano-[3,2-d]-3'H-1',2',3'-triazole but are generally applicable to all steroids defined by compounds 14A and 14B of Flow Sheet E.

A solution containing 3 cc. of methyl iodide in 10 cc. of ether is added, with stirring, to 300 mg. of magnesium covered with 10 cc. of ether. After the magnesium is consumed an additional 20 cc. of ether is added. To this solution is added with stirring over a period of 10 minutes a solution consisting of 2.91 g. of the 17α,20,20,21-bis(methylenedioxy) - 16α - methyl-6,11-dioxo-3'-phenyl-5α-pregnano-[3,2-d]-3'H-1',2',3'-triazole of Example 3 in 40 cc. of benzene. The suspension is allowed to stir for an additional half hour and is then decomposed with 40 cc. of water. After the addition of 100 cc. of benzene, the layers are separated, and the aqueous layer is extracted twice with 100 cc. of chloroform. The organic layers are combined, dried over sodium sulfate and concentrated under vacuum. Chromatography on silica gel and elution with ether-petroleum ether and ether-chloroform mixtures affords the 17α,20,20,21-bis(methylenedioxy)-6β-hydroxy-6α,16α - dimethyl - 11-oxo-3'-phenyl-5α-pregnano-[3,2-d]-3'H-1',2',3'-triazole.

A solution of thionyl chloride in pyridine is prepared by adding 7.5 cc. of freshly distilled thionyl chloride to 38 cc. of ice-cold anhydrous pyridine. This is added dropwise to a stirred solution of 7.0 g. of 17α,20,20,21-bis(methylenedioxy) - 6β - hydroxy-6α,16α-dimethyl-11-oxo-3'-phenyl-5α-pregnano-[3,2-d]-3'H-1',2',3'-triazole in 45 cc. of anhydrous pyridine. The rate of addition is controlled such that the reaction mixture is maintained at approximately 40° C. The solution is stirred an additional 30 minutes after the addition of the reagent is completed, subsequently cooled in ice and poured into 250 cc. of ice-water. The mixture is extracted with chloroform and the chloroform layer is washed with aqueous sodium bicarbonate solution, dried over sodium sulfate and concentrated under vacuum. The crude product dissolved in benzene, is chromatographed on silica gel. Elution with ether-petroleum ether, and ether-chloroform mixtures affords the 17α,20,20,21 - bis(methylenedioxy) - 6,16α-dimethyl - 11-oxo-3'-phenyl-5-pregneno-[3,2-d]-3'H-1',2',3'-triazole.

A solution consisting of 520 mg. of the above product and about 500 mg. of selenium dioxide in 35 ml. of butanone dioxolane is refluxed for 3–5 hours. The cooled solution is filtered, washed with aqueous sodium carbonate solution, dried and concentrated under vacuum. Crystallization from ethyl acetate affords the 17α,20,20,21-bis(methylenedioxy) - 4ξ-hydroxy-6,16α-dimethyl-11-oxo-3'-phenyl-5-pregneno-[3,2-d]-3'H-1',2',3'-triazole.

A solution of 500 mg. of the above product in 35 ml. of tetrahydrofuran which has been freshly distilled from lithium aluminum hydride, and a solution of 750 mg. of sodium borohydride in 4 ml. of water are purged 6 times with nitrogen and then the solutions are combined. After stirring at room temperature under nitrogen for 18 hours, the combined solution is cooled to 0–5° C. and a saturated solution of 4.7 grams of monobasic sodium phosphate is added over a time period of approximately 15 minutes. The reaction mixture is stirred for an additional 15 minutes. The slurry is then concentrated under vacuum keeping the temperature below 25° C. until the tetrahydrofuran is essentially removed. The slurry is cooled, filtered and washed with water until neutral. The product is 17α,20,20,21 - bis(methylenedioxy) - 4ξ,11β-dihydroxy-6,16α-dimethyl - 3' - phenyl-5-pregneno-[3,2-d]-3'H-1',2',3'-triazole.

A suspension containing 80 mg. of the above product, and 8 cc. of 60% aqueous formic acid is heated inside a steam cone for 40 minutes. The resulting solution is cooled and extracted with chloroform. The chloroform layer is washed with aqueous sodium bicarbonate solution, dried over sodium sulfate and concentrated under vacuum. The crude concentrate is dried by azeotropic distillation with benzene and then subsequently treated for 15 minutes with 0.7 milliequivalents of sodium methoxide in 1.0 ml. of methanol in water to cleave any formate esters. Isolation by partition chromatography affords the 11β,17α,21-trihydroxy-6,16α-dimethyl-20-oxo-3'-phenyl-4,6-pregnadieno-[3,2-d]-3'H - 1',2',3' - triazole. After neutralization of the above product with acetic acid the solution is diluted with water and extracted with chloroform. The chloroform layer is dried over sodium sulfate and concentrated under vacuum. The material is acetylated with acetic anhydride in pyridine, and chromatographed on silica gel. The column is eluted with ether chloroform mixtures to obtain the 11β,17α,21-trihydroxy - 6,16α - dimethyl-20-oxo-3'-phenyl-4,6-pregnadieno-[3,2-d]-3'H-1',2',3'-triazole 21-acetate.

The 11β,17α,21-trihydroxy - 6,16α - dimethyl-20-oxo-3'-phenyl - 4,6 - pregnadieno-[3,2-d]-3'H-1',2',3'-triazole is converted into the corresponding 21-desoxy-, 21-fluoro-, 21-chloro-, and 21-phosphate compounds, as well as the salts thereof following the procedures of Exampes 18 and 19.

The 21-hydroxy-, 21-chloro-, 21-fluoro-, and 21-desoxy-steroids, wherein H is present at the 16-position, are converted into the 16α,17α-dihydroxy-steroids and the 16α,17α-acetals and ketals thereof following the procedures of Example 24.

Example 6

The following procedures which relate to Flow Sheet F are particularly described starting with the 17α,20,20,21-bis(methylenedioxy) - 16α - methyl-11-oxo-3'-phenyl-5-pregneno-[3,2-d]-3'H-1',2',3'-triazole, but are generally applicable to all starting materias defined by compounds 16 and 46 of Flow Sheet F.

A solution containing 16.5 g. of 17α,20,20,21-bis (methylenedioxy) - 16α - methyl-11-oxo-3'-phenyl-5-pregneno-[3,2-d]-3'H-1',2',3'-triazole of Example 4 and 45 milliequivalents of perbenzoic acid in a total volume of 350 ml. of benzene is stirred in the dark at room temperature for 45 hours. The reaction mixture is washed with saturated aqueous sodium bicarbonate solution and dried over sodium sulfate. The product is then concentrated under vacuum to yield the 17α,20,20,21-bis(methylenedioxy)-5α,6α-epoxy - 16α - methyl-11-oxo-3'-phenyl-pregnano-[3,2-d]-3'H-1',2',3'-triazole, after purification.

To a solution of 100 mg. of the above product in 4 ml. of chloroform is added 5 ml. of concentrated hydrochloric acid. The two-phase mixture is stirred at 25° C. for 1 hour. Addition of water and chloroform extraction gives the 17α,20,20,21-bis(methylenedioxy)-6β-chloro-5α-hydroxy-16α-methyl - 11 - oxo-3'-phenyl-pregnano-[3,2-d]-3'H-1',2',3'-triazole.

To a solution of 200 mg. of 17α,20,20,21-bis(methylenedioxy)-5α,6α-epoxy - 16α - methyl-11-oxo-3'-phenyl-pregnano-[3,2-d]-3'H-1',2',3'-triazole in 2 ml. of chloroform and 2 ml. of tetrahydrofuran in a polyethylene bottle at −60° C. is added 2 ml. of 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the latter phase is washed with water and dried over magnesium sulfate. The residue on crystallization from a mixture of acetone and ether gives the 17α,20,20,21-bis(methylenedioxy)-6β-fluoro-5α-hydroxy - 16α - methyl-11-oxo-3'-phenyl-pregnano-[3,2-d]-3'H-1',2',3'-triazole.

A solution of thionyl chloride in pyridine is prepared by adding 7.5 cc. of freshly distilled thionyl chloride to 38 cc. of ice-cold anhydrous pyridine. This is added dropwise to a stirred solution of 7.0 g. of 17α,20,20,21-bis(methylenedioxy) - 6β - chloro - 5α - hydroxy-16α-methyl-11-oxo - 3' - phenyl-pregnano-[3,2-d]-3'H-1',2',3'-triazole in 45 cc. of anhydrous pyridine. The rate of addition is controlled such that the reaction mixture is maintained at approximately 40° C. The solution is stirred an additional 30 minutes after the addition of the reagent is completed, subsequently cooled in ice and poured into 250 cc. of ice-water. The mixture is extracted with chloroform and the chloroform layer is washed with aqueous sodium bicarbonate solution, dried over sodium sulfate and concentrated under vacuum. The crude product, dissolved in benzene, is chromatographed on silica gel. Elution with ether-petroleum ether, and ether-chloroform mixtures affords 17α,20,20,21-bis(methylenedioxy) - 6β - chloro - 16α - methyl-11-oxo-3'-phenyl-4-pregneno-[3,2-d]-3'H-1',2',3'-triazole.

In accordance with the above procedure, but using the the 6β-fluoro-derivative instead of the 6β-chloro-derivative, the corresponding 6β-fluoro-17α,20,20,21-bis(methylenedioxy)-16α-methyl-11-oxo-3'-phenyl - 4 - pregneno-[3,2-d]-3'H-1',2',3'-triazole is obtained.

A suspension of the 17α,20,20,21-bis(methylenedioxy)-6β-chloro - 16α - methyl-11-oxo-3'-phenyl-4-pregneno-[3,2-d]-3'H-1',2',3'-triazole (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 17α,20,20,21-bis(methylenedioxy)-6-chloro-16α-methyl - 11 - oxo - 3' - phenyl-4,6-pregnadieno-[3,2-d]-3'H-1',2',3'-triazole.

In accordance with the above procedure, but using the 6β-fluoro-derivative in place of the 6β-chloro-derivative, there is obtained the 17α,20,20,21-bis(methylenedioxy)-6-fluoro - 16α - methyl-11-oxo-3'-phenyl-4,6-pregnadieno-[3,2-d]-3'H-1',2',3'-triazole.

A solution of 500 mg. of the 17α,20,20,21-bis(methylenedioxy) - 6β - chloro-16α-methyl-11-oxo-3'-phenyl-4-pregneno-[3,2-d]-3'H-1',2',3'-triazole in 35 ml. of tetrahydrofuran which has been freshly distilled from lithium aluminum hydride, and a solution of 750 mg. of sodium borohydride in 4 ml. of water are purged 6 times with nitrogen and then the solutions are combined. After stirring at room temperature under nitrogen for 18 hours, the combined solution is cooled to 0–5° C. and a saturated solution of 4.7 grams of monobasic sodium phosphate is added over a time period of approximately 15 minutes. The reaction mixture is stirred for an additional 15 minutes. The slurry is then concentrated under vacuum keeping the temperature below 25° C. until the tetrahydrofuran is essentially removed. The slurry is cooled, filtered and washed with water until neutral to afford the 17α,20,20,21-bis(methylenedioxy)-6β-chloro-11β-hydroxy - 16α - methyl-3'-phenyl-4-pregneno-[3,2-d]-3'H-1',2',3'-triazole.

In accordance with the above procedure, but using the 6β-fluoro-derivative instead of the 6β-chloro-derivative, there is obtained the 17α,20,20,21-bis(methylenedioxy)-6β-fluoro-11β-hydroxy-16α-methyl-3'-phenyl-4 - pregneno-[3,2-d]-3'H-1', 2', 3'-triazole.

In accordance with the above procedure, but starting with the corresponding Δ4,6-compounds there is obtained the 6-chloro-, or 6-fluoro - 17α,20,20,21 - bis(methylenedioxy)-11β-hydroxy-16α-methyl-3' - phenyl - 4,6 - pregnadieno-[3,2-d]-3'H-1',2',3'-triazole respectively.

The above 17α,20,20,21-bis(methylenedioxy) - derivatives are converted into the corresponding 21-hydroxy-, 21-acyloxy-, 21-phosphate, 21-desoxy-, 21-chloro- and 21-fluoro-17α-hydroxy-20-oxo-4 - pregneno- (or 4,6 - pregnadieno)-[3,2-d]-3'H-1',2',3'-triazole, as well as the salts thereof, by following the procedures of Examples 18 and 19.

The 21-hydroxy-, 21-chloro-, 21-fluoro-, and 21-desoxy-steroids, wherein H is present at the 16-position, are converted into the 16α,17α-dihydroxy-steroids and the 16α, 17α-acetals and ketals thereof following the procedures of Example 24.

*Example 7*

The following procedures which relate to Flow Sheet G are particularly described starting with the 17α,20,20,21-bis(methylenedioxy)-16α-methyl-11 - oxo - 3' - phenyl - 5-pregneno-[3,2-d]-3'H-1',2',3'-triazole, but are generally applicable to all starting materials defined by Compounds 16 and 46 of Flow Sheet G.

The 17α,20,20,21-bis(methylenedioxy)-16α-methyl-11-oxo-3'-phenyl-5-pregneno-[3,2-d]-3'H-1',2',3' - triazole of Example 4 (1.0 g.) in 20 ml. of methylene chloride is added to a stirred mixture consisting of 2.6 grams anhydrous hydrogen fluoride, 2.0 grams of lead tetraacetate and 10 ml. of methylene chloride at −75° C. The reaction mixture is maintained at this temperature for about 30 minutes and poured into an iced cold mixture of aqueous sodium carbonate and chloroform. The mixture is filtered and the organic layer is dried and concentrated. The residue is chromatographed on acid washed alumina to yield 17α,20,20,21-bis(methylenedioxy)-5α,6α-difluoro-16α-methyl-11-oxo-3'-phenyl-pregnano-[3,2-d]-3'H - 1',2',3'-triazole.

A solution consisting of 500 mg. of the above product and 350 mg. of phenyliodosodichloride in 20 ml. of anhydrous chloroform is allowed to stand for 3 hours at room temperature. The solution is washed with water and aqueous sodium bicarbonate solution, dried and concentrated under vacuum. Chromatography on acid washed alumina affords the 17α,20,20,21-bis(methylenedioxy)-5α,6α-dichloro-16α-methyl - 11 - oxo - 3' - phenyl-pregnano-[3,2-d]-3'H-1',2',3'-triazole.

The above product (1.0 g.) dissolved in 50 ml .of methanol is refluxed for 15 minutes with 1 g. of potassium hydroxide dissolved in 5 ml. of water. The solution is neutralized with acetic acid and concentrated to a small volume. The product is then taken up in chloroform and the chloroform layer is washed with water, dried and concentrated under vacuum. Chromatography on acid washed alumina affords the 17α,20,20,21-bis-(methylenedioxy)-6α-chloro - 16α - methyl - 11 - oxo - 3'-phenyl-4-pregneno-[3,2-d]-3'H-1',2',3'-triazole.

In accordance with the above procedure, but starting with the corresponding 5α,6α-difluoro-derivative, there is obtained the 17α,20,20,21-bis(methylenedioxy)-6α-fluoro-16α-methyl-11-oxo-3'-phenyl-4-pregneno-[3,2-d]-3'H - 1', 2',3'-triazole.

A solution of 500 mg. of the above product in 35 ml. of tetrahydrofuran which has been freshly distilled from lithium aluminum hydride, and a solution of 750 mg. of sodium borohydride in 4 ml. of water are purged 6 times with nitrogen and then the solutions are combined. After stirring at room temperature under nitrogen for 18 hours, the combined solution is cooled to 0-5° C., and a saturated solution of 4.7 grams of monobasic sodium phosphate is added over a time period of approximately 15 minutes. The reaction mixture is stirred for an additional 15 minutes. The slurry is then concentrated under vacuum keeping the temperature below 25° C. until the tetrahydrofuran is essentially removed. The slurry is cooled, filtered and washed with water until neutral.

The product is 17α,20,20,21-bis(methylenedioxy)-6α-chloro-11β-hydroxy-16α-methyl-3'-phenyl-4-pregneno-[3,2-d]-3'H-1',2',3'-triazole.

In accordance with the above procedure, but starting with the corresponding 6α-fluoro-derivative there is obtained the 17α,20,20,21-bis(methylenedioxy)-6α-fluoro-11β-hydroxy-16α-methyl-3'-phenyl-4-pregneno-[3,2-d]-3'H-1',2',3'-triazole.

The above 17α,20,20,21-bis(methylenedioxy)-derivatives are converted into the corresponding 21-hydroxy-, 21-acyloxy-, 21-phosphates-, 21-desoxy-, 21-chloro- and 21-fluoro-17α-hydroxy-20-oxo-4-pregneno- (or 4,6-pregnadieno)-[3,2-d]-3'H-1',2',3'-triazoles, as well as the salts thereof, by following the procedures of Examples 18 and 19.

*Example 8*

The following procedures which relate to Flow Sheet H are particularly described starting with the 17α,20,20,21-bis(methylenedioxy)-5α,6α-epoxy-16α-methyl-11-oxo-3'-phenyl-pregnano-[3,2-d]-3'H-1',2',3'-triazole, but are generally applicable to all starting materials defined by Compound 24 of Flow Sheet H.

To a solution of 250 mg. of 17α,20,20,21-bis(methylenedioxy)-5α,6α-epoxy-16α-methyl-11-oxo-3'-phenyl-pregnano-[3,2-d]-3'H-1',2',3'-triazole (Example 6) in 16 ml. of dry benzene under a nitrogen atmosphere is added 2.33 ml. of 3 M methylmagnesium bromide in ether. The mixture is heated at 70° C. under nitrogen for 5 hours. After cooling to 0–5° C., 5.6 g. of ammonium chloride in 56 ml. of water is added over a time period of approximately 20 minutes. The benzene is separated and the aqueous layer is extracted two times with 20 ml. of benzene. The combined benzene layers are washed neutral with water, dried with magnesium sulfate and concentrated to dryness to give the 17α,20,20,21-bis(methylenedioxy)-5α-hydroxy-6β,16α-dimethyl-11-oxo-3'-phenyl-pregnano-[3,2-d]-3'H-1',2',3'-triazole. The crude product can be used for the next reaction, or it may be first crystallized from an organic solvent.

A solution of thionyl chloride in pyridine is prepared by adding 7.5 cc. of freshly distilled thionyl chloride to 38 cc. of ice-cold anhydrous pyridine. This is added dropwise to a stirred solution of 7.0 g. of 17α,20,20,21-bis-(methylenedioxy)-5α-hydroxy-6β,16α-dimethyl-11-oxo-3'-phenyl-pregnano-[3,2-d]-3'H-1',2',3'-triazole in 45 cc. of anhydrous pyridine. The rate of addition is controlled such that the reaction mixture is maintained at approximately 40° C. The solution is stirred an additional 30 minutes after the addition of the reagent is completed, subsequently cooled in ice and poured into 250 cc. of ice-water. The mixture is extracted with chloroform and the chloroform layer is washed with aqueous sodium bicarbonate solution, dried over sodium sulfate and concentrated under vacuum. The crude product, dissolved in benzene, is chromatographed on silica gel. Elution with ether-petroleum ether, and ether-chloroform mixtures affords the 17α,20,20,21-bis(methylenedioxy)-6β,16α-dimethyl-11-oxo-3'-phenyl-4-pregneno-[3,2-d]-3'H-1',2',3'-triazole.

The above product (1.0 g.) dissolved in 50 ml. of methanol is refluxed for 15 minutes with 1 g. of potassium hydroxide, dissolved in 5 ml. of water. The solution is neutralized with acetic acid and concentrated to a small volume. The product is then taken up in chloroform and the chloroform layer is washed with water, dried and concentrated under vacuum. Chromatography on acid washed alumina affords the 17α,20,20,21-bis(methylenedioxy)-6α,16α-dimethyl-11-oxo-3'-phenyl-4-pregneno-[3,2-d]-3'H-1',2',3'-triazole.

A solution of 500 mg. of the above product in 35 ml. of tetrahydrofuran which has been freshly distilled from lithium aluminum hydride, and a solution of 750 mg. of sodium borohydride in 4 ml. of water are purged 6 times with nitrogen and then the solutions are combined. After stirring at room temperature under nitrogen for 18 hours, the combined solution is cooled to 0–5° C., and a saturated solution of 4.7 grams of monobasic sodium phosphate is added over a time period of approximately 15 minutes. The reaction mixture is stirred for an additional 15 minutes. The slurry is then concentrated under vacuum keeping the temperature below 25° C. until the tetrahydrofuran is essentially removed. The slurry is cooled, filtered and washed with water until neutral. The product is the 17α,20,20,21-bis(methylenedioxy)-11β-hydroxy-6α,16α-dimethyl-3'-phenyl-4-pregneno-[3,2-d]-3'H-1',2',3'-triazole.

In accordance with the above procedure, but starting with the corresponding 6β-methyl-derivative, the corresponding 17α,20,20,21-bis(methylenedioxy)-11β-hydroxy-6β,16α-dimethyl-3'-phenyl-4-pregneno-[3,2-d]-3'H-1',2',3'-triazole is obtained.

The above 17α,20,20,21-bis(methylenedioxy)-derivatives are converted into the corresponding 21-hydroxy-, 21-acyloxy-, 21-phosphates-, 21-desoxy-, 21-chloro- and 21-fluoro-17α-hydroxy-20-oxo-4-pregneno- (or 4,6-pregnadieno)-[3,2-d]-2'H-1',2',3'-triazole, as well as the salts thereof, by following procedures of Examples 18 and 19.

The 21-hydroxy-, 21-chloro-, 21-fluoro-, and 21-desoxy-steroids, wherein H is present at the 16-position, are converted into the 16α,17α-dihydroxy-steroids and the 16α,17α-acetals and ketals thereof following the procedures of Example 24.

*Example 9*

The following procedures which relate to Flow Sheet I are particularly described starting with the 17α,20,20,21-bis(methylenedioxy)-6β-hydroxy-16α-methyl-11-oxo-3'-phenyl-5α-pregnano-[3,2-d]-3'H-1',2',3'-triazole, but are generally applicable to all starting materials defined by Compound 15 of Flow Sheet I.

To a solution of 100 mg. of 17α,20,20,21-bis(methylenedioxy)-6β-hydroxy-16α-methyl-11-oxo-3'-phenyl-5α-pregnano-[3,2-d]-3'H-1',2',3'-triazole (Example 4) in 2 ml. of pyridine is added 0.5 ml. of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The product is then crystallized from a solvent, alternately, the product may be chromatographed on alumina and the 6β-acetoxy-17α,20,20,21-bis(methylenedioxy)-16α-methyl-11-oxo-3'-phenyl-5α-pregnano-[3,2-d]-3'H-1',2',3'-triazole isolated by crystallization of the appropriate eluate.

A solution of 500 mg. of the above product in 35 ml. of tetrahydrofuran which has been freshly distilled from lithium aluminum hydride, and a solution of 750 mg. of sodium borohydride in 4 ml. of water are purged 6 times with nitrogen and then the solutions are combined. After stirring at room temperature under nitrogen for 18 hours, the combined solution is cooled to 0–5° C., and a saturated solution of 4.7 grams of monobasic sodium phosphate is added over a time period of approximately 15 minutes. The reaction mixture is stirred for an additional 15 minutes. The slurry is then concentrated under vacuum keeping the temperature below 25° C. until the tetrahydrofuran is essentially removed. The slurry is cooled, filtered and washed with water until neutral. The product is the 6β-acetoxy-17α,20,20,21-bis(methylenedioxy)-11β-hydroxy-16α-methyl-3'-phenyl-5α-pregnano-[3,2-d]-3'H-1',2',3'-triazole.

To a solution of 436 mg. of the above product in 2.5 cc. of dry dimethyl formamide and 2.0 cc. of dry pyridine cooled to 0° C. is added 1.0 cc. of methane sulfonyl chloride. The reaction mixture is allowed to warm to room temperature at which time a precipitate may appear, and is then heated at 70–80° C. for 10 minutes. The solution is cooled in ice and poured into ice water. The aqueous solution is then extracted with chloroform. The chloroform layer is washed with sodium bicarbonate solution, dried over sodium sulfate and then concentrated under vacuum. The crude solution is adsorbed on acid washed alumina from benzene solution. The column is washed with benzene and the product is eluted with ether. The ether eluates are evaporated to an oil which crystallizes when triturated with ether. The 6β-acetoxy-17α, 20,20,21-bis(methylenedioxy) - 16α-methyl - 3' - phenyl-9(11)-pregneno-[3,2-d]-3'H-1',2',3' - triazole product so obtained, is of sufficient purity for the next step.

A suspension containing 310 mg. of the above product and 202 mg. of N-bromosuccinimide in 3.4 cc. of acetone is cooled to 0° C. To the suspension is added 0.72 ml. of aqueous perchloric acid (0.458 g. of 70% perchloric acid and 16.5 ml. of water). The reaction mixture which is held at ice temperature becomes homogeneous after about 20 minutes and after about 2½ hours is quenched by the addition of 0.12 cc. of allyl alcohol. About 20 ml. of water is then added and crystallization is allowed to proceed for ½ hour at 0° C. The crystals are separated by filtration and dried under vacuum at a temperature that does not exceed 25° C. The 6β-acetoxy-17α,20,20,21-bis(methylenedioxy) - 9α-bromo-11β-hydroxy-16α-methyl-3'-phenyl-5α-pregnano-[3,2-d]-3'H-1',2',3' - triazole so obtained is of sufficient purity for use in the next step.

A suspension of 250 mg. of the above product and 175 mg. of anhydrous potassium acetate in 5 ml. of absolute ethanol is refluxed for 40 minutes under nitrogen. The reaction mixture is cooled, diluted with water and extracted with chloroform. The chloroform layer is dried over sodium sulfate and then concentrated under vacuum. The crude product is adsorbed on 10 g. of acid washed alumina from a benzene solution. The column is washed with benzene and eluted with a solvent, the composition of which depends on the activity of the alumina employed. The eluates are evaporated to an oil, and crystallized by trituration with ether to afford the 6β-acetoxy-17α,20,20, 21-bis(methylenedioxy)-9α,11β - epoxy - 16α - methyl-3'-phenyl-5α-pregnano-[3,2-d]-3'H-1',2',3'-triazole.

A solution of 172 mg. of the above product dissolved in 5 cc. of chloroform and cooled to −40° C. is added to a reagent consisting of (a) 10 cc. of a 2:1 mixture (by weight) of hydrogen fluoride in tetrahydrofuran, (b) 10.8 cc. of tetrahydrofuran, and (c) 10 cc. of chloroform, the reagent being maintained at −80° C. The tetrahydrofuran used is of reagent grade and is dried over potassium hydroxide and filtered. The reaction mixture is placed in a Dewar flask and maintained at −30° C. for 4 hours. The reaction mixture is then poured into a stirred mixture consisting of 25 g. of anhydrous potassium carbonate, 75 cc. of a mixture of ice and water, and 70 cc. of chloroform. The chloroform layer is separated and the aqueous layer is extracted twice with 2 portions of chloroform. The combined chloroform layers are washed with water, dried over sodium sulfate, and concentrated under vacuum. The crude product crystallizes from an ether solution on seeding, and is recrystallized several times from ethyl acetate. The mother liquors are combined, concentrated and chromatographed on acid washed alumina from benzene solution. The column is washed with 100 ml. portions of benzene, ether, and chloroform ether mixture and the product is eluted with chloroform and is purified by crystallization to afford the 6β-acetoxy-17α,20,20,21 - bis(methylenedioxy) - 9α - fluoro - 11β-hydroxy-16α-methyl-3'-phenyl - 5α - pregnano-[3,2-d]-3'H-1',2',3'-triazole.

A solution of 400 mg. of the above product in 4 ml. of pyridine is added to the complex formed by the addition of 400 mg. of chromium trioxide to 4 ml. of pyridine. The mixture is swirled until thoroughly mixed and then allowed to stand at room temperature over night. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom under vacuum, and the residual crystalline material is purified by crystallization from a mixture of ethyl acetate and ether to give the 6β-acetoxy-17α,20,20, 21-bis(methylenedioxy)-9α-fluoro - 16α - methyl-11-oxo-3'-phenyl-5α-pregnano-[3,2-d]-3'H-1',2',3'-triazole.

The above product (1.0 g.) dissolved in 50 ml. of methanol is refluxed for 15 minutes with 1 g. of potassium hydroxide, dissolved in 5 ml. of water. The solution is neutralized with acetic acid and concentrated to a small volume. The product is then taken up in chloroform and the chloroform layer is washed with water, dried and concentrated under vacuum. Chromatography on acid washed alumina affords the 17α,20,20,21-bis(methylenedioxy)-9α-fluoro 6β-hydroxy-16α-methyl-11 - oxo-3' - phenyl - 5α-pregnano-[3,2-d]-3'H-1',2',3'-triazole.

A solution of thionyl chloride in pyridine is prepared by adding 7.5 cc. of freshly distilled thionyl chloride to 38 cc. of ice-cold anhydrous pyridine. This is added dropwise to a stirred solution of 7.0 g. of 17α,20,20,21-bis-(methylenedioxy)-9α-fluoro-6β - hydroxy-16α-methyl-11-oxo-3'-phenyl-5α-pregnano-[3,2-d]-3'H-1',2'3' - triazole in 45 cc. of anhydrous pyridine. The rate of addition is controlled such that the reaction mixture is maintained at approximately 40° C. The solution is stirred an additional 30 minutes after the addition of the reagent is completed, subsequently cooled in ice and poured into 250 cc. of ice-water. The mixture is extracted with chloroform and the chloroform layer is washed with aqueous sodium bicarbonate solution, dried over sodium sulfate and concentrated under vacum. The crude product, dissolved in benzene, is chromatographed on silica gel. Elution with ether-petroleum ether, and ether-chloroform mixtures affords the 17α,20,20,21-bis(methylenedioxy)-9α-fluoro-16α - methyl-11-oxo-3'-phenyl-5-pregneno-[3,2-d]-3'H-1',2',3'-triazole.

*Example 10*

The following procedures which relate to the 9α-fluorocompounds of Flow Sheet G are particularly described starting with the 17α,20,20,21-bis(methylenedioxy)-16α-methyl-11-oxo-3'-phenyl - 5 - pregneno-[3,2-d]-3'H-1',2', 3'-triazole and are generally applicable to all the 9α-fluoro starting materials defined by Compound 46 of Flow Sheet I.

The 17α,20,20,21 - bis(methylenedioxy) - 9α - fluoro-16α-methyl - 11 - oxo - 3' - phenyl - 5 - pregneno-[3,2-d]-3'H-1',2',3'-triazole of Example 9 (1.0 g.) in 20 ml. of methylene chloride is added to a stirred mixture consisting of 2.6 grams anhydrous hydrogen fluoride, 2.0 grams of lead tetraacetate and 10 ml. of methylene chloride at −75° C. The reaction mixture is maintained at this temperautre for about 30 minutes and poured into an iced cold mixture of aqueous sodium carbonate and chloroform. The mixture is filtered and the organic layer is dried and concentrated. The residue is chromatographed on acid washed alumina to yield 17α,20,20,21-bis(methylenedioxy)-5α,6α,9α - trifluoro-16α-methyl-11-oxo-3'-phenyl-pregnano-[3,2-d]-3'H-1',2',3'-triazole.

A solution consisting of 500 mg. of the above product and 350 mg. of phenyl iodosodichloride in 20 ml. of anhydrous chloroform is allowed to stand for 3 hours at room temperature. The solution is washed with water and aqueous sodium bicarbonate solution, dried and concentrated under vacuum. Chromatography on acid washed alumina afford the 17α,20,20,21-bis(methylenedioxy)-5α,6α-dichloro-9α-fluoro - 16α - methyl - 11 - oxo-3'-phenyl-pregnano-[3,2-d]-3'H-1',2',3'-triazole.

The above product (1.0 g.) dissolved in 50 ml. of methanol is refluxed for 15 minutes with 1 g. of potassium hydroxide, dissolved in 5 ml. of water. The solution is neutralized with acetic acid and concentrated to a small volume. The product is then taken up in chloroform and the chloroform layer is washed with water, dried and concentrated under vacuum. Chromatography on acid washed alumina affords the 17α,20,20,21-bis(methylenedioxy)-6α-chloro-9α-fluoro-16α - methyl-11-oxo-3'-phenyl-4-pregneno-[3,2-d]-3'H-1',2',3'-triazole.

In accordance with the above procedure, but starting with the corresponding 5α,6α-difluoro-derivative, there is obtained the 17α,20,20,21-bis(methylenedioxy)-6α,9α-difluoro-16α-methyl-11-oxo-3'-phenyl - 4 - pregneno-[3,2-d]-3'H-1',2',3'-triazole.

A solution of 500 mg. of the above product in 35 ml. of tetrahydrofuran which has been freshly distilled from lithium aluminum hydride, and a solution of 750 mg. of sodium borohydride in 4 ml. of water are purged 6 times with nitrogen and then the solutions are combined. After stirring at room temperature under nitrogen for 18 hours, the combined solution is cooled to 0–5° C., and a saturated solution of 4.7 grams of monobasic sodium phosphate is added over a time period of approximately 15 minutes. The reaction mixture is stirred for an additional 15 minutes. The slurry is then concentrated under vacuum keeping the temperautre below 25° C. until the tetrahydrofuran is essentially removed. The slurry is cooled, filtered and washed with water until neutral. The product is 17α,20,20,21-bis(methylenedioxy)-6α-chloro-9α-fluoro-11β - hydroxy-16α - methyl-3'-phenyl-4-pregneno-[3,2-d]-3'H-1',2',3'-triazole.

In accordance with the above procedure, but starting with the corresponding 6α-fluoro-derivative, there is obtained the 17α,20,20,21-bis(methylenedioxy) - 6α9α-difluoro-11β-hydroxy-3'-phenyl - 16α - methyl-4-pregneno-[3,2-d]-2'H-1',2',3'-triazole.

The above 17α,20,20,21-bis(methylenedioxy)-derivatives are converted into the corresponding 21-hydroxy-, 21-acyloxy-, 21-phosphate-, 21-desoxy-, 21-chloro- and 21-fluoro-17α-hydroxy-20-oxo-4-pregneno- (or 4,6-pregnadieno-) [3,2-d]-2'H-1',2',3'-triazole, as well as the salts thereof, by following the procedures of Examples 18 and 19.

The 21-hydroxy-, 21-chloro-, 21-fluoro-, and 21-desoxy-steroids, wherein H is present at the 16-position, are converted into the 16α,17α-dihydroxy-steroids and the 16α,17α-acetals and ketals thereof following the procedures of Example 24.

*Example 11*

The following procedures which relate to Flow Sheet J are particularly described starting with the 6β-acetoxy-17α,20,20,21 - bis(methylenedioxy) - 16α-methyl-3'-phenyl - 9α,11β - epoxy - 5α-pregnano-[3,2-d]-3'H-1',2',3'-triazole but are generally applicable to all compounds defined by Compound 42 of Flow Sheet J.

The 6β - acetoxy-17α,20,20,21 - bis(methylenedioxy)-9α,11β - epoxy - 16α-methyl-3'-phenyl - 5α - pregnano-[3,2-d]-3'H-1',2',3'-triazole of Example 9 (1.0 g.), dissolved in 50 ml. of methanol, is refluxed for 15 minutes with 1 g. of potassium hydroxide dissolved in 5 ml. of water. The solution is neutralized with acetic acid and concentrated to a small volume. The product is then taken up in chloroform and the chloroform layer is washed with water, dried and concentrated under vacuum. Chromatography on acid washed alumina affords the 17α,20,20,21 - bis(methylene dioxy) - 9α11β-epoxy-6β - hydroxy - 16α - methyl - 3'-phenyl - 5α-pregnano-[3,2-d]-3'H-1',2',3'-triazole.

A solution of 400 mg. of the above product in 4 ml. of pyridine is added to the complex formed by the addition of 400 mg. of chromium trioxide to 4 ml. of pyridine. The mixture is swirled until thoroughly mixed and then allowed to stand at room temperature over night. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom under vacuum, and the residual crystalline material is purified by crystallization from a mixture of ethyl acetate and ether to give the 17α,20,20,21-bis(methylenedioxy) - 9α,11β - epoxy-16α-methyl-6-oxo-3'-phenyl-5α-pregnano-[3,2-d]3'H-1',2',3'-triazole.

A solution containing 3 cc. of methyl iodide in 10 cc. of ether is added, with stirring, to 300 mg. of magnesium covered with 10 cc. of ether. After the magnesium is consumed an additional 20 cc. of ether is added. To this solution is added with stirring over a period of 10 minutes a solution consisting of 2.91 g. of the 17α,20,20,21-bis(methylenedioxy) - 9α,11β - epoxy-16α-methyl-6-oxo-3'-phenyl-5α-pregnano-[3,2-d]-3'H-1',2',3'-triazole in 40 cc. of benzene. A copius precipitate is observed. The suspension is allowed to stir for an additional half hour and is then decomposed with 40 cc. of water. After the addition of 100 cc. of benzene, the layers are separated, and the aqueous layer is extracted twice with 100 cc. of chloroform. The organic layers are combined, dried over sodium sulfate and concentrated under vacuum. Chromatography on silica gel and elution with ether-petroleum ether and ether-chloroform mixtures affords the 17α,20,20,21-bis(methylenedioxy) - 9α,11β - epoxy-6β-hydroxy-6α,16α-dimethyl - 3' - phenyl - 5α - pregnano [3,2-d]-3'H-1',2',3'-triazole.

A solution of thionyl chloride in pyridine is prepared by adding 7.5 cc. of freshly distilled thionyl chloride to 38 cc. of ice-cold anhydrous pyridine. This is added dropwise to a stirred solution of 7.0 g. of 17α,20,20,21-bis(methylenedioxy) - 9α,11β - epoxy - 6,16 - dimethyl-6β - hydroxy - 3' - phenyl - 5α-pregnano-[3,2-d] - 3'H-1',2',3'-triazole in 45 cc. of anhydrous pyridine. The rate of addition is controlled such that the reaction mixture is maintained at approximately 40° C. The solution is stirred an additional 30 minutes after the addition of the reagent is completed, subsequently cooled in ice and poured into 250 cc. of ice-water. The mixture is extracted with chloroform and the chloroform layer is washed with aqueous sodium bicarbonate solution, dried over sodium sulfate and concentrated under vacuum. The crude product, dissolved in benzene, is chromatographed on silica gel. Elution with ether-petroleum ether, and ether-chloroform mixtures affords the 17α,20,20,21-bis(methylenedioxy) - 9α,11β - epoxy - 6,16α - dimethyl-3'-phenyl-5-pregneno-[3,2-d]-3'H-1',2',3'-triazole.

A solution of 172 mg. of the above product dissolved in 5 cc. of chloroform and cooled to −40° C. is added to a reagent consisting of (a) 10 cc. of a 2:1 mixture (by weight) of hydrogen fluoride in tetrahydrofuran, (b) 10.8 cc. of tetrahydrofuran, and (c) 10 cc. of chloroform, the reagent being maintained at −80° C. The tetrahydrofuran used is of reagent grade and is dried over potassium hydroxide and filtered. The reaction mixture is placed in a Dewar flask and maintained at −30° C. for 4 hours. The reaction mixture is poured into a stirred mixture consisting of 25 g. of anhydrous potassium carbonate, 75 cc. of a mixture of ice and water, and 70 cc. of chloroform. The chloroform layer is separated and the aqueous layer is extracted twice with 2 portions of chloroform. The combined chloroform layers are washed with water, dried over sodium sulfate, and concentrated under vacuum. The crude product crystallizes from an ether solution on seeding, and is recrystallized several times from ethyl acetate. The mother liquors are combined, concentrated and chromatographed on acid washed alumina from benzene solution. The column is washed with 100 ml. portions of benzene, ether, and chloroform-ether mixture and the product is eluted with chloroform and is purified by crystallization to afford the 17α,20,20,21-bis(methylenedioxy) - 9α - fluoro - 11β - hydroxy-6,16α-dimethyl-3'-phenyl-5-pregneno-[3,2-d]-3'H-1',2',3'-triazole.

A solution consisting of 520 mg. of the above product and 500 mg. of selenium dioxide in 35 ml. of butanone dioxolane is refluxed for 3–5 hours. The cooled solution is filtered, washed with aqueous sodium carbonate solution, dried and concentrated under vacuum. Crystallization from ethyl acetate affords the 17α,20,20,21-bis (methylenedioxy) - 9α-fluoro-4ξ,11β-dihydroxy-6,16αdimethyl-3'-phenyl-5-pregneno-[3,2-d]-3'H-1',2',3'-triazole.

A suspension containing 80 mg. of the above product and 8 cc. of 60% aqueous formic acid is heated inside a steam cone for 40 minutes. The resulting solution is cooled and extracted with chloroform. The chloroform layer is washed with aqueous sodium bicarbonate solution, dried over sodium sulfate and concentrated under vacuum. The crude concentrate is dried by azeotropic distillation with benzene and then subsequently treated for 15 minutes with 0.07 milliequivalent of sodium methoxide in 1.0 ml. of methanol in water to cleave any formate esters. Isolation by partition chromatography affords the 9α - fluoro - 11β,17α,21 - trihydroxy - 6,16αdimethyl - 20-oxo-3'-phenyl-4,6-pregnadiene-[3,2-d]-3'H-1',2',3'-triazole. After neutralization of the above product with acetic acid the solution is diluted with water and extracted with chloroform. The chloroform layer is dried over sodium sulfate and concentrated under vacuum. The material is acetylated with acetic anhydride in pyridine, and chromatographed on silica gel. The column is eluted with ether-chloroform mixtures to obtain the 9α-fluoro - 11β,17α,21-trihydroxy-6,16α-dimethyl-20-oxo-3'-phenyl - 4,6-pregnadieno - [3,2-d]-3'H-1',2',3',-triazole 21-acetate.

The above 21-hydroxy-derivatives are converted into the corresponding 21-acyloxy-, 21-phosphates, 21-desoxy-, 21-chloro- and 21-fluoro-4,6-pregnadieno-[3,2-d]-3'H-1',2',3'-triazole, as well as the salts thereof, by following the procedures of Examples 18 and 19.

In accordance with the above procedure, but starting with the 3'-p-fluorophenyl-derivative in place of the 3-phenyl derivative, the corresponding 3'-p-fluorophenyl-products are obtained.

The 21-hydroxy-, 21-chloro-, 21-fluoro-, and 21-desoxy-steroids, wherein H is present at the 16-position, are converted into the 16α,17α-dihydroxy-steriods and the 16α,17α-acetals and ketals thereof following the procedures of Example 24.

*Example 12*

The following procedures which relate to Flow Sheet K are particularly described starting with 6β-acetoxy-17α,20,20,21 - bis(methylenedioxy) - 16α-methyl-3'-phenyl-9 (11)-pregneno-[3,2-d]-3'H-1',2',3'-triazole, but are generally applicable to all of the starting materials defined by Flow Sheet K.

To a stirred, cooled (0–5° C.) solution of 6β-acetoxy-17α,20,20,21 - bis(methylenedioxy)-16α-methyl-3'-phenyl-9(11)-pregneno-[3,2-d]-3'H-1',2',3'-triazole of Example 9 (1.0 g.) and lithium chloride (4.0 g.) in glacial acetic acid (40 ml.) is added N-chlorosuccinimide (383 mg., 1.1 equivalent) followed immediately by an anhydrous solution of hydrogen chloride (104 mg.) in tetrahydrofuran (1.0 ml.). Stirring is continued at room temperature for 3 hours, and the reaction mixture is poured into water (400 ml.). The resulting mixture is filtered and the residue is washed with water, and dried to yield a crude product. Crystallization from acetone gives 6β-acetoxy - 17α,20,20,21 - bis(methylenedioxy) - 9α,11β-dichloro-16α - methyl-3'-phenyl-5αpregnano-[3,2-d]-3'H-1',2',3'-triazole.

The above product (1.0 g.) dissolved in 50 ml. of methanol is refluxed for 15 minutes with 1 g. of potassium hydroxide dissolved in 5 ml. of water. The solution is neutralized with acetic acid and concentrated to a small volume. The product is then taken up in chloroform and the chloroform layer is washed with water, dried and concentrated under vacuum. Chromatography on acid washed alumina affords the 17α,20,20,21-bis(methylenedioxy-9α,11β - dichloro-6β-hydroxy-16α-methyl-3'-phenyl-5α-pregnano-[3,2-d]-3'H-1',2',3',-triazole.

A solution of 400 mg. of the above product in 4 ml. of pyridine is added to the complex formed by the addition of 400 mg. of chromium trioxide to 4 ml. of pyridine. The mixture is swirled until thoroughly mixed and then allowed to stand at room temperature over night. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom under vacuum, and the residual crystalline material is purified by crystallization from a mixture of ethyl acetate and ether to give the 17α,20,20,21-bis (methylenedioxy) - 9α,11β-dichloro-16α-methyl-6-oxo-3'-phenyl-5α-pregnano-[3,2-d]-3'H-1',2',3'-triazole.

*Example 13*

The following procedures which relate to Flow Sheet L are particularly described starting with 17α,20,20,21-bis (methylenedioxy) - 3-ethylenedioxy - 16α-methyl-5-pregnene-11-one, but are generally applicable to all of the starting materials defined by Flow Sheet L.

A solution consisting of 0.44 g. of 17α,20,20,21-bis (methylenedioxy)-3-ethylenedioxy-16α-methyl - 5 - pregnene-11-one (Example 3), 5 ml. of hydrazine and 3.5 g. of potassium hydroxide in 15 ml. of diethylene glycol is heated under an atmosphere of nitrogen at 250° C. for 6 hours. The solution is cooled, allowed to stand at room temperature over night, and extracted with ether. The extract is washed with water, dried and concentrated. The crude product is percolated through silica gel to yield 17α,20,20,21 - bis(methylenedioxy) - 3 - ethylenedioxy-16α-methyl-5-pregnene.

A solution of 22.9 grams of the above product in 200 ml. of benzene is added to 460 ml. of perbenzoic acid (0.325 M) over a time period of approximately 30 minutes while keeping the temperature at 20–25° C., the perbenzoic acid solution having been dried over magnesium sulfate prior to use. After 48 hours at room temperature the titre indicates that about 120% of the theoretical amount of perbenzoic acid has been consumed. The solution is cooled to 10° C. and a 15% solution of sodium bisulfite cooled to a temperature of less than 20° C., is added with good agitation until a negative potassium iodide test is obtained. The aqueous phase is removed and the benzene is washed with 5% sodium bicarbonate solution until it is acid free, and is then washed with water. After drying, the benzene is concentrated under vacuum to yield a mixture of the α and β isomers of 5,6-epoxy - 17α,20,20,21 - bis(methylenedioxy)-3-ethylenedioxy-16α-methyl-5α-pregnane in a ratio of about 6–4. The isomers are separated by chromatography on Florisil (an activated magnesium silicate made according to U.S. Patent 2,393,625). Elution with 5% acetone in hexane and recrystallization from a mixture of benzene and hexane gives the β-isomer. The α-isomer is obtained by elution with 10% acetone in hexane and then recrystallizing from a mixture of benzene and hexane.

The α-isomer of the above compound is dissolved in 300 cc. of 98–100% formic acid at room temperature and allowed to stand for 2.5 hours. The solution is poured into water and extracted with chloroform. The chloroform solution is washed with saturated aqueous sodium bicarbonate solution, dried over sodium sulfate and concentrated under vacuum. The crude mixed formates are dissolved in 1400 cc. of methanol, refluxed for one-half hour under nitrogen with a solution consisting of 27 g. of potassium hydroxide and 135 cc. of water. The cooled solution is neutralized with 37 cc. of acetic acid and concentrated under vacuum at 30° C. The resulting solution is poured into water and extracted with chloroform. The chloroform layer is washed with aqueous sodium bicarbonate solution, dried over sodium sulfate and concentrated under vacuum. Crystallization from methanol gives the 17α-20,20,21-bis(methylenedioxy)-16α-methyl-5α-pregnane-3,6-dione.

A solution consisting of 8.0 grams of the above product and 8 ml. of morpholine in 80 ml. of benzene is refluxed vigorously for 1 hour in the presence of Linde molecular sieves contained in a Soxhlet extractor. The solution is cooled and concentrated. Crystallization from a mixture of ethyl acetate and ether affords the 17α,20,20,21-bis(methylenedioxy)-16α-methyl - 3 - morpholino-5α,2-pregnene-6-one.

A solution consisting of 2.1 g. of the above product, and 1.5 ml. of phenyl azide in 30 ml. of benzene is refluxed over night to form a mixture of 1'- and 3'-phenyl-17α,20,20,21-bis(methylenedioxy) - 16α - methyl-6-oxo-5α-pregnano-[3,2-d]-1'H (and 3'H) - 1',2',3'-triazole. The solution is concentrated under vacuum and chromatographed on 100 g. of acid washed alumina. Elution with chloroform and ethyl acetate, and crystallization gives the 3'-phenyl derivative.

A solution of 500 mg. of the above 3'-phenyl compound in 35 ml. of tetrahydrofuran which has been freshly distilled from lithium aluminum hydride, and a solution of 750 mg. of sodium borohydride in 4 ml. of water are purged 6 times with nitrogen and then the solutions are combined. After stirring at room temperature under nitrogen for 1 hour, the combined solution is cooled to 0–5° C., and a saturated solution of 4.7 grams of monobasic sodium phosphate is added over a time period of approximately 15 minutes. The reaction mixture is stirred for an additional 15 minutes. The slurry is then concentrated under vacuum keeping the temperature below 25° C. until the tetrahydrofuran is essentially removed. The slurry is cooled, filtered and washed with water until neutral. The product is the 17α,20,20,21-bis(methylenedioxy) - 6β - hydroxy-3'-phenyl-16α-methyl-5α-pregnano-[3,2-d]-3'H-1',2',3'-triazole.

*Example 14*

The following procedures which relate to Flow Sheet M are particularly described starting with 17α,20,20,21-bis(methylenedioxy) - 9α,11β - dichloro - 16α-methyl-6-oxo-3'-phenyl - 5α - pregnano-[3,2-d]-3'H-1',2',3'-triazole but are generally applicable to all of the starting materials defined by Flow Sheet M.

A solution containing 3 cc. of methyl iodide in 10 cc. of ether is added, with stirring, to 300 mg. of magnesium covered with 10 cc. of ether. After the magnesium is consumed an additional 20 cc. of ether is added. To this solution is added with stirring over a period of 10 minutes a solution consisting of 2.91 g. of the 17α,20,20,21 - bis(methylenedioxy) - 9α,11β - dichloro-16α-methyl - 6 - oxo-3' - phenyl-5α-pregnano-[3,2-d]-3'H-1',2',3'-triazole in 40 cc. of benzene. A copious precipitate is observed. The suspension is allowed to stir for an additional half hour and is then decomposed with 40 cc. of water. After the addition of 100 cc. of benzene, the layers are separated, and the aqueous layer is extracted twice with 100 cc. of chloroform. The organic layers are combined, dried over sodium sulfate and concentrated under vacuum. Chromatography on silica gel and elution with ether-petroleum ether and ether-chloroform mixtures afford the 17α,20,20,21-bis(methylenedioxy)-9α,11β - dichloro - 6β - hydroxy-6α,16α-dimethyl - 3' - phenyl - 5α-pregnano-[3,2-d]-3'H-1',2',3'-triazole.

A solution of thionyl chloride in pyridine is prepared by adding 7.5 cc. of freshly distilled thionyl chloride to 38 cc. of ice-cold anhydrous pyridine. This is added dropwise to a stirred solution of 7.0 g. of 17α,20,20,21-bis(methylenedioxy) - 9α,11β - dichloro - 6β - hydroxy-6α,16α-dimethyl-3'-phenyl-5α-pregnano-[3,2-d] - 3'H-1',2',3'-triazole in 45 cc. of anhydrous pyridine. The rate of addition is controlled such that the reaction mixture is maintained at approximately 40° C. The solution is stirred an additional 30 minutes after the addition of the reagent is completed, subsequently cooled in ice and poured into 250 cc. of ice-water. The mixture is extracted with chloroform and the chloroform layer is washed with aqueous sodium bicarbonate solution, dried over sodium sulfate and concentrated under vacuum. The crude product, dissolved in benzene, is chromatographed on silica gel. Elution with ether-petroleum ether, and ether-chloroform mixtures affords 17α,20,20,21-bis(methylenedioxy) - 9α,11β - dichloro-6,16α-dimethyl-3'-phenyl-5-pregneno-[3,2-d]-3'H-1',2',3'-triazole.

A solution consisting of 520 mg. of the above product and 500 mg. of selenium dioxide in 35 ml. of butanone dioxolane is refluxed for 3–5 hours. The cooled solution is filtered, washed with aqueous sodium carbonate solution, dried and concentrated under vacuum. Crystallization from ethyl acetate affords the 17α,20,20,21-bis(methylenedioxy) - 9α,11β-dichloro-4ξ-hydroxy-6,16α-dimethyl-3'-phenyl-5-pregneno-[3,2-d]-3'H-1',2',3'-triazole.

A suspension containing 80 mg. of the 17α,20,20,21-bis(methylenedioxy) - 9α,11β - dichloro-4ξ-hydroxy-6,16α-dimethyl-3'-phenyl-5-pregneno-[3,2-d]-3'H-1',2',3' - triazole and 8 cc. of 60% aqueous formic acid is heated inside a steam cone for 40 minutes. The resulting solution is cooled and extracted with chloroform. The chloroform layer is washed with aqueous sodium bicarbonate solution, dried over sodium sulfate and concentrated under vacuum. The crude concentrate is dried by azeotropic distillation with benzene and then subsequently treated for 15 minutes with 0.07 milliequivalents of sodium methoxide in 1.0 ml. of methanol in water to cleave any formate esters. After neutralization with acetic acid the solution is diluted with water and extracted with chloroform. The chloroform layer is dried over sodium sulfate and concentrated under vacuum. The material is acetylated with acetic anhydride in pyridine, and chromatographed on silica gel. The column is eluted with ether-chloroform mixtures to obtain the 9α,11β-dichloro-17α,21-dihydroxy - 3'-phenyl-6,16α-dimethyl-4,6-pregnadieno-[3,2-d]-3'H-1',2',3'-triazole.

In accordance with the above procedures, but starting with the 17α,20,20,21-bis(methylenedioxy)-16α-methyl-6-oxo-3'-phenyl - 5α - pregnano-[3,2-d]-3'H-1',2'3'-triazole there is obtained the corresponding 17α,21-dihydroxy-6,16α - dimethyl - 3' - phenyl-4,6-pregnadieno-[3,2-d]-3'H-1',2',3'-triazole.

The above 21-hydroxy-derivatives are converted into the corresponding 21-acyloxy-, 21-phosphates-, 21-desoxy-, 21-chloro- and 21-fluoro-17α-hydroxy-20-oxo-4-pregneno-(or 4,6-pregnadieno)-[3,2-d]-3'H-1',2',3'-triazole, as well as the salts thereof, by following the procedures of Examples 18 and 19.

The 21-hydroxy-, 21-chloro-, 21-fluoro-, and 21-desoxy-steroids, wherein H is present at the 16-position, are converted into the 16α,17α-dihydroxy-steroids and the 16α,17a-acetals and ketals thereof following the procedures of Example 24.

*Example 15*

The following procedures which relate to Flow Sheet N are particularly described starting with 17α,20,20,21-bis(methylenedioxy) - 9α,11β - dichloro - 6β - hydroxy - 16α-methyl-3'-phenyl-5α - pregnano - [3,2-d] - 3'H-1',2'-3'-triazole but are generally applicable to all of the starting materials defined by Flow Sheet N.

A solution of thionyl chloride in pyridine is prepared by adding 7.5 cc. of freshly distilled thionyl chloride to 38 cc. of ice-cold anhydrous pyridine. This is added dropwise to a stirred solution of 7.0 g. of 17α,20,20,21-bis(methylenedioxy) - 9α,11β - dichloro-6β-hydroxy-16α-methyl-3′-phenyl-5α - pregnano - [3,2-d] - 3′H-1′,2′,3′-triazole in 45 cc. of anhydrous pyridine. The rate of addition is controlled such that the reaction mixture is maintained at approximately 40° C. The solution is stirred an additional 30 minutes after the addition of the reagent is completed, subsequently cooled in ice and poured into 250 cc. of ice-water. The mixture is extracted with chloroform and the chloroform layer is washed with aqueous sodium bicarbonate solution, dried over sodium sulfate and concentrated under vacuum. The crude product, dissolved in benzene, is chromatographed on silica gel. Elution with ether-petroleum ether, and ether-chloroform mixtures affords 17α,20,20,21 - bis(methylenedioxy) - 9α,11β-dichloro - 16α - methyl-3′-phenyl-5-pregneno-[3,2-d]-3′H-1′,2′,3′-triazole.

A solution containing 16.5 g. of the above product and 45 milliequivalents of perbenzoic acid in a total volume of 350 ml. of benzene is stirred in the dark at room temperature for 45 hours. The reaction mixture is washed with saturated aqueous sodium bicarbonate solution and dried over sodium sulfate. The product is then concentrated under vacuum to yield the crude 17α,20,20,21-bis(methylenedioxy) - 9α,11β - dichloro - 5α,6α - epoxy-16α-methyl-3′-phenyl-5α-pregnano-[3,2-d]-3′H - 1′,2′,3′ - triazole after purification.

To a solution of 250 mg. of the above product in 60 ml. of dry benzene under a nitrogen atmosphere is added 2.33 ml. of 3 M methylmagnesium bromide in ether. The mixture is heated at 70° C. under nitrogen for 5 hours. After cooling to 0–5° C., 5.6 g. of ammonium chloride in 56 ml. of water is added over a time period of approximately 20 minutes. The benzene is separated and the aqueous layer is extracted two times with 20 ml. of benzene. The combined benzene layers are washed neutral with water, dried with magnesium sulfate and concentrated to dryness. The crude 17α,20,20,21-bis(methylenedioxy)-9α,11β - dichloro-5α-hydroxy-6β,16α-dimethyl-3′-phenyl-5-pregnano-[3,2-d]-3′H-1′,2′,3′-triazole can be used for the next reaction, or it may be first crystallized from an organic solvent.

A solution of thionyl chloride in pyridine is prepared by adding 7.5 cc. of freshly distilled thionyl chloride to 38 cc. of ice-cold anhydrous pyridine. This is added dropwise to a stirred solution of 7.0 g. of 17α,20,20,21-bis (methylenedioxy)9α,11β - dichloro-5α-hydroxy-6β,16α-dimethyl-3′-phenyl-5-pregnano-[3,2-d]-3′H-1′,2′,3′ - triazole in 45 cc. of anhydrous pyridine. The rate of addition is controlled such that the reaction mixture is maintained at approximately 40° C. The solution is stirred an additional 30 minutes after the addition of the reagent is completed, subsequently cooled in ice and poured into 250 cc. of ice-water. The mixture is extracted with chloroform and the chloroform layer is washed with aqueous sodium bicarbonate solution, dried over sodium sulfate and concentrated under vacuum. The crude product, dissolved in benzene, is chromatographed on silica gel. Elution with ether-petroleum ether, and ether-chloroform mixtures affords 17α,20,20,21 - bis(methylenedioxy) - 9α,11β-dichloro - 6β,16α - dimethyl-3′-phenyl-4-pregneno-[3,2-d]-3′H-1′,2′,3′-triazole.

The above product (1.0 g.) dissolved in 50 ml. of methanol is refluxed for 15 minutes with 1 g. of potassium hydroxide dissovled in 5 ml. of water. The solution is neutralized with acetic acid and concentrated to a small volume. The product is then taken up in chloroform and the chloroform layer is washed with water, dried and concentrated under vacuum. Chromatograph on acid washed alumina affords the 17α,20,20,21-bis(methylenedioxy) - 9α,11β - dichloro - 6α,16α-dimethyl-3′-phenyl-4-pregneno-[3,2-d]-3′H-1′,2′,3′-triazole.

In accordance with the above procedures, but starting with the 17α,20,20,21-bis(methylenedioxy)-6β-hydroxy-16α - methyl-3′-phenyl-5-pregnano - [3,2-d]-3′H-1′,2′,3′-triazole there is obtained the corresponding 17α,20,20,21-bis(methylenedioxy) - 6α,16α-dimethyl-3′-phenyl-4-pregneno-[3,2-d]-3′H-1′,2′,3′-triazole.

The above 17α,20,20,21-bis(methylenedioxy)-derivatives are converted into the corresponding 21-hydroxy-, 21-acyloxy-, 21-phosphates, 21-desoxy-, 21-chloro- and 21 - fluoro-17α-hydroxy-20-oxo-4-pregneno - (or 4,6-pregnadieno)-[3,2-d]-3′H-1′,2′,3′-triazole, as well as the salts thereof, by following the procedures of Examples 18 and 19.

*Example 16*

The following procedures which relate to Flow Sheet O are particularly described starting with 17α,20,20,21-bis (methylenedioxy) - 9α,11β-dichloro-16α-methyl-3′-phenyl-5-pregneno-[3,2-d]-3′H-1′,2′,3′-triazole but are generally applicable to all of the starting materials defined by Flow Sheet O.

The 17α,20,20,21-bis(methylenedioxy)-9α,11β-dichloro-16α - methyl-3′-phenyl-5-pregneno - [3,2-d]-3′H-1′,2′,3′-triazole (1.0 g.) in 20 ml. of methylene chloride is added to a stirred mixture consisting of 2.6 grams anhydrous hydrogen fluoride, 2.0 grams of lead tetraacetate and 10 ml. of methylene chloride at −75° C. The reaction mixture is maintained at this temperature for about 30 minutes and poured into an iced cold mixture of aqueous sodium carbonate and chloroform. The mixture is filtered and the organic layer is dried and concentrated. The residue is chromatographed on acid washed alumina to yield the 17α,20,20,21 - bis(methylenedioxy) - 9α,11β - dichloro-5α,6α - difluoro-16α-methyl-3′-phenyl-5α-pregnano-[3,2d]-3′H-1′,2′,3′-triazole.

The above product (1.0 g.) dissolved in 50 ml. of methanol is refluxed for 15 minutes with 1 g. of potassium hydroxide dissolved in 5 ml. of water. The solution is neutralized with acetic acid and concentrated to a small volume. The product is then taken up in chloroform and the chloroform layer is washed with water, dried and concentrated under vacuum. Chromatography on acid washed alumina affords 17α,20,20,21-bis(methylenedioxy)-6α-fluoro-9α,11β - dichloro-16α-methyl-3′-phenyl-4-pregneno-[3,2-d]-3′H-1′,2′,3′-triazole.

A solution consisting of 500 mg. of 17α,20,20,21-bis (methylenedioxy) - 9α,11β - dichloro-5α,6α-difluoro-16α-methyl-3′-phenyl-5α-pregnano - [3,2-d] - 3′H-1′,2′,3′-triazole and 350 mg. of phenyl iodosodichloride in 20 ml. of anhydrous chloroform is allowed to stand for 3 hours at room temperature. The solution is washed with water and aqueous sodium bicarbonate solution, dried and concentrated under vacuum. Chromatography on acid washed alumina affords the 17α,20,20,21-bis(methylenedioxy)-5α,6α,9α,11β-tetrachloro - 16α - methyl-3′-phenyl-5α-pregnano-[3,2-d]-3′H-1′,2′,3′-triazole.

In accordance with the above procedure, but starting with the corresponding 5α,6α,9α,11β-tetrachloro-derivative there is obtained the 17α,20,20,21-bis(methylenedioxy)-6α,9α11β - trichloro-16α-methyl-3′-phenyl - 4 - pregneno-[3,2-d]-3′H-1′,2′,3′-triazole.

In accordance with all of the above procedures, but starting with the 17α,20,20,21-bis(methylenedioxy)-16α-methyl - 3′-phenyl-5-pregneno-[3,2-d]-3′H-1′,2′,3′-triazole there are obtained the corresponding 6α-chloro- and the 6α - fluoro - 17α,20,20,21-bis(methylenedioxy)-16α-methyl-3′-phenyl-4-pregneno-[3,2-d]-3′H-1′,2′,3′-triazole.

The above 17α,20,20,21 - bis(methylenedioxy)-derivatives are converted into the corresponding 21-hydroxy-, 21-acyloxy-, 21-phosphates-, 21-desoxy-, 21-chloro- and 21 - fluoro-17α-hydroxy-20-oxo-4-pregneno- (or 4,6-pregnadieno)-[3,2-d]-3′H-1′,2′,3′-triazole as well as the salts thereof, by following the procedures of Examples 18 and 19.

The 21-hydroxy-, 21-chloro-, 21-fluoro-, and 21-desoxy-steroids, wherein H is present at the 16-position, are converted into the 16α,17α-dihydroxy-steroids and the 16α, 17α-acetals and ketals thereof following the procedures of Example 24.

Example 17

The following procedures which relate to Flow Sheet P are particularly described starting with 17α,20,20,21-bis(methylenedioxy) - 9α,11β - dichloro - 5α,6α - epoxy-16α-methyl - 3' - phenyl-5-pregnano-[3,2-d]-3'H-1',2',3'-triazole, but are generally applicable to all of the starting materials defined by Flow Sheet P.

To a solution of 100 mg. of 17α,20,20,21-bis(methylenedioxy) - 9α,11β - dichloro - 5α,6α - epoxy - 16α-methyl-3'-phenyl - 5 - pregnano - [3,2-d]-3'H-1',2',3'-triazole (Flow Sheet N) in 4 ml. of chloroform is added 5 ml. of concentrated hydrochloric acid. The two-phase mixture is stirred at 25° C. for 1 hour. Addition of water and chloroform extraction gives the 17α,20,20,21-bis(methylenedioxy) - 6β,9α,11β - trichloro - 5α - hydroxy-16α-methyl-3'-phenyl-5α-pregnano-[3,2-d]-3'H-1',2',3'-triazole.

A solution of 172 mg. of 17α,20,20,21-bis(methylenedioxy) - 9α,11β - dichloro - 5α,6α - epoxy - 16α-methyl-3'-phenyl - 5-pregnano-[3,2-d]-3'H-1',2',3'-triazole dissolved in 5 cc. of chloroform and cooled to −40° C., is added to a reagent consisting of (a) 10 cc. of a 2:1 mixture (by weight) of hydrogen fluoride in tetrahydrofuran, (b) 10.8 cc. of tetrahydrofuran, and (c) 10 cc. of chloroform, the reagent being maintained at −80° C. The tetrahydrofuran used is of reagent grade and is dried over potassium hydroxide and filtered. The reaction mixture is placed in a Dewar flask and maintained at −30° C. for 4 hours. The reaction mixture is then poured into a stirred mixture consisting of 25 g. of anhydrous potassium carbonate, 75 cc. of a mixture of ice and water, and 70 cc. of chloroform. The chloroform layer is separated and the aqueous layer is extracted twice with 2 portions of chloroform. The combined chloroform layers are washed with water, dried over sodium sulfate, and concentrated under vacuum. The crude product crystallizes from an ether solution on seeding, and is recrystallized several times from ethyl acetate. The mother liquors are combined, concentrated and chromatographed on acid washed alumina from benzene solution. The column is washed with 100 ml. portions of benzene, ether, and chloroform-ether mixtures and the product is eluted with chloroform and purified by crystallization to afford the 17α,20,20,21-bis(methylenedioxy) - 9α,11β-dichloro-6β-fluoro-5α-hydroxy-16α-methyl-3'-phenyl-pregnano-[3,2-d]-3'H-1',2',3'-triazole.

A solution of thionyl chloride in pyridine is prepared by adding 7.5 cc. of freshly distilled thionyl chloride to 38 cc. of ice-cold anhydrous pyridine. This is added dropwise to a stirred solution of 7.0 g. of the 17α,20,20,21-bis(methylenedioxy) - 6β,9α,11β - trichloro-5α-hydroxy-16α-methyl - 3' - phenyl-5α-pregnano-[3,2-d]-3'H-1',2',3'-triazole in 45 cc. of anhydrous pyridine. The rate of addition is controlled such that the reaction mixture is maintained at approximately 40° C. The solution is stirred an additional 30 minutes after the addition of the reagent is completed, subsequently cooled in ice and poured into 250 cc. of ice-water. The mixture is extracted with chloroform and the chloroform layer is washed with aqueous sodium bicarbonate solution, dried over sodium sulfate and concentrated under vacuum. The crude product, dissolved in benzene, is chromatographed on silica gel. Elution with ether-petroleum ether, and ether-chloroform mixtures affords the 17α,20,20,21-bis(methylenedioxy)-6β,9α,11β - trichloro - 16α - methyl-3'-phenyl-4-pregneno-[3,2-d]-3'H-1',2',3'-triazole.

In accordance with the above procedure but starting with the corresponding 6β-fluoro-derivative the corresponding 17α,20,20,21 - bis(methylenedioxy) - 9α,11β - dichloro-6β-fluoro - 16α - methyl - 3' - phenyl-4-pregneno-[3,2-d]-3'H-1',2',3'-triazole is obtained.

A suspension of 17α,20,20,21-bis(methylenedioxy)-6β,9α,11β - trichloro - 16α-methyl-3'-phenyl-4-pregneno-[3,2-d]-3'H-1',2',3'-triazole (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give the 17α,20,20,21-bis(methylenedioxy)-6,9α,11β-trichloro-16α - methyl-3'-phenyl-4,6-pregnadieno-[3,2-d]-3'H-1',2',3'-triazole.

In accordance with the above procedures, but using the 6β-fluoro-derivative in place of the 6β-chloro-derivative, there is obtained the 17α,20,20,21-bis(methylenedioxy)-9α,11β - dichloro - 6 - fluoro - 16α - methyl-3'-phenyl-4,6-pregnadieno-[3,2-d]-3'H-1',2',3'-triazole.

In accordance with all of the above procedures, but starting with the 17α,20,20,21-bis(methylenedioxy)-5α,6α-epoxy-16α-methyl - 3'-phenyl - 5-pregneno-[3,2-d]-3'H-1',2',3'-triazole, there is obtained the corresponding 6β-chloro- and 6β-fluoro-17α,20,20,21-bis(methylenedioxy)-16α-methyl - 3'-phenyl - 4-pregneno-[3,2-d]-3'H-1',2',3'-triazole and the 6-chloro- and 6-fluoro-17α,20,20,21-bis-(methylenedioxy) - 16α-methyl - 3'-phenyl - 4,6-pregnadieno-[3,2-d]-3'H-1',2',3'-triazole.

The above 17α,20,20,21-bis(methylenedioxy)-derivatives are converted into the corresponding 21-hydroxy-, 21-acyloxy-, 21-phosphates-, 21-desoxy-, 21-chloro- and 21-fluoro-17α-hydroxy-20-oxo-4-pregneno- (or 4,6-pregnadieno)-[3,2-d]-3'H-1'2',3'-triazole, as well as the salts thereof, by following the procedures of Example 18.

Example 18

The following procedures which relate to Flow Sheet Q are particularly described starting with 17α,20,20,21-bis-(methylenedioxy)-11β-hydroxy - 16α-methyl - 3'-phenyl-4-pregneno-[3,2-d]-3'H-1',2',3'-triazole, but are generally applicable to all of the starting materials defined by Flow Sheet Q wherein $R_5$ is a substituent other than hydrogen.

A suspension containing 80 mg. of 17α,20,20,21-bis-(methylenedioxy)-11β-hydroxy - 16α-methyl - 3'-phenyl-4-pregneno-[3,2-d]-3'H-1',2',3'-triazole of Example 4 and 8 cc. of 60% aqueous formic acid is heated inside a steam cone for 40 minutes. The resulting solution is cooled and extracted with chloroform. The chloroform layer is washed with aqueous sodium bicarbonate solution, dried over sodium sulfate and concentrated under vacuum. The crude concentrate is dried by azeotropic distillation with benzene and then subsequently treated for 15 minutes with 0.07 milliequivalents of sodium methoxide in 1.0 ml. of methanol in water to cleave any formate esters. Isolation by crystallization affords the 11β,17α,21-trihydroxy - 16α-methyl-20-oxo-3'-phenyl-4-pregneno-[3,2-d]-3'H-1',2',3'-triazole. After neutralization with acetic acid the solution is diluted with water and extracted with chloroform. The chloroform layer is dried over sodium sulfate and concentrated under vacuum. The material is acetylated with acetic anhydride in pyridine, and chromatographed on silica gel. The column is eluted with ether chloroform mixtures to obtain 11β-17α,21-trihydroxy - 16α-methyl - 20-oxo-3'-phenyl - 4-pregneno-[3,2-d]-3'H-1',2',3'-triazole 21-acetate.

The 11β,17α,21-trihydroxy - 16α-methyl - 20-oxo-3'-phenyl-4-pregneno-[3,2-d]-3'H-1',2',3'-triazole is treated with a mixture of 1.5 ml. of pyridine and 1.5 ml. of acetic anhydride and the mixture is allowed to stand at room temperature overnight. The solvents are removed under vacuum, water is added and the 11β,17α,21-trihydroxy - 16α-methyl-20-oxo-3'-phenyl-4-pregneno-[3,2-d]-3'H-1',2',3'-triazole 21-acetate is removed by filtration. After drying, the compound is dissolved in methylene chloride, a few drops of 2.5 N HCl are added and the mixture is taken to dryness. The resulting 11β,17α,21-trihydroxy - 16α-methyl - 20-oxo-3'-phenyl-4-pregneno-[3,2-d]-3'H-1',2',3'-triazole 21-acetate hydrochloride salt is soluble in methylene chloride and can be crystallized from acetone.

In accordance with the above procedure, but adding an equivalent amount of sulfuric acid, chloric acid, perchloric acid, picric acid or trichloroacetic acid in place of the hydrochloric acid the corresponding sulfate, chlorate, perchlorate, picrate or trichloroacetate salt is formed.

The $11\beta,17\alpha,21$-trihydroxy - $16\alpha$-methyl - 20-oxo-3'-phenyl - 4-pregneno - [3,2-d]-3'H-1',2',3'-triazole (100 mg.) is dissolved in 1.2 cc. of dimethylformamide. The solution is cooled to 0° C. and 0.07 cc. of methane sulfonyl chloride is added. The mixture is kept at 0° C. for about one hour, 3 cc. of water is added and the product is extracted into 100 cc. of chloroform, washed with water, dried over sodium sulfate and taken to dryness to afford the $11\beta,17\alpha,21$-trihydroxy - $16\alpha$-methyl - 20-oxo-3'-phenyl - 4-pregneno - [3,2-d]-3'H-1',2',3'-triazole 21-mesylate.

To a solution of 62 mg. of $11\beta,17\alpha,21$-trihydroxy-$16\alpha$-methyl - 20-oxo-3'-phenyl - 4-pregneno-[3,2-d]-3'H-1',2',3'-triazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of $17\alpha,21$-epoxy-$11\beta$-hydroxy-$16\alpha$-methyl - 20-oxo-3'-phenyl - 4-pregneno-[3,2-d]-3'H-1',2',3'-triazole and 21-fluoro-$11\beta,17\alpha$-dihydroxy - $16\alpha$-methyl - 20-oxo-3'-phenyl-4-pregneno - [3,2-d]-3'H-1',2',3'-triazole, which compounds are separated by partition chromatography, or by chromatography on silica gel.

A mixture of $11\beta,17\alpha,21$-trihydroxy - $16\alpha$-methyl-20-oxo-3'-phenyl - 4-pregneno - [3,2-d]-3'H-1',2',3'-triazole 21-mesylate (0.75 g.), lithium chloride (202 mg.) and dimethylformamide (30 ml.) are heated under reflux for 50 minutes, concentrated under vacuum to a small volume, and treated with water. The solid so formed is separated by filtration and recrystallized to afford the 21-chloro - $11\beta,17\alpha,21$-trihydroxy - $16\alpha$-methyl-20-oxo-3'-phenyl - 4-pregneno-[3,2-d]-3'H-1',2',3'-triazole.

The $11\beta,17\alpha,21$-trihydroxy-$16\alpha$-methyl-20-oxo-3'-phenyl-4-pregneno-[3,2-d]-3'H-1',2',3'-triazole 21-mesylate is suspended in 5.5 cc. of acetone and 117 mg. of sodium iodide is added. The mixture is refluxed under nitrogen for about one hour. It is then cooled on ice. On the addition of water there is formed a white precipitate which is filtered off, washed with water, and dried under vacuum to give the $11\beta,17\alpha$-dihydroxy-21-iodo-$16\alpha$-methyl - 20 - oxo - 3' - phenyl - 4 - pregneno - [3,2 - d] - 3'H-1',2',3'-triazole.

The above material is dissolved in 5 cc. of ethanol. Five hundred mg. of sodium bisulfite in 5 cc. of water is added, and the mixture is refluxed for one hour under nitrogen. Ten cc. of water is then added and the product is extracted into 100 cc. of chloroform, washed with water, dried over sodium sulfate and taken to dryness, to give a residue which is purified by chromatography on silica gel. The $11\beta,17\alpha$-dihydroxy-$16\alpha$-methyl-20-oxo-3'-phenyl - 4 - pregneno - [3,2 - d] - 3'H - 1',2',3' - triazole so obtained is crystallized from acetone-ether.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of $11\beta,17\alpha$-dihydroxy-21-iodo-$16\alpha$-methyl-20-oxo-3'-phenyl-4-pregneno-[3,2-d]-3'H-1',2',3'-triazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of a cation exchange resin ("IR–120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give $11\beta,17\alpha$-dihydroxy-$16\alpha$-methyl-20-oxo-3'-phenyl-4 - pregneno - [3,2 - d] - 3'H - 1',2',3' - triazole 21 - dihydrogen phosphate.

The mono- and the dialkali metal salts of the 21-dihydrogen phosphate compound are obtained by neutralizing the 21-dihydrogen phosphate ester with an alkali metal methoxide.

In accordance with all of the above procedures, but starting with any of the 3'-substituted-$17\alpha$, 20,20,21-bis(methylenedioxy)-steroid products described in Flow Sheets A, B, D, E, F, G, H, I, J, K, L, M, N, O, P, R and S, corresponding 21-hydroxy-, 21-acyloxy-, 21-phosphates-, 21-desoxy-, 21-chlor-, and 21-fluoro derivatives are obtained. For example, the following compounds are prepared from the corresponding $17\alpha$, 20,20,21-bis(methylenedioxy)-derivatives described in the flow sheet and example indicated below:

$11\beta,17\alpha$-21-trihydroxy-$16\alpha$-methyl-20-oxo-4-pregneno-[3,2-d]-2'H-1',2',3'-triazole, Flow Sheet A, Example 1.

$9\alpha$-fluoro-$11\beta,17\alpha,21$-trihydroxy-$16\alpha$-methyl-20-oxo-3'-phenyl-4-pregneno-[3,2-d]-3'H-1',2',3'-triazole, Flow Sheet S, Example 23.

$11\beta,17\alpha,21$-trihydroxy-6,$16\alpha$-dimethyl-20-oxo-3'-phenyl-4,6-pregnadieno-[3,2-d]-3'H-1',2',3'-triazole, Flow Sheet E, Example 5.

6-halo-$11\beta, 17\alpha,21$-trihydroxy-$16\alpha$-methyl-20-oxo-3'-phenyl-4,6-pregnadieno-[3,2]-3'H-1',2',3'-triazole, Flow Sheet F, Example 6.

$9\alpha$-fluoro-$11\beta,17\alpha,21$-trihydroxy-6,$16\alpha$-dimethyl-20-oxo-3'-phenyl-4,6-pregnadieno-[3,2-d]-3'H-1',2',3'-triazole, Flow Sheet I, Example 10.

$11\beta, 17\alpha,21$-trihydroxy-6,$16\alpha$-dimethyl-20-oxo-3'-p-fluorophenyl-4,6-pregnadieno-[3,2-d]-3'H-1',2',3'-triazole, Flow Sheet E, Example 5.

$17\alpha, 21$-dihydroxy-$16\alpha$-methyl-20-oxo-3'-phenyl-4-pregneno-[3,2-d]-3'H-1',2',3'-triazole, Flow Sheet R, Example 22.

$9\alpha,11\beta$-dichloro-$17\alpha,21$-dihydroxy-$16\alpha$-methyl-20-oxo-3'-phenyl-4-pregneno-[3,2-d]-3'H-1',2',3'-triazole, Flow Sheet R, Example 22.

*Example 19*

The following procedures which relate to Flow Sheet Q are particularly described starting with $17\alpha,20,20,21$-bis(methylenedioxy) - $11\beta$ - hydroxy - $16\alpha$ - methyl - 4-pregneno-[3,2-d]-1',2',3'-triazole, but are generally applicable to all of the starting materials defined by Flow Sheet Q wherein $R_5$ is hydrogen.

The $17\alpha,20,20,21$ - bis(methylenedioxy) - $11\beta$ - hydroxy - $16\alpha$ - methyl - 4 - pregneno - [3,2 - d] - 1',2',3'-triazole (720 mg.) is heated in a steam bath with 24 ml. of a 60% aqueous solution of formic acid for about 30 minutes. The excess reagent is removed under vacuum using a water bath at about 50 C. as the source of heat. The residue is flushed four times with n-hexane and then dried at 60 C. in high vacuum to give an amorphous solid which is a mixture of $11\beta,17\alpha,21$-trihydroxy-$16\alpha$-methyl- 20-oxo-4-pregneno-[3,2-d]-1',2',3'-triazole and 21-formyloxy - 11β,17α - dihydroxy - 16α - methyl - 20 - oxo - 4-pregneno-[3,2-d]-1',2',3'-triazole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 11β,17α,21-trihydroxy-16α-methyl - 20 - oxo-4-pregneno - [3,2 - d]-1',2',3'-triazole.

To a solution of 100 mg. of the above product in 2 ml. of pyridine is added two milliequivalents of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The N-acetyl-11β,17α,21-trihydroxy-16α-methyl-20-oxo - 4 - pregneno-[3,2 - d]-1',2',3'-triazole 21-acetate is then isolated by addition of water and filtration.

In accordance with the above procedure, but starting with the 11β,17α,21-trihydroxy-16α-methyl-20-oxo-4-pregneno-[3,2-d]-1',2',3'-triazole and using two milliequivalents of another acylating agent there is obtained the corresponding N-acyl-11β,17α,21-trihydroxy-16α-methyl-20-oxo-4-pregneno-[3,2-d]-1',2',3'-triazole 21-acylate.

A solution of 5.73 g. of N-acetyl-11β,17α,21-trihydroxy-16α-methyl-20-oxo-4-pregneno-[3,2-d]-1',2',3'-triazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness under vacuum. Recrystallization of the resulting product affords 11β,17α-21-trihydroxy-16α-methyl-20-oxo-4-pregneno-[3,2-d]-1',2',3'-triazole 21-acetate.

To a solution of 3.70 g. of 11β,17α,21-trihydroxy-16α-methyl-20-oxo-4-pregneno-[3,2-d]-1',2',3'-triazole 21-acetate in 150 ml. of methanol there is added 30 ml. of water containing 0.01 mole of hydrogen chloride. Then a solution of 0.81 g. of potassium cyanate in 8 ml. of water is added and this mixture is left overnight at room temperature. Some of the methanol is removed under vacuum on the rotating evaporator; more water is added and the precipitate is collected by filtration. Recrystallization from methanol gives the N-carbamyl pyrazole in sufficient purity for the next step.

A 500 mg. aliquot of the N-carbamyl-11β,17α,21-trihydroxy-16α-methyl - 20 - oxo-4-pregneno-[3,2 - d]-1',2',3'-triazole 21-acetate is dissolved in 2.4 ml. of pure methanol and allowed to react with 0.5 ml. of a 1.33 N solution of sodium methoxide in methanol at room temperature under nitrogen atmosphere for ten minutes. The alkoxide is neutralized with acetic acid and the mixture is then taken to dryness and flushed with n-hexane. The residue is washed with water, filtered and dried to constant weight to give N-carbamyl-11β,17α,21-trihydroxy-16α-methyl-20-oxo-4-pregneno-[3,2-d]-1',2',3'-triazole.

To a solution of 85 mg. of the above product in 0.5 ml. of pyridine, cooled to 0° C., is added 0.015 ml. of methane sulfonyl chloride. The resulting mixture is allowed to stand at a temperature of approximately 0° C. for a period of approximately one hour. Water is then added to the reaction mixture and the precipitate which forms is recovered by filtration, washed with water, and dried to give N-carbamyl - 11β,17α,21 - trihydroxy-16α-methyl-20-oxo-4-pregneno-[3,2-d]-1',2',3'-triazole 21-mesylate.

A mixture of N-carbamyl-11β,17α,21-trihydroxy-16α-methyl-20-oxo-4-pregneno-[3,2-d]-1',2',3'-triazole 21-mesylate (0.75 g.), lithium chloride (202 mg.) and dimethylformamide (30 ml.) are heated under reflux for 50 minutes, concentrated under vacuum to a small volume, and treated with water. The solid so formed is separated by filtration and recrystallized to afford the N-carbamyl-21-chloro-11β,17α-dihydroxy - 16α - methyl - 20 - oxo-4-pregneno-[3,2-d)-1',2',3'-triazole.

To a solution of 62 mg. of N-carbamyl-11β,17α,21-trihydroxy - 16α - methyl-20-oxo-4-pregneno-[3,2 - d]-1', 2',3'-triazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-carbamyl-17α,21-epoxy - 11β - hydroxy-16α-methyl-20-oxo-4-pregneno-[3,2-d]-1',2',3'-triazole and N-carbamyl-21-fluoro-11β,17α - dihydroxy - 16α - methyl-20-oxo-4-pregneno-[3,2-d]-1',2',3'-triazole, which compounds are separated by partition chromatography or by chromatography on silica gel.

To 180 mg. of N-carbamyl-11β,17α,21-trihydroxy-16α-methyl - 20 - oxo-4-pregneno - [3,2-d]-1',2',3'-triazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N-carbamyl - 11β,17α,dihydroxy - 21 - iodo - 16α-methyl - 20 - oxo - 4 - pregneno - [3,2 - d] - 1',2',3'-triazole.

The N-carbamyl-11β,17α-dihydroxy-21-iodo-20-oxo-4-pregneno-[3,2-d]-1',2',3'-triazole (200 mg.) is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give N - carbamyl - 11β,17α - dihydroxy - 16α - methyl - 20-oxo - 4 - pregneno - [3,2 - d]1',2',3' - triazole.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of N-carbamyl-11β,17α-dihydroxy - 21 - iodo - 16α-methyl - 20 - oxo - 4 - pregneno-[3,2-d]-1',2',3'-triazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of a cation exchange resin ("IR-120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give N-carbamyl-11β,17α-dihydroxy-16α-methyl-20-oxo-4-pregneno-[3,2-d]-1′,2′,3′-triazole 21-dihydrogen phosphate.

The mono- and the dialkali metal salts of the 21-dihydrogen phosphate compound are obtained by neutralizing the 21-dihydrogen phosphate ester with an alkali metal methoxide.

To a solution of 355 mg. of N-carbamyl-11β,17α-dihydroxy - 16α - methyl - 20 - oxo - 4 - pregneno - [3,2-d]-1′,2′,3′-triazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, following by chromatography on alumina, affords 11β,17α - dihydroxy - 16α - methyl - 20 - oxo - 4 - pregneno - [3,2 - d] - 1′,2′,3′ - triazole.

In accordance with the above procedure, but starting with the N-carbamyl-21-fluoro- (or 21-chloro-)-11β,17α-dihydroxy - 16α - methyl - 20 - oxo - 4 - pregneno - [3,2-d] - 1′,2′,3′ - triazole there is obtained the 21-fluoro- (or 21 - chloro) - 11β,17α - dihydroxy - 16α - methyl - 20-oxo - 4 - pregneno - [3,2 - d] - 1′,2′,3′- triazole.

In accordance with all of the above procedures, but starting with any of the 3′-unsubstituted-17α,20,20,21-bis (methylenedioxy)-steroid products described in Flow Sheets A, B, D, E, F, G, H, I, J, K, L, M, N, O, P, R, and S, the corresponding 21-hydroxy-, 21-acyloxy-, 21-phosphates-, 21-desoxy-, 21-chloro- and 21-fluoro- derivatives are obtained.

Example 20

The following procedure for the preparation of phenyl azide (triazobenzene) is generally applicable for the preparation of triazohydrocarbons from the known monosubstituted hydrazines listed in column 3.

In a 1-liter three-necked flask fitted with a stirrer, a thermometer, and a dropping funnel are placed 300 cc. of water and 55.5 cc. of concentrated hydrochloric acid. The flask is surrounded by an ice-salt bath, the stirrer is started, and 33.5 g. (0.31 mole) of phenylhydrazine is added dropwise (five to ten minutes is required). Phenylhydrazine hydrochloride separates as fine white plates. Stirring is continued and, after the temperature has fallen to 0° C., 100 cc. of ether is added; then a previously prepared solution of 25 g. of technical sodium nitrite in 300 cc. of water is added from the dropping funnel at such a rate that the temperature never rises above 5° C. This requires about twenty-five to thirty minutes.

The reaction mixture is subjected to steam distillation until about 400 cc. of distillate is obtained. The ether layer is removed from the distillate, and the aqueous layer is extracted once with 25 cc. of ether. The combined etheral solutions are dried over 10 g. of anhydrous calcium chloride. The dried solution is placed in a 200 cc. ordinary Claisen flask arranged for vacuum distillation. The flask must be surrounded by a cylindrical wire screen, and a laminated glass screen must be interposed between the operator and the apparatus. The flask is immersed in a water bath at 25–30° C. and the ether is removed under reduced pressure. Then the temperature of the water bath is raised to 60–65° C. and the product is distilled under vacuum. Care must be exercised during the distillation. Phenyl azide explodes when heated at ordinary pressure, and occasionally at lower pressures. (The water-bath temperature should never be permitted to rise above 80° C. at any time.) It is advisable to use as low a bath temperature as possible and a pressure of 5 mm. or less. The product should be stored in a brown glass bottle.

Example 21

The following procedures are used to prepare the 16α-fluoro-17α,21-dihydroxy-4-pregnene (or 4, 6-pregnadiene)-3,20-diones used as starting materials in Flow Sheets A, C and L.

Two hundred and fifty milligrams of the 3-enol ethyl ether of methyl 3,11-diketo-4,17(20)-pregnadiene-21-oate is dissolved in 5 ml. of dry pyridine. This mixture is cooled to −20° C. and perchloryl fluoride is bubbled through slowly for three minutes. It is then poured into ice and water and extracted several times with ethyl acetate. The organic layer is washed first with dilute hydrochloric acid and then with 5% sodium bicarbonate, and then dried. The residue, after removal of solvent, is a mixture of the 6α and 6β-fluoro-isomers and is used in the next step without purification.

Three hundred and eighty-five milligrams of the crude 3-enol ethyl ether of methyl 3, 11-diketo-4,17(20)-pregnadiene-21-oate is dissolved in 10 ml. of acetone containing 0.17 g. of sodium acetate dissolved in 1.7 ml. of water and the mixture is cooled to 0° C.. N-chlorosuccinimide (170 mg.) is added, immediately followed by 0.17 ml. of glacial acetic acid. The reaction mixture is stirred in the ice bath for one and one-half hours and is then poured into ice water and extracted into ethyl acetate. Removal of the dried solvent leaves a residue containing methyl 6α-chloro-3,11-diketo - 4,17(20)-pregnadiene - 21-oate which is used directly in the next step.

Two hundred milligrams of the crude methyl-6ξ-fluoro-3,11-diketo-4,17(20)pregnadiene-21-oate are refluxed in a Dean-Stark water separator in 10 ml. of benzene with 0.5 ml. of pyrrolidine and 50 mg. of p-toluenesulfonic acid. After twenty-four hours, the cooled reaction mixture is extracted rapidly once with water, dried and taken to dryness. The residue is redissolved in 10 ml. of tetrahydrofuran, 200 mg. of lithium aluminum hydride are added and the mixture is refluxed for two hours. Water is cautiously added to the cooled reaction mixture, followed by ethyl acetate. The organic layer is separated and taken to dryness. The residue is refluxed for four hours with 0.75 g. of sodium acetate, 1 ml. of water, 0.4 ml. of glacial acetic acid and 10 ml. of methanol. Ethyl acetate and water are added and the separated and dried organic layer is taken to dryness. The residue is then treated with 1 ml. of acetic anhydride and 1 ml. of pyridine for eighteen hours at room temperature. Removal of these reagents under vacuum and chromatography on neutral alumina affords 6α-fluoro-11β, 21-dihydroxy-4,17(20)-pregnadiene-3-one 21-acetate.

In accordance with the above procedure but starting with the crude methyl-6α-chloro-3,11-diketo-4,17(20)-pregnadiene-21-oate, the 6α-chloro-11β, 21-dihydroxy-4, 17(20)-pregnadiene-3-one 21-acetate is obtained.

21-acetoxy-11β-hydroxy-4,17(20)-pregnadiene - 3 - one (3.70 g.) is heated and stirred at 75–100° C. with 1.1 to 2.2 grams of selenium dioxide in 135 ml. of dioxane and 15 ml. of water. When reaction to form the 21-acetoxy-11β, 16α-dihydroxy-4,17(20)-pregnadiene-3-one is at the maximal the solution is filtered with the aid of Super-Cel (an infusorial earth) and taken to dryness. The residue is taken up in ethyl acetate and washed successively with aqueous sodium bicarbonate, ammonium sulfide, dilute aqueous ammonia, dilute hydrochloric acid and finally with water. The organic solvent is dried, treated with activated charcoal, taken to dryness and chromatographed on silica gel to afford 21-acetoxy-11β, 16α-dihydroxy-4,17 (20)-pregnadiene-3-one.

A solution of 21-acetoxy-11β, 16α-dihydroxy-4,17(20) pregnadiene-3-one (400 mg.) in 10 ml. of ether and 1 ml.

of tributylamine is treated with 0.2 ml. of thionyl chloride. After ten minutes, the solution is poured into iced sodium dihydrogen phosphate and extracted with ethyl acetate. Removal of the dried solvent leaves a residue which contains 20-chloro-21-acetoxy-11β-hydroxy-4, 16-pregnadiene-3-one. This is dissolved in 10 ml. of ethanol to which 1 N sodium chloride is added dropwise until alkalinity persists over a period of ten minutes. Then acetic acid is carefully added to neutrality and the solvent is removed under vacuum. The residue is dissolved in ethyl acetate, washed with water, and chromatographed on silica gel to afford 20, 21-expoxy-11β-hydroxy-4,16-pregnadiene-3-one.

To a solution of 200 mg. of 20,21-epoxy-11β-hydroxy-4,16-pregnadiene-3-one in 2 ml. of chloroform and 2 ml. of tetrahydrofuran in a polyethylene bottle at −60° C. is added 2 ml. of 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the combined organic solvent is washed with sodium bicarbonate and dried. The residue after removal of solvent is treated at room temperature with one ml. of acetic anhydride and one ml. of pyridine. The reaction mixture is taken to dryness under high vacuum on a rotating evaporator and and chromatographed on neutral alumina to afford 21-acetoxy-16α-fluoro-11β-hydroxy-4, 17(20)-pregnadiene-3-one.

A solution of 325 mg. of 21-acetoxy-16α-fluoro-11β-hydroxy-4,17(20)-pregnadiene-3-one is prepared in 10 ml. of t-butanol, 3 ml. of methylene chloride and 0.4 ml. of pyridine. To the solution is added 1.1 ml. of a solution of N-methylmorpholine oxide-hydrogen peroxide complex in t-butanol. A milligram of osmium tetroxide is added and the solution is stirred at room temperature over night. Excess reagent is then destroyed by stirring the solution vigorously with aqueous sodium hydrosulfite. After filtration, the organic layer is washed with aqueous sodium dihydrogen phosphate and water, dried and removed under vacuum. Chromatography on Florisil affords 16α-fluoro-11β,17α - dihydroxy - 21 - acetoxy-4-pregnene-3,20-dione. Florisil is an activated magnesium silicate made according to U.S. Patent 2,393,625.

The N-methylmorpholine oxide-hydrogen peroxide is prepared by the following procedure: To a solution of 26 grams (0.25 mole) of N-methylmorpholine in 100 milliliters of tertiary butyl alcohol is added 34 grams (0.50 mole) of fifty percent hydrogen peroxide portionwise, with stirring, and while maintaining the reaction temperature at between thirty and 35 degrees centigrade with water bath. The resulting solution is then diluted to 170 millimeters with tertiary butyl alcohol, maintained at room temperature for 48 hours, and then dried with sixty grams of anhydrous magnesium sulfate for an additional 24 hours. The magnesium sulfate is removed by filtration and the filtrate is distilled to dryness to produce crystalline N-methylmorpholine peroxide. Alternatively, the solution can be titrated for available peroxide and the N-methylmorpholine oxide peroxide used without isolation.

Five hundred milligrams of 21 acetoxy-16α-fluoro-11β,17α - dihydroxy-4-pregnene-3,20-dione is dissolved in a mixture of 5 ml. of benzene and 5 ml. of a 1 N-methanolic potassium hydroxide and the solution is allowed to stand at room temperature for ten minutes. The solution is then acidified with acetic acid, diluted with ethyl acetate and washed with water. Removal of the dried solvent leaves a residue of 16α-fluoro-11β,17α,21-trihydroxy-4-pregnene-3,20-dione. This is stirred at room temperature for 70 hours with a mixture of 18 ml. of chloroform, 5 ml. of concentrated hydrochloric acid and 5 ml. of 37% formaldehyde. The chloroform layer is separated and the aqueous layer is extracted several more times with chloroform. The combined organic solvent is washed with aqueous sodium bicarbonate and dried. Removal of the solvent leaves a residue containing 17α,20,20,21 - bis(methylenedioxy) - 16α - fluoro-11β-hydroxy-4-pregnene-3,20-dione which is further purified by crystallization from methanol.

A suspension of 17α,20,20,21 - bis(methylenedioxy)-11β - hydroxy-16α-fluoro-4-pregnene-3,20-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 17α,20,20,21-bis(methylenedioxy)-16α-fluoro-11β-hydroxy-4,6-pregnadiene-3,20-dione.

Alternately, the 17a,20,20,21-bis(methylenedioxy)-11β-hydroxy - 16α-fluoro-4,6-pregnadiene-3.20-dione may be prepared by reaction of the 21-acetoxy-16α-fluoro-11β, 17α-dihydroxy-4-pregnene-3,20-dione with chloranil according to the above reaction, and then treatment of the resulting 21 - acetoxy-16α-fluoro-11β,17α-dihydroxy-4,6-pregnadiene-3,20-dione first with methanolic potassium hydroxide, and then with formaldehyde in the presence of concentrated HCl using the procedure in column 27.

In accordance with the procedures beginning in column 56, but starting with the known 6α-methyl-21-acetoxy-11β-hydroxy-4,17(20) - pregnadiene-3-one, 6α-cholor-21-acetoxy-11β-hydroxy-4,17(20)-pregnadiene-3-one or the 6α - fluoro-21-acetoxy-11β-hydroxy-4,17(20)-pregnadiene-3-one, or the Δ$^{4,6}$-analogues thereof, there are obtained the 6α-methyl, 6α-chloro or 6α-fluoro-11β-hydroxy-17α,20,20, 21 - bis(methylenedioxy) - 16α - fluoro-4-pregnene-3,20-dione and the corresponding Δ$^{4,6}$-analogues thereof.

The 6 - halo-16α-fluoro-11β,17α-dihydroxy-4,6-pregnadiene-3,20-dione compounds used as starting materials are alternately prepared by the following procedures:

11-ketoprogesterone (10 g.) and chloranil (25 g.) are refluxed in 350 ml. of dry t-butanol for three hours. The residue after removal of the solvent is dissolved in chloroform and extracted thoroughly with 10% aqueous sodium bisulfite, 5% potassium hydroxide and finally water. Removal of the dried solvent and chromatography on neutral alumina affords 6-dehydro-11-ketoprogesterone.

A solution of 3.25 g. of 6-dehydro-11-ketoprogesterone in 325 ml. of methylene dichloride is cooled in an ice bath and treated with 75 ml. of 1.5 N ethereal monoperphthalic acid and allowed to stand over night at room temperature. The mixture is poured into excess sodium bicarbonate, and the organic layer is separated and dried. Removel of solvent and crystallization from a suitable solvent affords 6α,7α-oxido-11-ketoprogesterone.

6α,7α-oxido-11-ketoprogesterone (1.0 g.) in 75 ml. of glacial acetic acid is saturated at room temperature with anhydrous hydrogen chloride and allowed to stand for four hours at room temperature. It is then poured into water, extracted with chloroform and washed with water and sodium bicarbonate. Removal of the dried solvent and chromatography on neutral alumina affords 6-chloro-6-dehydro-11-ketoprogesterone.

6α,7α-oxido-11-ketoprogesterone (1.25 g.) is dissolved in 30 ml. of chloroform and treated with 12.5 ml. of a solution prepared from 7 parts of tetrahydrofuran, 4 parts of chloroform and 4 parts of anhydrous hydrogen fluoride. After three days at room temperature, the mixture is cautiously poured into iced potassium carbonate and extracted several times with chloroform. The organic layer is separated, dried and removed. The residue is taken up in 20 ml. of glacial acetic acid and 5 ml. of glacial acetic acid saturated with hydrogen fluoride gas is added. After one hour at room temperature, this mixture is poured into ice and water and extracted with ethyl acetate. After water and sodium bicarbonate washes, the dried solvent is removed and the residue is chromatographed on neutral alumina to afford 6-fluoro-6-dehydro-11-ketoprogesterone.

A solution of 9.0 g. of 6-chloro-6-dehydro-11-ketoprogesterone is prepared in 125 ml. of anhydrous t-butanol. To it is added with stirring 13.6 ml. of ethyl oxalate and 25 ml. of 2.5 N sodium methoxide in methanol at about 50° C. This mixture is stirred under nitrogen at room temperature over night. Then 3.06 g. of sodium acetate and 3.53 ml. of glacial acetic acid in 200 ml. of methanol are added. This solution is cooled in an ice bath and 10.8 g. of bromine in 110 ml. of methanol is added slowly over a half hour period. Then 57 ml. of 2.5 N methanolic sodium methoxide is added and the solution is stirred for five hours at room temperature. The mixture is then poured into water and the precipitate is filtered off and dried. Five grams of this material is dissolved in 100 ml. of benzene, 50 ml. of methanol and 10 ml. of glacial acetic acid. Five grams of zinc dust is added and the reaction mixture is stirred vigorously for four hours. The solids are filtered off and washed with ethyl acetate. The combined organic layer is extracted with dilute sodium bicarbonate and dried. Chromatography on silica gel affords methyl 6-chloro-3,11-diketo-4,6,17(20)-pregnatriene-21-oate.

The above compound is then converted into 21-acetoxy-6 - chloro - 11β,21 - dihydroxy - 4,6,17(20)pregnatriene-3-one, following in sequence the procedures for the preparation of the corresponding Δ$^4$ compounds.

*Example 22*

The following procedures which relate to Flow Sheet R are particularly described starting with the 17α,20,20,21-bis(methylenedioxy) - 16α - methyl-6-oxo-3'-phenyl-5α-pregnano-[3,2-d]-3'H-1',2',3'-triazole, but are generally applicable to all of the starting materials defined by Flow Sheet R.

A solution of 500 mg. of 17α,20,20,21-bis(methylenedioxy) - 16α - methyl-6-oxo-3'-phenyl-5α-pregnano-[3,2-d]-3'H-1',2',3'-triazole in 35 ml. of tetrahydrofuran which has been freshly distilled from lithium aluminum hydride, and a solution of 750 mg. of sodium borohydride in 4 ml. of water are purged 6 times with nitrogen and then the solutions are combined. After stirring at room temperature under nitrogen for one hour, the combined solution is cooled to 0–5° C., and a saturated solution of 4.7 grams of monobasic sodium phosphate is added over a time period of approximately 15 minutes. The reaction mixture is stirred for an additional 15 minutes. The slurry is then concentrated under vacuum keeping temperature below 25° C. until the tetrahydrofuran is essentially removed. The slurry is cooled, filtered and washed with water until neutral. The product is the 17α,20,20,21 - bis(methylenedioxy) - 6β - hydroxy-16α-methyl - 3' - phenyl - 5α - pregnano-[3,2-d]-3'H-1',2',3'-triazole.

A solution of thionyl chloride in pyridine is prepared by adding 7.5 cc. of freshly distilled thionyl chloride to 38 cc. of ice-cold anhydrous pyridine. This is added dropwise to a stirred solution of 7.0 g. of 17α,20,20,21-bis(methylenedioxy) - 6β-hydroxy-16α-methyl-3'-phenyl-5α-pregnano-[3,2-d]-3'H-1',2',3'-triazole in 45 cc. of anhydrous pyridine. The rate of addition is controlled so that the reaction mixture is maintained at approximately 40° C. The solution is stirred an additional 30 minutes after the addition of the reagent is completed, subsequently cooled in ice and poured into 250 cc. of ice-water. The mixture is extracted with chloroform and the chloroform layer is washed with aqueous sodium bicarbonate solution, dried over sodium sulfate and concentrated under vacuum. The crude product, dissolved in benzene, is chromatographed on silica gel. Elution with ether-petroleum ether, and ether-chloroform mixtures affords the 17α,20,20,21 - bis(methylenedioxy)-16α-methyl-3'-phenyl-5-pregneno-[3,2-d]-3'H-1',2',3'-triazole.

A solution consisting of 0.45 g. of the above product in 28 ml. of chloroform, saturated with dry hydrogen chloride is allowed to stand at room temperature for 6 hours. The reaction mixture is diluted with chloroform and poured into ice water. The chloroform layer is separated, washed with water and sodium bicarbonate solution, dried and concentrated under vacuum. Chromatography on acid washed alumina affords the 17α,20,20,21-bis(methylenedioxy) - 16α - methyl-3'-phenyl-4-pregneno-[3,2-d]-3'H-1',2',3'-triazole.

In accordance with the above procedures, but starting with the 17α,20,20,21-bis(methylenedioxy)-9α,11β-dichloro - 16α - methyl - 6-oxo-3'-phenyl-5-pregnano-[3,2-d]-3'H-1',2',3'-triazole, there is obtained the 17α,20,20,21 - bis(methylenedioxy) - 16α-methyl-3'-phenyl-4-pregneno-[3,2-d]-3'H-1',2',3'-triazole.

The above 17α,20,20,21 - bis(methylenedioxy)-derivatives are converted into the corresponding 21-hydroxy-, 21-acyloxy-, 21-phosphates-, 21-desoxy-, 21-chloro- and 21 - fluoro-17α-hydroxy-20-oxo-4-pregneno-(or 4,6-pregnadieno)-[3,2-d]-2'H-1',2',3'-triazole, as well as the salts thereof, by following the procedures of Examples 18 and 19.

The 21-hydroxy-, 21-chloro-, 21-fluoro-, and 21-desoxy-steroids, wherein H is present at the 16-position, are converted into the 16α,17α-dihydroxy-steroids and the 16α,17α-acetals and ketals thereof following the procedures of Example 24.

*Example 23*

The following procedures which relate to Flow Sheet S are particularly described starting with the 17α,20,20,21-bis(methylenedioxy) - 16α - methyl-6-oxo-9α,11β-epoxy-3' - phenyl-5α-pregnano-[3,2-d]-3'H-1',2',3'-triazole, but are generally applicable to all of the starting materials defined by Flow Sheet S.

A solution of 500 mg. of 17α,20,20,21-bis(methylenedioxy) - 16α - methyl-9α,11β-epoxy-6-oxo-3'-phenyl-5α-pregnano-[3,2-d]-3'H-1',2',3-triazole in 35 ml. of tetrahydrofuran which has been freshly distilled from lithium aluminum hydride, and a solution of 750 mg. of sodium borohydride in 4 ml. of water are purged 6 times with nitrogen and then the solutions are combined. After stirring at room temperature under nitrogen for one hour, the combined solution is cooled to 0–5° C., and a saturated solution of 4.7 grams of monobasic sodium phosphate is added over a time period of approximately 15 minutes. The reaction mixture is stirred for an additional 15 minutes. The slurry is then concentrated under vacuum keeping the temperature below 25° C., until the tetrahydrofuran is essentially removed. The slurry is cooled, filtered and washed with water until neutral. The product is the 17α,20,20,21-bis(methylenedioxy)6β-hydroxy - 16α-methyl-9α,11β-epoxy-3'-phenyl-5α-pregnano-[3,2-d]-3'H-1',2',3'-triazole.

A solution of thionyl chloride in pyridine is prepared by adding 7.5 cc. of freshly distilled thionyl chloride to 38 cc. of ice-cold anhydrous pyridine. This is added dropwise to a stirred solution of 7.0 g. of 17α,20,20,21-bis (methylenedioxy) - 6β - hydroxy - 16α-methyl-9α,11β-epoxy - 3' - phenyl-5α-pregnano-[3,2-d]-3'H-1',2',3'-triazole in 45 cc. of anhydrous pyridine. The rate of addition is controlled such that the reaction mixture is maintained at approximately 40° C. The solution is stirred an additional 30 minutes after the addition of the reagent is completed, subsequently cooled in ice and poured into 250 cc. of ice-water. The mixture is extracted with chloroform and the chloroform layer is washed with aqueous sodium bicarbonate solution, dried over sodium sulfate and concentrated under vacuum. The crude product, dissolved in benzene, is chromatographed on silica gel. Elution with ether-petroleum ether, and ether-chloroform mixtures affords 17α,20,20,21-bis(methylenedioxy) - 16α - methyl-9α,11β-epoxy-3'-phenyl-5-pregneno-[3,2-d]-3'H-1',2',3'-triazole.

A solution consisting of 0.45 g. of the above product in 28 ml. of chloroform, saturated with dry hydrogen chloride is allowed to stand at room temperature for 6 hours. The reaction mixture is diluted with chloroform and poured into ice water. The chloroform layer is separated, washed with water and sodium bicarbonate solution, dried and concentrated under vacuum. Chromatography on acid washed alumina affords the 17α,20,20,21-bis(methylenedioxy) - 16α - methyl - 9α,11β-epoxy-3'-phenyl-4-pregneno-[3,2-d]-3'H-1',2',3'-triazole.

A solution of 172 mg. of the above product, dissolved in 5 cc. of chloroform and cooled to −40° C., is added to a reagent consisting of (a) 10 cc. of a 2:1 mixture (by weight) of hydrogen fluoride in tetrahydrofuran, (b) 10.8 cc. of tetrahydrofuran, and (c) 10 cc. of chloroform, the reagent being maintained at −80° C. The tetrahydrofuran used is of reagent grade and is dried over potassium hydroxide and filtered. The reaction mixture is placed in a Dewar flask and maintained at −30° C. for 4 hours. The reaction mixture is then poured into a stirred mixture consisting of 25 g. of anhydrous potassium carbonate, 75 cc. of a mixture of ice and water, and 70 cc. of chloroform. The chloroform layer is separated and the aqueous layer is extracted twice with 2 portions of chloroform. The combined chloroform layers are washed with water, dried over sodium sulfate, and concentrated under vacuum. The crude product crystallizes from an ether solution on seeding, and is recrystallized several times from ethyl acetate. The mother liquors are combined, concentrated and chromatographed on acid washed alumina from benzene solution. The column is washed with 100 ml. portions of benzene, ether, and chloroform-ether mixtures and the product is eluted with chloroform and is purified by crystallization to afford the 17α,20,20,21-bis(methylenedioxy)-9α-fluoro-11β-hydroxy-16α-methyl-3'-phenyl - 4-pregneno-[3,2-d]-3'H-1',2',3'-triazole.

The above 17α,20,20,21-bis(methylenedioxy)-derivatives are converted into the corresponding 21-hydroxy-, 21-acyloxy-, 21-phosphates-, 21-desoxy-, 21-chloro- and 21-fluoro-17α - hydroxy-20-oxo - 4-pregneno-(or 4,6-pregnadieno)-[3,2-d]-2'H-1',2',3'-triazole, as well as the salts thereof, by following the procedures of Examples 18 and 19.

The 21-hydroxy-, 21-chloro-, 21-fluoro-, and 21-desoxy-steroids, wherein H is present at the 16-position, are converted into the 16α,17α-dihydroxy-steroids and the 16α,17α-acetals and ketals thereof following the procedures of Example 24.

*Example 24*

The following procedures which relate to Flow Sheet Q are particularly described starting with 11β,17α,21-trihydroxy-20 - oxo-3'-phenyl - 4-pregneno-[3,2-d]-3'H-1',-2',3'-triazole but are generally applicable to all of the steroids defined by compounds 79, 83, and 84 of Flow Sheet Q, wherein R₃ is hydrogen.

A fermentation medium consisting of (per liter): starch, 40 g.; corn steep liquor, 25 g.; calcium carbonate, 5 g.; lard oil, 0.2 percent by volume; dibasic potassium phosphate, 5 g. is inoculated with a 24 hour vegetated growth of *Streptomyces roseochromogenus* (*S. roseochromogenes*) (strain Waksman 3689) grown in a seed medium consisting of (per liter): sucrose, 30 g.; corn steep liquor, 20 g.; calcium carbonate, 5 g. and ammonium sulfate, 2 g. All incubations are carried out at 26.5° C. on a shaker. After a 24 hour aeration a solution of 11β,17α,21-trihydroxy - 20-oxo-3' - phenyl-4-pregneno-[3,2-d]-3'H-1',2',3'-triazole (Example 18) in dimethyl formamide is added to the fermentation flasks in such a way that the final dimethyl formamide concentartion does not exceed 2 percent per volume and the final steroid concentration is 250 mg. per liter. The fermentation is allowed to proceed until most of the material has been converted, as judged from paper strip analysis. The broth is filtered, extracted with ethyl acetate and concentrated. The 11β,16α,17α,21-tetrahydroxy - 20-oxo-3'-phenyl-4-pregneno-[3,2-d]-3'H-1',2',3'-triazole is recovered by partition chromatography.

The 11β,16α,17α,21-tetrahydroxy - 20-oxo-3'-phenyl-4-pregneno-[3,2-d]-3'H-1',2',3'-triazole (100 mg.) is heated for 3 minutes with 10 ml. of acetone to which 1 drop of concentrated hydrochloric acid has been added and then permitted to stand at room temperature for 24 hours. The mixture is then poured into a dilute sodium bicarbonate solution and extracted with ethyl acetate. The extracts are washed, dried over magnesium sulfate and taken to dryness to give the 11β,21-dihydroxy-16α,17α-isopropylidenedioxy - 20-oxo - 3'-phenyl - 4 - pregneno-[3,2-d]-3'H-1',2',3'-triazole.

In accordance with the above procedure, but using an equivalent quantity of another aldehyde or ketone such as those described in column 9, there is obtained the corresponding 16α,17α-acetal or ketal.

Various changes and modifications may be made in carrying out the present invention without departing from the spirit and scope thereof. Insofar as these changes and modifications are within the purview of the annexed claims, they are to be considered as part of our invention.

We claim:

1. A compound selected from the group consisting of 3'-lower alkyl-, phenyl- and parafluorophenyl14-pregneno-[3,2-d]-3'H-1',2',3'-triazoles.

2. A compound selected from the group consisting of 3'-lower alkyl-, phenyl- and parafluorophenyl-4,6-pregnadieno-[3,2-d]-3'H-1',2',3'-triazoles.

3. A process for the preparation of [3,2-d]-1',2',3'-triazoles of the pregnane series which comprises contacting a 2-hydroxymethylene-3-keto-steroid of the pregnane series with nitrous acid to form the corresponding 2-hydroxyimino-3-keto-steroid of the pregnane series, and reaction of the latter compound with hydrazine to form the corresponding [3,2-d]-1',2',3'-triazole of the pregnane series.

4. A process for the preparation of 2'-substituted [3,2-d]-2'H-1',2',3'-triazole steroids of pregnane series which comprises the steps (a) contacting a 2-hydroxymethylene-3-oxo-steroid of the pregnane series with nitrous acid to form corresponding 2-hydroxyimino-3-oxo-compound of the pregnane series, (b) reaction of said 2-hydroxyimino-3-oxo-compound of the pregnane series with a substituted hydrazine to form the corresponding 2-hydroxyimino - 3-(substituted)hydrazono-compound of the pregnane series, and (c) reaction of said 2-hydroxyimino-3-(substituted) hydrazono-compound of the pregnane series with a dehydrating agent to form the corresponding 2'-substituted [3,2-d]-2'H-1',2',3'-triazole of the pregnane series.

5. A process for the preparation of 1'- and 3'-substituted-6-oxo-[3,2-d]-1'H (and 3'H)-1',2',3'-triazoles of the pregnane series which comprises the steps of (a) contacting a 5α-pregnane-3,6-dione with morpholine to form the corresponding 3 - morpholino - 5α,2-pregnene-6-one, (b) reacting said 3-morpholino-5α,2-pregnene-6-one with a triazohydrocarbon to form a mixture of the corresponding 1'- and 3' - substituted - 6-oxo-5α-pregnano-[3,2-d]-1'H (and 3'H)-1',2',3'-triazole and (c) separating from said mixture of step (b) the 1'-substituted-6-oxo-5α-pregnano-[3,2-d]-1'H-1',2',3'-triazole and the 3'-substituted-6 - oxo-5α-pregnano-[3,2-d]-3'H-1',2',3'-triazole.

6. A compound selected from the group consisting of 1'-lower alkyl - 4-pregneno-[3,2-d]-1'H-1',2',3'-triazoles, 2' - lower alkyl - 4 - pregneno - [3,2-d] - 2'H - 1',2',3'-triazoles, 3' - lower alkyl - 4 - pregneno - [3,2-d] - 3'H-1',2',3' - triazoles, 1' - lower alkyl - 4,6 - pregnadieno-[3,2-d] - 1'H - 1',2',3' - triazoles, 2' - lower alkyl - 4,6-pregnadieno - [3,2-d] - 2'H - 1',2',3' - triazoles and 3'-lower alkyl-4,6-pregnadieno-[3,2-d]-3'H-1',2',3'-triazoles.

7. 11β,17α-dihydroxy-16α - methyl-20-oxo-4-pregneno-[3,2-d]-1',2',3'-triazole.

8. 11β,17α-dihydroxy-16α - methyl-20-oxo-3'-phenyl-4-pregneno-[3,2-d]-3'H-1',2',3'-triazole.

9. 11β,17α,21-trihydroxy-16α - methyl-20-oxo-4-pregneno-[3,2-d]-1',2',3'-triazole.

10. 11β,17α,21 - trihydroxy-16α - methyl-20-oxo-3'-phenyl-4-pregneno-[3,2-d]-3'H-1',2',3'-triazole.

11. 9α-fluoro-11β,17α,21 - trihydroxy-16α-methyl-20-oxo-3'-phenyl-4-pregneno-[3,2-d]-3'H-1',2',3'-triazole.

12. 11β,17α,21-trihydroxy-6,16α - dimethyl-20-oxo-3'-phenyl-4,6-pregnadieno-[3,2-d]-3'H-1',2',3'-triazole.

13. 6-halo-11β,17α,21-trihydroxy-16α - methyl-20-oxo-3'-phenyl-4,6-pregnadieno-[3,2-d]-3'H-1',2',3'-triazole.

14. 9α-fluoro-11β,17α,21 - trihydroxy-6,16α-dimethyl-20-oxo-3'-phenyl-4,6 - pregnadieno-[3,2-d]-3'H-1',2',3'-triazole.

15. 11β,17α,21-trihydroxy - 6,16α-dimethyl-20-oxo-3'-p-fluorophenyl-4,6 - pregnadieno - [3,2-d]-3'H-1',2',3'-triazole.

16. 17α,21-dihydroxy-16α - methyl-20-oxo-3'-phenyl-4-pregneno-[3,2-d]-3'H-1',2',3'-triazole.

17. 9α,11β-dichloro-17α,21 - dihydroxy-16α-methyl-20-oxo-3'-phenyl-4-pregneno-[3,2-d]-3'H-1',2',3'-triazole.

18. A compound selected from the group consisting of 3'-phenyl- and para-fluorophenyl-16α,17α-dihydroxy-[3,2-d]-3'H-1',2',3'-triazole compounds of the pregnane series, and the 16α,17α-acetonides thereof.

References Cited by the Examiner

Nathansohn et al., Experimentia, 18, pp. 57 and 58 (1962), Q1.A1.E.

LEWIS GOTTS, *Primary Examiner.*

ELBERT L. ROBERTS, *Examiner.*

T. M. MESHBESHER, *Assistant Examiner.*